(12) United States Patent
Murata et al.

(10) Patent No.: US 8,447,489 B2
(45) Date of Patent: May 21, 2013

(54) VEHICLE DRIVING OPERATION SUPPORT APPARATUS/PROCESS AND INDUCEMENT CONTROL

(75) Inventors: Toshiyuki Murata, Zama (JP); Yoshifumi Takigawa, Isehara (JP); Yosuke Kobayashi, Yokohama (JP); Tomoaki Oida, Ebina (JP); Yuwun Chai, Isehara (JP); Taku Suzuki, Isehara (JP); Motoaki Hosaka, Ebina (JP); Hironobu Kikuchi, Isehara (JP); Satoshi Tange, Fujisawa (JP); Takeshi Kimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 573 days.

(21) Appl. No.: 12/710,523

(22) Filed: Feb. 23, 2010

(65) Prior Publication Data
US 2010/0222959 A1   Sep. 2, 2010

(30) Foreign Application Priority Data

Feb. 27, 2009 (JP) ................................ 2009-046941
Feb. 27, 2009 (JP) ................................ 2009-046942
Feb. 27, 2009 (JP) ................................ 2009-046943
Nov. 12, 2009 (JP) ................................ 2009-259191

(51) Int. Cl.
*B62D 6/00* (2006.01)
*G06F 19/00* (2006.01)

(52) U.S. Cl.
USPC ................ 701/96; 701/37; 701/301; 180/169

(58) Field of Classification Search
USPC ........... 701/96, 300, 301, 37, 38, 41; 180/169
See application file for complete search history.

(56) References Cited

U.S. PATENT DOCUMENTS

| | | | |
|---|---|---|---|
| 5,347,457 | A | 9/1994 | Tanaka et al. |
| 6,917,872 | B2 | 7/2005 | Egami |
| 6,982,647 | B2 | 1/2006 | Kuge et al. |
| 7,006,917 | B2 | 2/2006 | Hijikata |
| 7,085,633 | B2 | 8/2006 | Nishira et al. |
| 7,136,755 | B2 | 11/2006 | Yamamura |

(Continued)

FOREIGN PATENT DOCUMENTS

| | | |
|---|---|---|
| DE | 102005024382 A1 | 12/2006 |
| EP | 1400435 A2 | 3/2004 |

(Continued)

OTHER PUBLICATIONS

USPTO Office Action, U.S. Appl. No. 12/710,529, May 8, 2012, 18 pages.

(Continued)

*Primary Examiner* — Tan Q Nguyen
(74) *Attorney, Agent, or Firm* — Foley & Lardner LLP

(57) ABSTRACT

A vehicle driving operation support apparatus for a vehicle, includes a sensing section to sense a traveling condition of the vehicle including a surrounding condition inclusive of an obstacle around the vehicle, and a control section to calculate a risk potential for the vehicle in accordance with the traveling condition. The control section performs a support control to support the driver in accordance with the risk potential and performs an assist control to produce inducement simulating a condition change (such as a vehicle behavior) attributable to an increase of the risk potential, in accordance with the risk potential.

22 Claims, 34 Drawing Sheets

U.S. PATENT DOCUMENTS

| | | |
|---|---|---|
| 7,155,342 B2 | 12/2006 | Kobayashi et al. |
| 7,167,798 B2 | 1/2007 | Kondoh et al. |
| 7,403,842 B2 | 7/2008 | Yamamura et al. |
| 7,457,694 B2 | 11/2008 | Hijikata |
| 7,831,314 B2 * | 11/2010 | Egami ............................... 700/1 |
| 2002/0103587 A1 | 8/2002 | Kim |
| 2004/0080405 A1 | 4/2004 | Hijikata |
| 2005/0049761 A1 | 3/2005 | Kataoka et al. |
| 2005/0065687 A1 | 3/2005 | Hijikata et al. |
| 2005/0090984 A1 * | 4/2005 | Kobayashi et al. ........... 701/301 |
| 2006/0131093 A1 | 6/2006 | Egami |
| 2007/0192030 A1 * | 8/2007 | Tanimichi et al. ............ 701/301 |
| 2007/0219695 A1 * | 9/2007 | Chiu et al. ....................... 701/51 |
| 2007/0272464 A1 * | 11/2007 | Takae et al. .................... 180/169 |
| 2007/0276577 A1 * | 11/2007 | Kuge et al. ....................... 701/96 |
| 2009/0024279 A1 | 1/2009 | Takeda et al. |
| 2009/0222170 A1 | 9/2009 | Scherl et al. |

FOREIGN PATENT DOCUMENTS

| | | |
|---|---|---|
| EP | 1757507 A1 | 2/2007 |
| JP | 7-117532 A | 5/1995 |
| JP | 10-211886 A | 8/1998 |
| JP | 2005 254857 A | 9/2005 |
| JP | 2007-091029 A | 4/2007 |
| JP | 2007-276733 A | 12/2007 |
| JP | 2007-320412 A | 12/2007 |
| JP | 2008-162554 A | 7/2008 |

OTHER PUBLICATIONS

USPTO Office Action, U.S. Appl. No. 12/710,504, 19 pages.

USPTO Office Action, U.S. Appl. No. 12/710,513, 18 pages.

U.S. Appl. No. 12/710,504, filed Feb. 23, 2010, Takeshi Kimura et al.

U.S. Appl. No. 12/710,513, filed Feb. 23, 2010, Yosuke Kobayashi et al.

U.S. Appl. No. 12/710,529, filed Feb. 23, 2010, Tomoaki Oida et al.

USPTO Notice of Allowance, U.S. Appl. No. 12/710,513, filed Oct. 23, 2012, 10 pages.

USPTO Notice of Allowance, U.S. Appl. No. 12/710,504, filed Sep. 18, 2012, 8 pages.

USPTO Notice of Allowance, U.S. Appl. No. 12/710,529, filed Oct. 1, 2012, 5 pages.

* cited by examiner

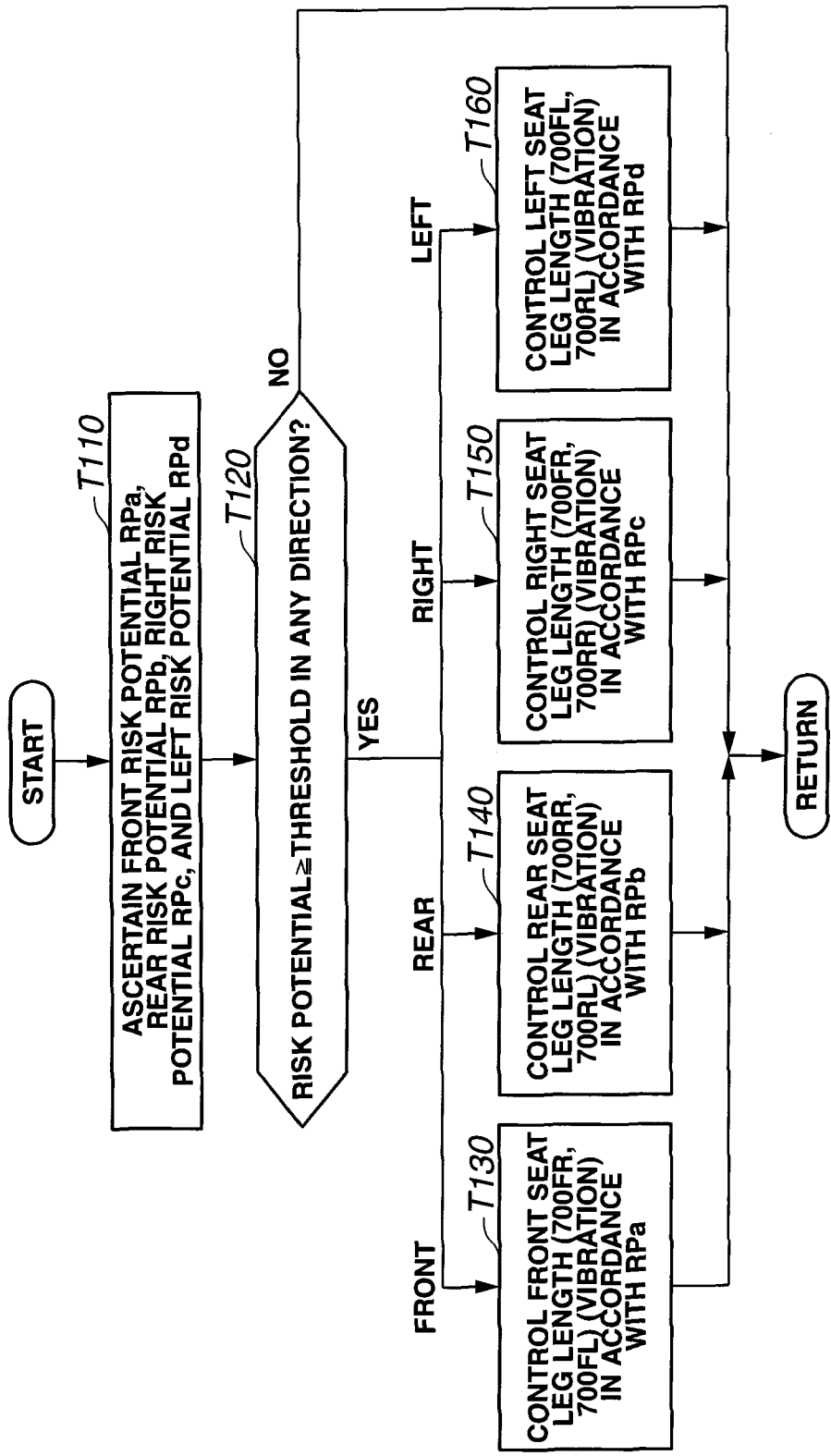

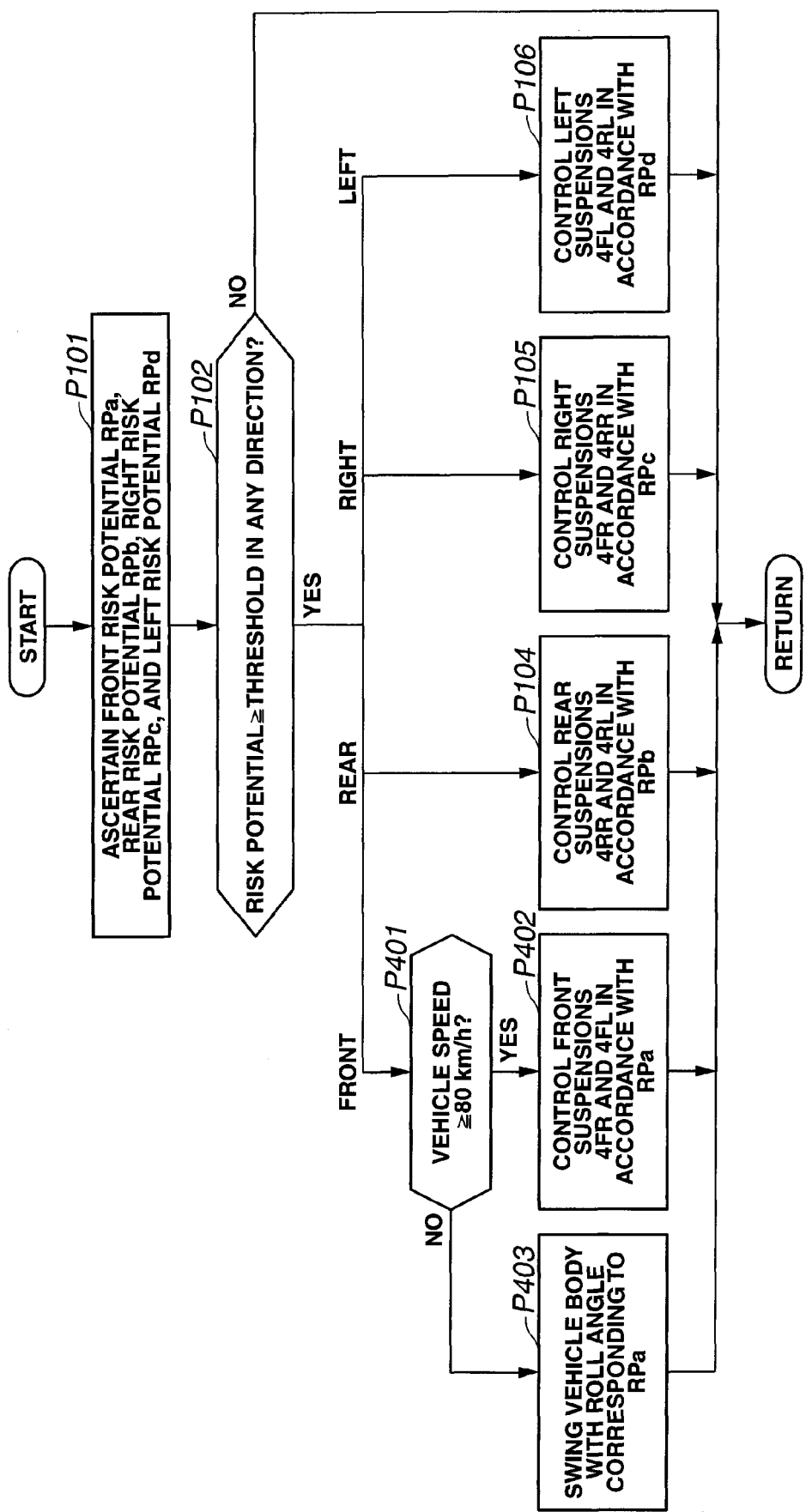

LONGER RELATIVE DISTANCE

SHORTER RELATIVE DISTANCE

US 8,447,489 B2

VEHICLE DRIVING OPERATION SUPPORT APPARATUS/PROCESS AND INDUCEMENT CONTROL

BACKGROUND OF THE INVENTION

The present invention relates to apparatus and process for supporting a driver of a vehicle, and a vehicle.

A vehicle driving (operation) support system is arranged to support a driver by controlling steering reaction, accelerator reaction or brake reaction. Japanese patent document JP 10-211886 shows technique of calculating a risk potential from a sensed surrounding condition inclusive of an obstacle around the vehicle, and controlling a steering assist torque in accordance with the calculated risk potential, to support the driver by leading the driver to adequate recognition of the surrounding condition.

SUMMARY OF THE INVENTION

However, the effect of the above-mentioned control system is not realized until a driving operation is actually performed by the driver. The driver has a chance to recognize a message from the control system about the surrounding condition only after the actual driving operation of the driver. Accordingly, there may be a delay until the driver performs a proper driving operation in a direction decreasing the risk potential. Therefore, it is an object of the present invention to provide technique for supporting the driver more adequately.

According to one aspect of the present invention, a vehicle driving operation support apparatus comprises: a vehicle condition sensing section to sense a vehicle condition of a vehicle; an obstacle condition sensing section to monitor a surrounding condition including an obstacle around the vehicle; an operation input section to which a driver's driving operation is inputted by a driver to operate the vehicle; a motion regulating section to regulate a movement of the driver; and a control section to calculate a risk potential to the obstacle in accordance with the vehicle condition and the surrounding condition, to provide an operational reaction to the driving operation in accordance with the risk potential, and to perform an assist control to produce a pseudo behavior simulating a vehicle behavior responsive to a driving operation increasing the risk potential, by controlling the motion regulating section in accordance with the risk potential.

According to another aspect of the invention, a vehicle driving operation support apparatus for a vehicle, comprises: a sensing section to sense a traveling condition of the vehicle including a surrounding condition inclusive of an obstacle around the vehicle; and a control section to calculate a risk potential for the vehicle in accordance with the traveling condition, and to perform an assist control to produce inducement simulating a condition change attributable to an increase of the risk potential, in accordance with the risk potential.

According to still another aspect of the present invention, a vehicle driving operation support process for a vehicle, comprises: sensing a traveling condition of the vehicle including a surrounding condition inclusive of an obstacle around the vehicle; calculating a risk potential for the vehicle in accordance with the traveling condition; and performing an assist control to produce inducement simulating a condition change attributable to an increase of the risk potential, in accordance with the risk potential.

BRIEF DESCRIPTION OF THE DRAWINGS

FIG. 29 is a flowchart showing a driving operation inducing process according to an application example 1 of the second embodiment.

FIG. 33 is a flowchart showing a driving operation inducing process according to a fourth embodiment.

DETAILED DESCRIPTION OF THE INVENTION

First Embodiment

Practical Example

Figure 1:
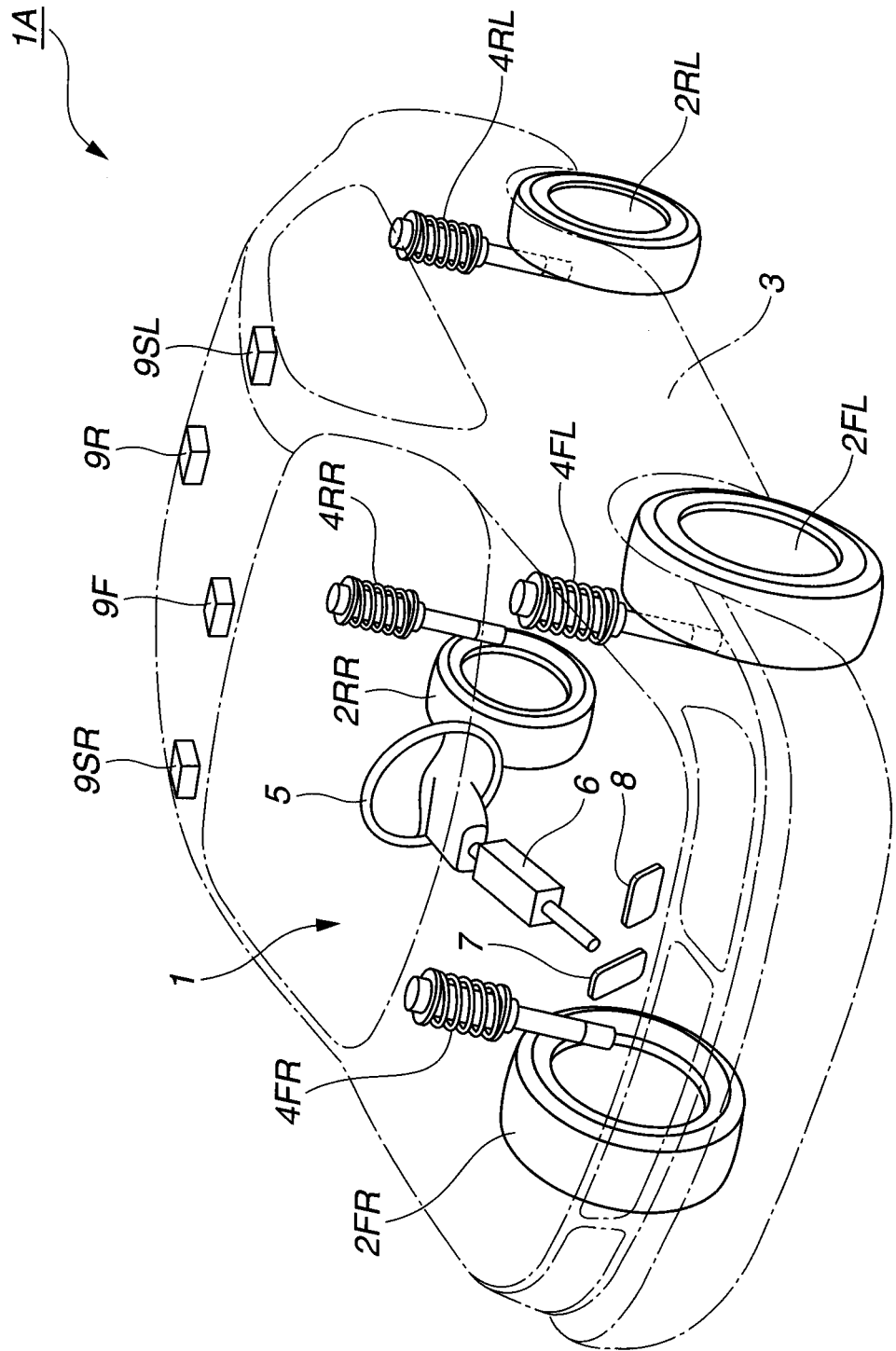
FIG. 1 is a schematic view schematically showing a vehicle (or host vehicle) 1A equipped with a driving operation support system 1 according to a practical example of a first embodiment.

FIG. 1 schematically shows a motor vehicle (host vehicle) 1A equipped with a vehicle driving (operation) support system 1 according to a practical example of a first embodiment of the present invention. Motor vehicle 1A includes: wheels 2FR, 2FL, 2RR and 2RL; a vehicle body 3; an active suspension system 4 including active suspensions 4FR, 4FL, 4RR and 4RL disposed between vehicle body 3 and wheels 2FR, 2FL, 2RR and 2RL, respectively; a steering wheel 5; a steering linkage 6 disposed between steering wheel 5 and steerable wheels 2FR and 2FL; an accelerator pedal 7; a brake pedal 8; and a camera system 9 including cameras 9F, 9R, 9SR and 9SL disposed, respectively, in front, rear, right and left parts of vehicle body 3, and arranged to monitor the surrounding of vehicle 1A by taking imagery. A controller 50 collects information by receiving signals from various components mounted on motor vehicle 1A.

Figure 2:
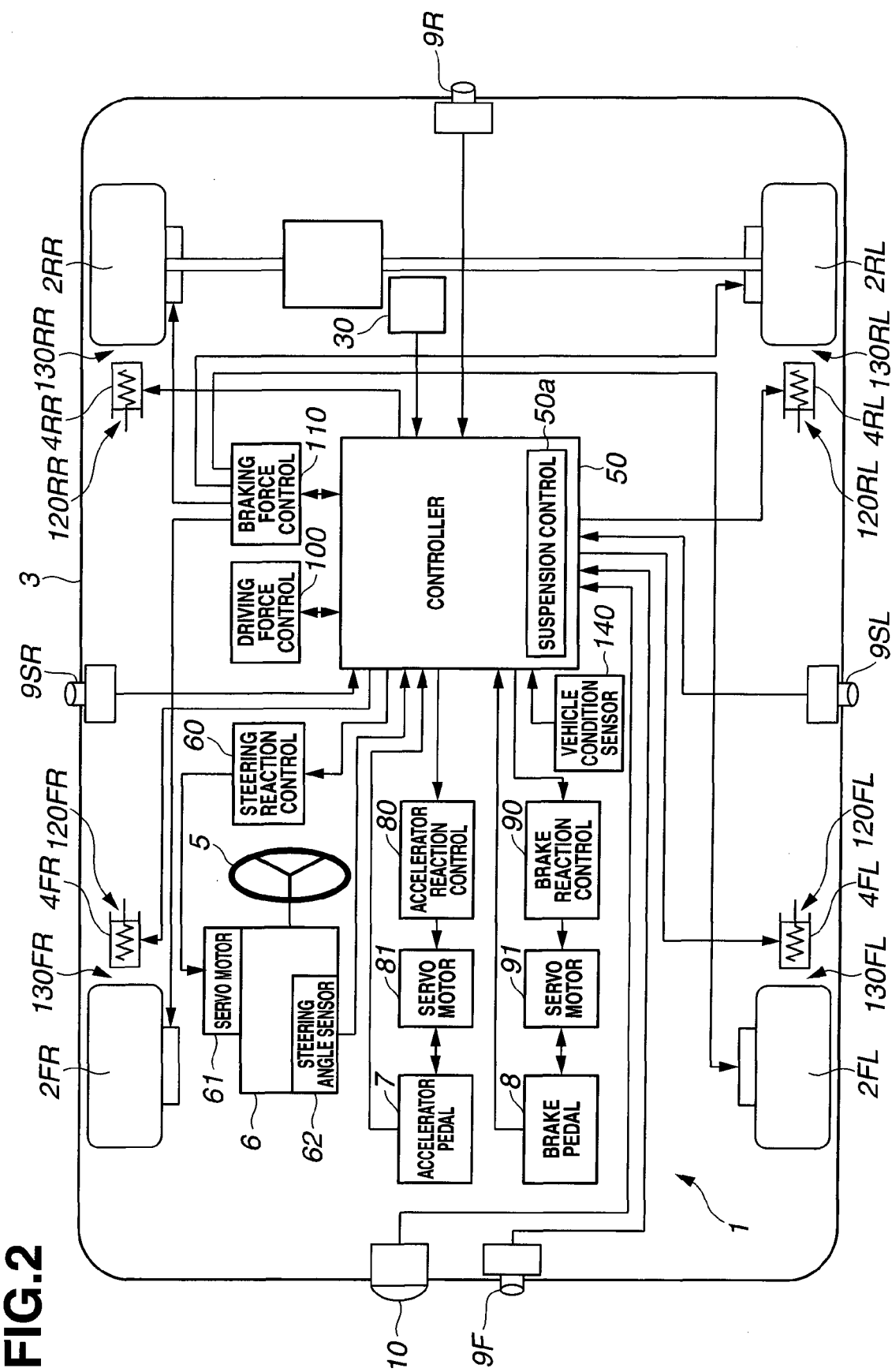
FIG. 2 is a schematic view schematically showing the driving operation support system 1 of the vehicle 1A.

FIG. 2 shows a control system of motor vehicle 1A. The control system shown in FIG. 2 includes: a laser radar 10; cameras 9F, 9R, 9SR and 9SL; a vehicle speed sensor 30; controller 50; steering reaction control unit 60; servo motors 61, 81 and 91; a steering angle sensor 62; an accelerator (pedal) reaction control device 80; a brake (pedal) reaction control device 90; a driving force control device 100; a braking force control device 110; actuators 120FR, 120FL, 120RR and 120RL provided, respectively, in active suspensions 4FR, 4FL, 4RR and 4RL; vehicle body normal (or vertical) acceleration sensors 130FR, 130FL, 130RR and 130RL provided, respectively, in or near active suspensions 4FR, 4FL, 4RR and 4RL; and a vehicle condition sensing device 140.

In this example, the laser radar 10; cameras 9F, 9R, 9SR and 9SL; vehicle speed sensor 30; controller 50; steering reaction control device 60; servo motors 61,81 and 91; steering angle sensor 62; accelerator (pedal) reaction control device 80; brake (pedal) reaction control device 90; driving force control device 100; braking force control device 110; actuators 120FR, 120FL, 120RR and 120RL; vehicle body normal acceleration sensors 130FR, 130FL, 130RR and 130RL; and vehicle condition sensing device 140 can serve as components constituting the vehicle driving operation support control system 1 according to the practical example of the first embodiment.

Laser radar 10 is attached to a front part of motor vehicle 1A, such as grille or bumper, and arranged to scan horizontally with infrared laser pulses. Laser radar 10 receives reflected waves of infrared laser pulses reflected by forward objects such as the rear ends of forward vehicles, and measures distance and direction from vehicle 1A to each of the forward objects from the time of reception of the reflected waves. The measured distance and direction of each object are supplied to controller 50.

The direction of the forward object is represented by an angle with respect to the forward direction or the longitudinal direction of vehicle 1A. The scanning range of laser radar 10 extends to about ±6 degrees with respect to the forward direction, and laser radar 10 can detect a forward object within this range. The forward object may be a forward vehicle, a pedestrian or some other object.

Front camera 9F is an image pickup device such as a camera of a small size having a CCD or CMOS imager, mounted above the windshield, for example. Camera 9F supplies image data of a forward road to controller 50. Camera 9F has an imaging range extending horizontally about ±30 degrees, and camera 9F can cover a forward road scene in this range.

Side cameras 9SR and 9SL are image pickup devices, such as CCD or CMOS camera, mounted, respectively, above left and right side rear doors, for example. Cameras 9SR and 9SL supply image data of scenes on the left and right sides of vehicle 1A, such as conditions of an adjacent lane, to controller 50. Side cameras 9SR and 9SL have a wider imaging range extending horizontally about ±60 degrees.

Rear camera 9R is an image pickup device such as a small CCD or CMOS camera, mounted above the rear window, for example. Camera 9R supplies image data of a rearward road to controller 50. Camera 9R has an imaging range extending horizontally about ±30 degrees like front camera 9F, and camera 9R can cover a rearward road scene in this range.

Vehicle speed sensor 30 senses the vehicle speed of vehicle 1A from wheel speeds, for example, and supplies the sensed vehicle speed to controller 50.

Controller 50 includes a processing unit such as CPU, and peripheral devices such as ROM and RAM, and serves as a main component of a control section in the vehicle driving operation support control system and other vehicle control systems.

Controller 50 determines an obstacle state around the vehicle, from the vehicle speed from vehicle speed sensor 30, distance information supplied from laser radar 10, and image information of the surrounding supplied from cameras 9F, 9R, 9SR and 9SL. Controller 50 extracts the obstacle condition around the vehicle by processing the image information supplied from the cameras.

The obstacle state includes one or more of obstacle conditions such as the distance to a forward vehicle traveling ahead of the host vehicle 1A, the existence/nonexistence and the degree of approach of another vehicle traveling in an adjacent lane after the host vehicle toward the host vehicle, the left and right position of the host vehicle with respect to a lane marking (white line), that is, the relative position and angle, and the shape of a lane marking. The driving operation support system detects a pedestrian or a two-wheeled vehicle crossing ahead of the host vehicle, as the obstacle condition.

Controller 50 calculates a risk potential to each obstacle (that is, a physical quantity representing the degree of closeness of host vehicle 1A to an obstacle). Moreover, controller 50 calculates a comprehensive risk potential of the surrounding around the host vehicle by synthesizing or integrating or totalizing individual risk potentials of obstacles around the vehicle, and performs a cooperative control for coordinating a lateral control in the vehicle lateral direction (control of a steering reaction, a steering angle, and/or a steering gain), a longitudinal control in the vehicle longitudinal direction (control of a longitudinal (driving/braking) force and/or reaction of at least one of the accelerator pedal and brake pedal) and a vertical control in the vehicle vertical direction (control of the damping forces, suspension strokes and/or spring constants of the active suspensions), in accordance with the risk potential, as explained later.

In this embodiment, controller 50 performs the controls in the vehicle longitudinal, lateral and vertical directions in accordance with the comprehensive risk potential (RP). In this case, the controller 50 performs the controls so as to restrain or suppress transmission to the driver, of information (such as road surface condition and vehicle behavior) regarded as noise for the driving operation support control, and to allow transmission of information (such as the road surface condition and vehicle behavior) regarded as useful for leading the drive to proper driving operation. Moreover, controller 50 guides the driver by producing a pseudo vehicle behavior for inducing a driver's operation.

In this example, controller 50 controls the longitudinal (driving/braking) force of the vehicle, the operational reaction (reaction force) produced in the operation input device operated by the driver, and the damping characteristic of the active suspension system. The operation input device includes any one or more of the accelerator pedal 7 to which a driver's accelerator operation is inputted, the brake pedal 8 to which a driver's brake operation is inputted, and the steering wheel 5 to which a driver's steering operation is inputted.

As to the damping characteristic of the active suspension system, controller 50 controls the pressure of a damper provided in each active suspension 4FR, 4FL, 4RR or 4RL, or the suspension stroke in accordance with normal acceleration $X''2FL \sim X''2RL$ represented by sensor signals inputted to controller 50, respectively, from vehicle body normal acceleration sensors 130FR, 130FL, 130RR and 130RL.

Controller 50 multiplies the normal acceleration $X''$ by a predetermined gain Km, multiplies the integral $\int dt$ of body normal acceleration $X''$ by a predetermined gain Kn, determines the sum by addition of the products obtained by these multiplications, and determines a control command based on the thus-calculated sum, for controlling the pressure control actuators 120FR, 120FL, 120RR and 120RL in dampers of active suspensions 4FR, 4FL, 4RR and 4RL.

Figure 3:
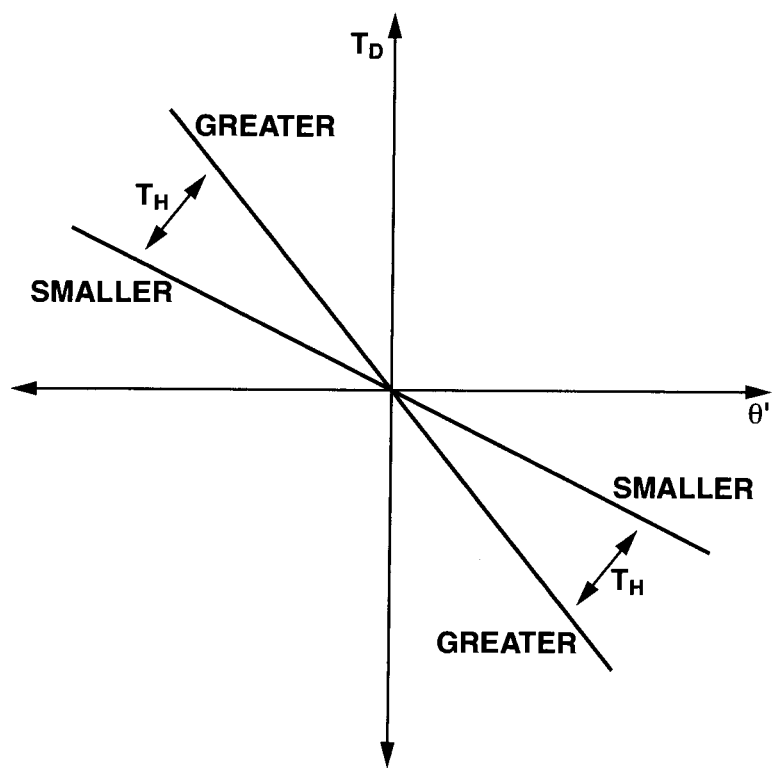
FIG. 3 is a graphic view showing a control map for calculating a damping force used for a steering reaction force control in the support system of FIG. 2.

The steering reaction control device or unit 60 is incorporated in the steering system of the vehicle and arranged to control the torque generated by servo motor 61 in response to a command signal delivered from controller 50. The servo motor 61 varies the output torque in response to a command of steering reaction control device 60. Therefore, controller 50 can control the steering reaction provided to a driver's steering operation, to a desired target value. In this case, controller 50 controls the steering reaction in accordance with the risk potential. In the control for imparting the steering reaction, controller 50 can use a damping force calculation control map as shown in FIG. 3.

A damping force TD added to a steering reaction TR is calculated from a steering angular speed $\theta'$ and a generation torque TH. The damping force TD decreases monotonically or linearly as the steering angular speed $\theta'$ increases, and the rate of decrease of damping force TD with respect to the steering angular speed $\theta'$ is increased as the production or generation torque TH increases. In the example shown in FIG. 3, the damping force calculation control map has a horizontal axis expressing the steering angular speed $\theta'$ and a vertical axis expressing the damping force TD, and this control map is set in the following manner. When steering angular speed $\theta'$ increases from zero in the positive direction, the damping force TD decreases in the negative direction from a value TD0 (zero) in proportion to the steering angular speed $\theta'$. When steering angular speed $\theta'$ decreases from zero in the negative direction, the damping force TD increases in the positive direction from the value TD0 (zero) in proportion to the steering angular speed $\theta'$. Furthermore, the rate of change (increase or decrease) of the damping force TD with respect to the steering angular speed $\theta'$ is increased as the generation torque TH becomes greater.

The steering angle sensor 62 of this example is an angle sensor disposed near the steering column or steering wheel, and arranged to sense the rotational angle of the steering shaft as the steering angle, and to supply the sensed steering angle to controller 50.

There is provided an accelerator operation (or accelerator input) sensor for sensing the driver's accelerator operation quantity. In this example, the accelerator operation sensor is an accelerator pedal stroke sensor (not shown) to sense the accelerator operation quantity in the form of an accelerator pedal depression quantity or degree of accelerator pedal 7. The sensed accelerator operation quantity is supplied to controller 50.

The accelerator reaction control device or unit 80 controls the torque generated by servo motor 81 incorporated in the linkage of accelerator pedal 82, in response to a command signal supplied from controller 50. The servo motor 81 varies the reaction force generated by servo motor 81 in response to a command from accelerator reaction control unit 80, and thereby makes it possible to control the pedal force produced during a driver's accelerator operation of depressing accelerator pedal 82 to a desired target value.

There is provided a brake operation sensor for sensing a driver's brake operation quantity. In this example, the brake operation sensor is a brake pedal stroke sensor (not shown) to sense the brake operation quantity in the form of a brake pedal depression quantity or degree of brake pedal 8. The sensed brake operation quantity is supplied to controller 50.

The brake reaction control device or unit 90 controls a brake assist force generated by a brake booster, in response to a command signal supplied from controller 50. The brake booster varies the brake assist force generated by the brake booster, in response to a command from brake reaction control unit 90, and thereby makes it possible to control the pedal force produced during a driver's brake operation of depressing brake pedal 8 to a desired target value. As the brake assist force is increased, the brake reaction force becomes smaller, and the brake pedal 8 becomes easier to depress.

The driving force control device or unit 100 includes an engine controller, and control the engine torque of the engine of the vehicle in response to a command signal from controller 50.

The braking force control device or unit 110 includes a brake pressure controller, and controls the brake fluid pressure in response to a command signal from controller 50.

The vehicle condition sensing section 140 includes various vehicle condition sensors for sensing vehicle conditions of the host vehicle 1A, such as a lateral acceleration sensor, a yaw rate sensor, an accelerator opening sensor, and a brake pressure sensor, and supplies the sensed vehicle operating conditions such as the sensed lateral acceleration (or lateral G), yaw rate, accelerator opening degree ACC, brake pressure BRK etc., to controller 50.

(Active Suspension Mechanism)

Figure 4:
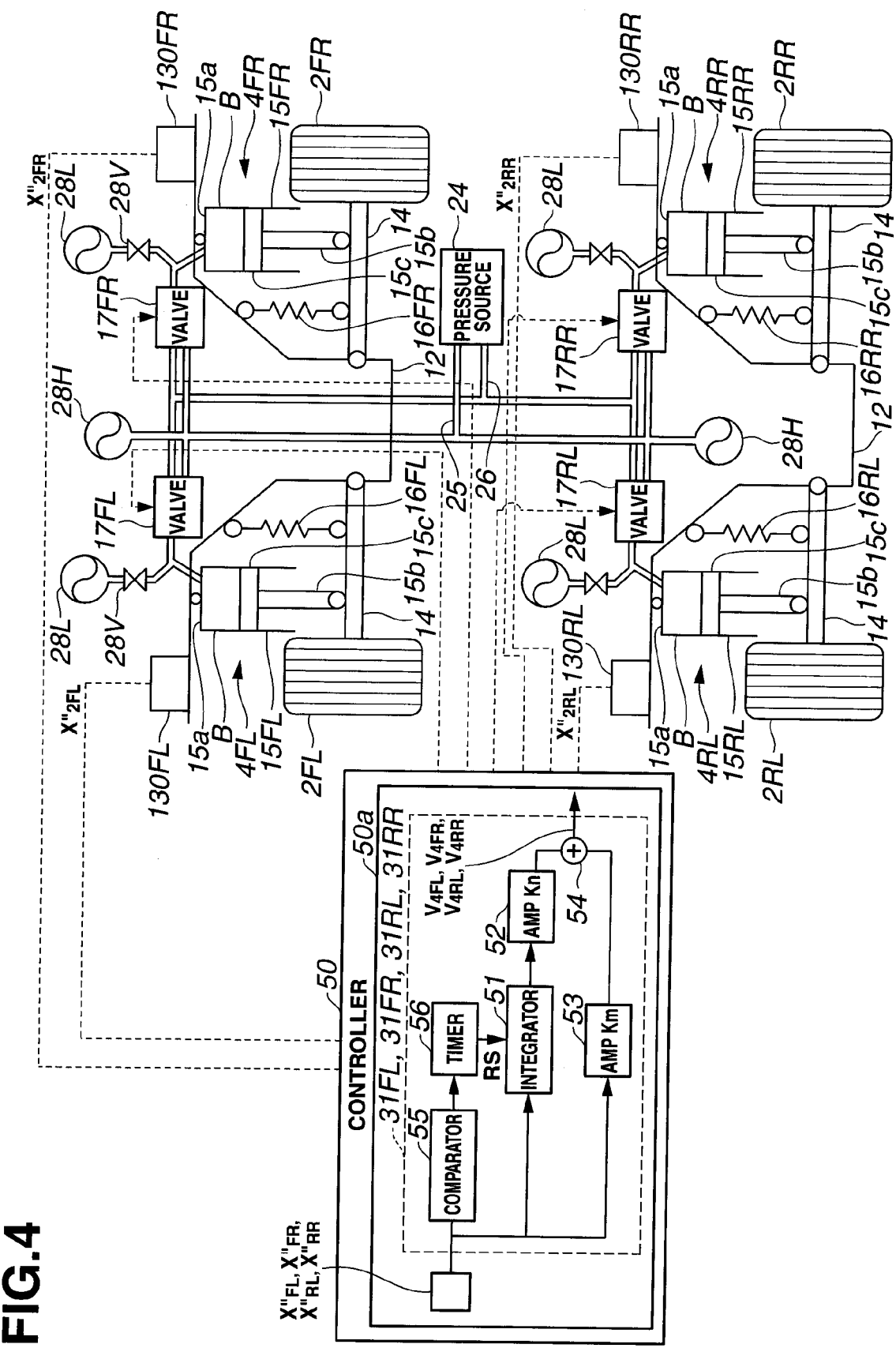
FIG. 4 is a schematic view schematically showing an active suspension system employed in the practical example of the first embodiment.

FIG. 4 shows an active suspension system or mechanism employed in the vehicle 1A of this example. As shown in FIG. 4, each of the active suspensions 4FR, 4FL, 4RR and 4RL is disposed between a body side member 12 of the vehicle body and a wheel side member 14 supporting a corresponding one of the wheels 2FR, 2FL, 2RR and 2RL. Each of the active suspensions 4FR-4RL includes the actuator 120FR, 120FL, 120RR or 120RL, a coil spring 16FR, 16FL, 16RR or 16RL, and a pressure control valve 17FR, 17FL, 17RR or 17RL controlling the operating fluid pressure for the corresponding actuator only in response to a command from controller 50. Pressure control valves 17FL~17RR are connected with a fluid pressure source 24 by a fluid passage 25. At least one high pressure side accumulator 28H is connected with the fluid passage 25. The pressure control valve of each active suspension is connected with a corresponding one of low pressure side accumulator 28L by a fluid passage having a throttling valve 28V. The actuator 120FR, 120FL, 120RR or 120RL of each active suspension includes a hydraulic cylinder 15FR, 15FL, 15RR or 15RL which is connected with the fluid passage connecting the pressure control valve 17FL-17RR and the low pressure side accumulator 28L.

Each of actuators 120FR, 120FL, 120RR and 120RL includes a cylinder tube 15a which is attached to the vehicle body member 12, a piston rod 15b which is attached to the wheel member 14, and a piston 15c closing an upper pressure chamber B receiving the fluid pressure controlled by the corresponding pressure control valve 17FL~17RR. Each of coil springs 16FL~16RR disposed between the vehicle body member 12 and the wheel member 14, in parallel to the corresponding one of actuators 120FL~120RR, and arranged to support the static load of the vehicle body. As coil springs 16FL~16RR, it is possible to use springs having a low spring constant only for supporting the static load.

The pressure control valve 17 of each wheel functions to decrease the pressure in upper pressure chamber B when the pressure in upper pressure chamber B increases, and to increase the pressure in upper pressure chamber B when the pressure decreases. By so doing, pressure control valve 17 can suppress a pressure increase in upper pressure chamber B due to an upward vibration input, and a pressure decrease in upper pressure chamber B due to a downward vibration input, and reduce vibrations transmitted to the vehicle body side member 12.

Vehicle body normal acceleration sensors 130FL, 130FR, 130RL and 130RR are mounted on vehicle body 3, respectively, at positions just above wheels 2FL, 2FR, 2RL and 2RR, and connected with controller 50 to supply normal acceleration signals representing sensed body normal accelerations $X''2FL \sim X''2RR$.

Controller 50 includes a suspension control section 50a for controlling the pressures of active suspensions 4FL, 4FR, 4RL and 4RR. Suspension control section 50a has a gain adjusting function of multiplying each of body normal accelerations $X''2FL \sim X''2RR$ by a predetermined gain Km, a body normal velocity calculating & gain adjusting function of multiplying an integral $\int dt$ of each of body normal accelerations $X''2FL \sim X''2RR$, by a predetermined gain Kn, and an adding function of determining a sum by adding the outputs of the gain adjusting function and the body normal velocity calculating & gain adjusting function. The sum determined by the adding function is supplied as a command V4FL~V4RR to pressure control valve 17 (FL~RR).

Suspension control section 50a of controller 50 includes an integrator 51 which receives the sensed body normal accelerations $X''2FL \sim X''2RR$ and determines the respective integrals representing the body normal velocities $X'2FL \sim X'2RR$, and an amplifier 52 which amplifies the body normal velocities $X'2FL \sim X'2RR$ with the predetermined gain Kn, respectively. Suspension control section 50a further includes an amplifier 53 which receives the sensed body normal accelerations $X''2FL \sim X''2RR$ and amplifies the body normal accelerations $X''2FL \sim X''2RR$ with the predetermined gain Km, and an adder 54 which adds the amplifier outputs from amplifiers 52 and 53.

The sensed body normal accelerations $X''2FL \sim X''2RR$ are further inputted to a comparator 55 forming a window comparator, for example. Comparator 55 outputs a comparator output of a logic value 1, for example, when the sensed body normal accelerations $X''2FL \sim X''2RR$ are within a predetermined range between a predetermined upper limit value and a predetermined lower limit value. This comparator output is supplied to a timer circuit 56 for examining whether the comparator output remains continuously at the logic value 1 for a predetermined time duration. When the continuance of the comparator output at the logic value 1 becomes equal to or longer than the predetermined time duration, the timer circuit 56 delivers a reset signal RS (having a logic value 1, for example) to integrator 51, and thereby resets the accumulated data in integrator 51.

By varying the gain Km for the body normal accelerations $X''2FL \sim X''2RR$, and the gain Kn for the body normal velocities $X'2FL \sim X'2RR$, the suspension control section 50a can control the active suspensions 4 (FL~RR) so as to cancel vibrations inputted to vehicle body 3 from the road surface almost entirely, or to allow vibrations to be transmitted directly to vehicle body with no or little suppression. Furthermore, by producing the pressure control valve command signals V4FL~V4RR independent from the road surface input, the suspension control section 50a can control the active suspensions in other control modes (such as a control mode to control the rolling motion or the pitching motion of the vehicle body) other than the control mode for suppressing vibrations from the road surface.

(Control Processes in Controller)

The driving support control system of this embodiment calculates a risk potential RP of vehicle 1A, and performs a driver's driving operation inducement control for inducing a driver's driving operation in accordance with the risk potential.

(Risk Potential Calculation)

Figure 5:
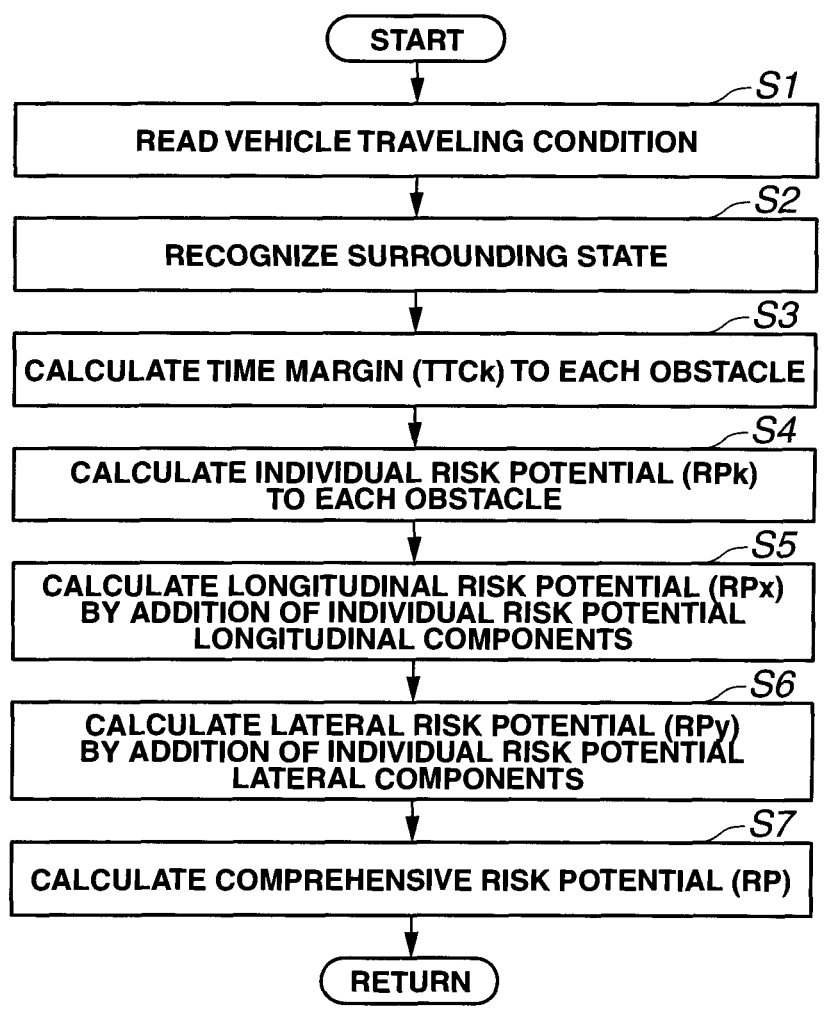
FIG. 5 is a flowchart showing a risk potential calculating process performed by a controller 50 of the support system shown in FIG. 2.

FIG. 5 shows a risk potential calculating process in the form of a flowchart, which is initiated in response to a start command inputted by the driver to start the driving operation support control. Controller 50 first reads the vehicle traveling condition of vehicle 1A at a step S1.

The vehicle traveling condition includes a surrounding condition inclusive of an obstacle condition around vehicle 1A, and other information. In this example, the vehicle traveling condition obtained at S1 includes at least: the relative distance and relative angle to a forward vehicle detected by laser radar 10; information from front camera 9F including the relative position (displacement in the lateral direction and relative angle) and shape of a lane marker, and the relative distance and angle to a forward vehicle; information based on imagery obtained by cameras 9R, 9SR and 9SL, including the relative distance and angle to a rearward vehicle following the vehicle 1A in an adjacent lane; and the vehicle speed sensed by vehicle speed sensor 30. Moreover, from the image data obtained by cameras 9F, 9R, 9SL and 9SR, controller 50 discriminates among four-wheeled vehicle, two-wheeled vehicle, pedestrian and other obstacles and determines the kind of each obstacle by using image data obtained by cameras 9F, 9R, 9SL and 9SR.

Then, at a step S2, controller 50 recognizes the current surrounding state from the data on the vehicle traveling condition obtained at S1. In this example, controller 50 recognizes the current relative position, moving direction, and moving speed of each obstacle relative to vehicle 1A, by using previous data stored in a memory section (such as section 556d shown in FIG. 29 or an external memory device) and current data. For example, the previous data includes the relative position, moving direction and moving speed of each obstacle with respect to vehicle 1A, obtained in a most recent control cycle or a previous control cycle. The current data is the current data on the vehicle traveling condition obtained at S1. Thus, controller 50 can recognize the relative position and movement of each obstacle.

At a next step S3, controller 3 calculates a time margin TTC (time to collision) to each obstacle detected or recognized at S2. The time margin TTCk to an obstacle k is calculated by using the following equation (1).

$$TTCk=(Dk-\sigma(Dk))/(Vrk+\sigma(Vrk)) \quad (1)$$

In this equation: Dk is a relative distance from vehicle 1A to the obstacle k; Vrk is a relative speed of the obstacle k with respect to vehicle 1A; σ(Dk) is a dispersion of the relative distance; and σ(Drk) is a dispersion of the relative speed.

The dispersions σ(Dk) and σ(Drk) are determined by the type of the sensor which has detected the obstacle k, and the type of the obstacle k, in consideration of the uncertainty of the sensing device, and the weight of influence of occurrence of unexpected condition. The distance measurement by laser radar 10 is more accurate than the measurement by cameras 9F, 9R, 9SR and 9SL. Therefore, the dispersion σ(Dk) of the relative distance is held substantially constant without regard to the value of the relative distance when the relative distance Dk is measured by laser radar 10. When, on the other hand, the relative distance Dk is measured by the use of image data from cameras 9F, 9R, 9SR and 9SL, the dispersion σ(Dk) is so set that the dispersion σ(Dk) of the relative distance increases exponentially with increase of the relative distance Dk. When the relative distance Dk to the obstacle k is small, the dispersion σ(Dk) of the relative distance Dk is set smaller since a smaller relative distance can be measured more accurately by the cameras as compared to laser radar.

It is possible to employ the following setting, for example. When the relative distance Dk is sensed by laser radar 10, the dispersion σ(Drk) of the relative speed is increased in proportion to the relative speed Vrk. When the relative distance Dk is sensed by the cameras, the dispersion σ(Drk) of the relative speed is increased exponentially with increase of the relative speed Drk. When the object condition is sensed by the cameras, the control system can recognize the type of the obstacle by processing the image data. Therefore, in this case, the dispersions σ(Dk) and σ(Drk) are set in dependence on the type of the obstacle.

The measurement of relative distance Dk by the cameras is more accurate when the size of the obstacle is greater. Therefore, the dispersion σ(Dk) of the relative distance is set smaller for a four-wheeled vehicle than for a two-wheeled vehicle or pedestrian. The dispersion σ(Drk) of the relative speed is increased as the estimated speed of the obstacle k becomes higher. Even if the estimated relative speed Vrk is the same, the relative speed dispersion σ(Drk) is set greater for a four-wheel vehicle than for a two-wheel vehicle or pedestrian because the moving speed of the four-wheeled vehicle is assumed to be higher than that of a two-wheeled vehicle and a pedestrian. If the obstacle k is sensed both by laser radar 10 and the cameras 9F, 9R, 9SR and 9SL, the controller 50 may be configured to calculate the time margin TTCk by using a greater one of values of dispersion σ(Dk) and a greater one of values of dispersion σ(Drk).

At a step S4, controller 50 calculates an individual risk potential RPk to each obstacle k by using the time margin TTCk calculated at S3. The following equation (2) is used for this calculation.

$$RPk=(1/TTCk) \times wk \quad (2)$$

In this equation, wk is a weight of an obstacle k. As expressed by the equation (2), the risk potential is expressed as a function of time margin TTCk using the reciprocal of TTCk. Risk potential RPk represents the degree of closeness to the obstacle k, and the risk potential RPk becomes higher as the vehicle 1A approaches the obstacle k.

The weight wk of each obstacle k is determined in accordance with the type of the obstacle k. In this example, the weight wk is set equal to one (wk=1) when the obstacle k is a four-wheeled or two-wheeled vehicle or a pedestrian because the degree of influence or consequence resulting from approach to the obstacle k is high. When the obstacle k is a lane marker or an object which cannot be an object of collision, the weight wk is set equal to 0.5 (wk=0.5).

At a step S5, controller 50 extracts the longitudinal components of the individual risk potentials RPk of the objects calculated at S4 in the longitudinal direction of the vehicle, and calculates a comprehensive or overall longitudinal risk potential RPx (or RPlongitudinal) to all the obstacles around the vehicle, by adding the extracted longitudinal components of the individual risk potentials RPk. The following equation (3) can be used for this calculation.

$$RPx=\sigma_k(RPk \times \cos \theta k) \quad (3)$$

In this equation, θk is an angle represents the direction of a k-th object with respect to host vehicle 1A. The angle θk is zero (θk=0) when the k-th obstacle is located straight ahead of the vehicle 1A in the forward direction. The angle θk is 180 (θk=180) when the k-th obstacle is located behind the vehicle 1A in the rearward direction.

Furthermore, controller 50 determines a front risk potential RPa which is the risk potential in a forward range of the vehicle 1A (the range in which θ=0~90 and 270~360, for example), and a rear risk potential RPb which is the risk potential in a rearward range of the vehicle 1A (the range in which θ=90~270, for example).

At a step S6, controller 50 extracts the lateral components of the individual risk potentials RPk of the objects calculated at S4 in the lateral direction of the vehicle, and calculates a comprehensive or overall lateral risk potential RPy (or RPlateral) to all the obstacles around the vehicle, by adding the extracted lateral components of the individual risk potentials RPk. The following equation (4) can be used for this calculation.

$$RPy = \Sigma_k (RPk \times \sin \theta k) \quad (4)$$

Furthermore, controller 50 determines a right risk potential RPc which is the risk potential in a rightward range of the vehicle 1A (the range in which θ=0~180, for example), and a left risk potential RPd which is the risk potential in a leftward range of the vehicle 1A (the range in which θ=180~360, for example).

At a step S7, controller 50 calculates a risk potential RP (or comprehensive or overall risk potential RP), by adding the individual risk potentials RPk to all the obstacles calculated at 54. After 57, controller 50 repeats the risk potential calculating process until a driver's stop command is inputted to terminate the driving support control. The risk potentials and other parameters calculated in this risk potential calculating process are stored by controller 50 in the memory section for later use for other control processes.

(Driving Operation Inducement Control)

Figure 6:
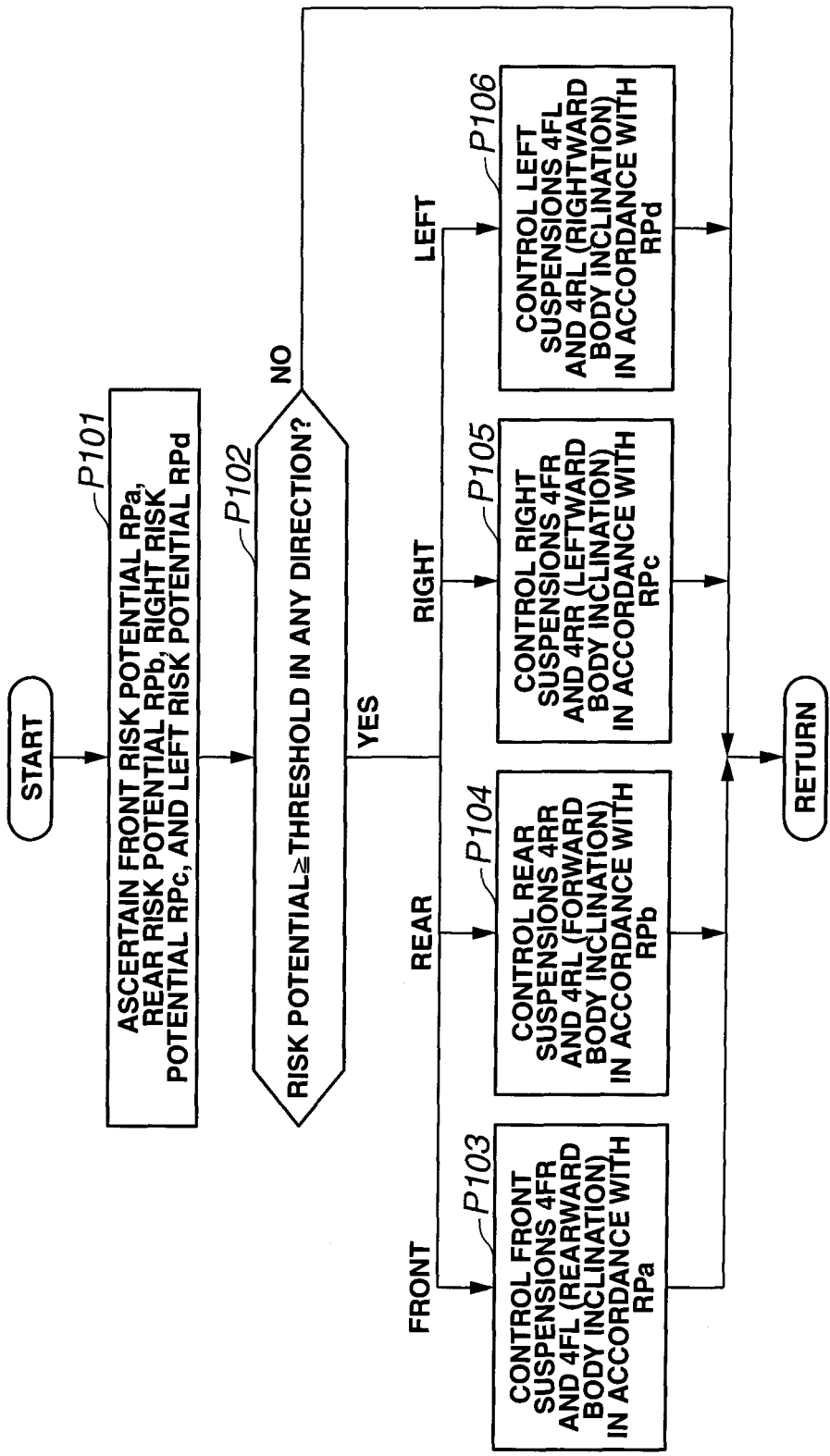
FIG. 6 is a flowchart showing a driving operation inducing control process performed by controller 50.

FIG. 6 shows the driving operation inducement control process performed by controller 50, in the form of a flowchart. In this embodiment, the driving operation inducement control is a process for inducing a driver's driving operation by changing the posture of the vehicle body with active suspensions 4(FL~RR) and thereby providing a pseudo sense to the driver. (At least part of the driving operation inducement control can be regarded as corresponding to an assist control.) Controller 50 starts this process in response to a driver's command.

At a step P101, controller 50 obtains the front, rear, right and left risk potentials RPa, RPb, RPc and RPd calculated in the risk potential calculating process. Then, at a step P102, controller 50 compares the front, rear, right and left risk potentials RPa, RPb, RPc and RPd obtained at P101, respectively, with threshold values RPa0, RPb0, RPb0 and RPd0, and determines whether any of the risk potentials is higher than or equal to its threshold value. When none of the front, rear, right and left risk potentials are higher than the respective threshold values, controller 50 repeats the inducement control process of FIG. 6.

If front risk potential RPa is higher than or equal to front risk potential threshold RPa0, then controller 50 proceeds from P102 to a step P103, and varies the suspension strokes of front active suspensions 4FL and 4FR in accordance with the front risk potential RPa at P103. Furthermore, at step P103, controller 50 increases the operational reaction of accelerator pedal 7 in accordance with front risk potential RPa. After P103, controller 50 repeats the operation inducement control process of FIG. 6.

Figure 7:
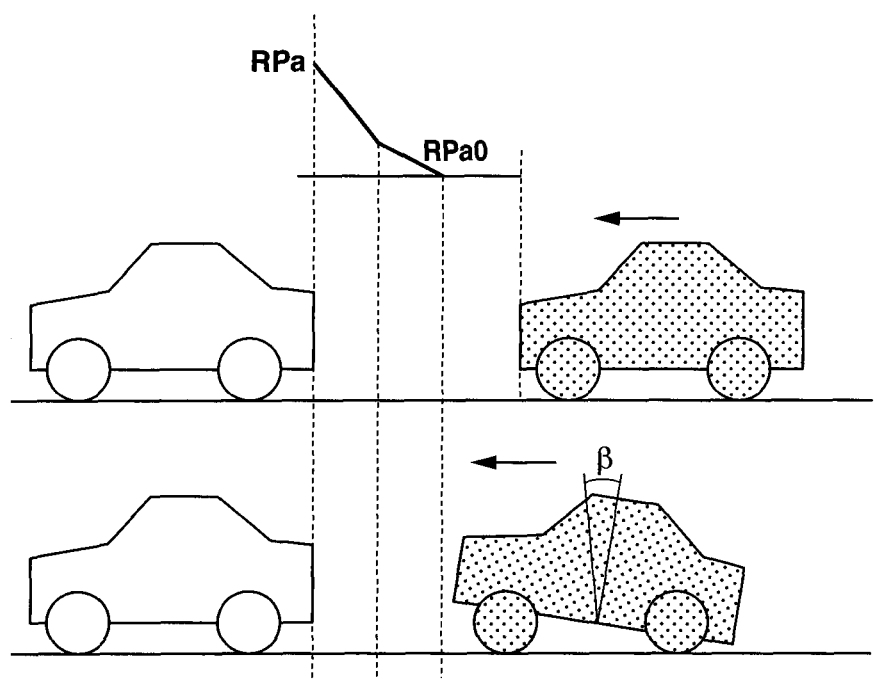
FIG. 7 is a schematic view for illustrating a control operation of the driving operation inducing control process when a front risk potential RPa is high.
Figure 8A:
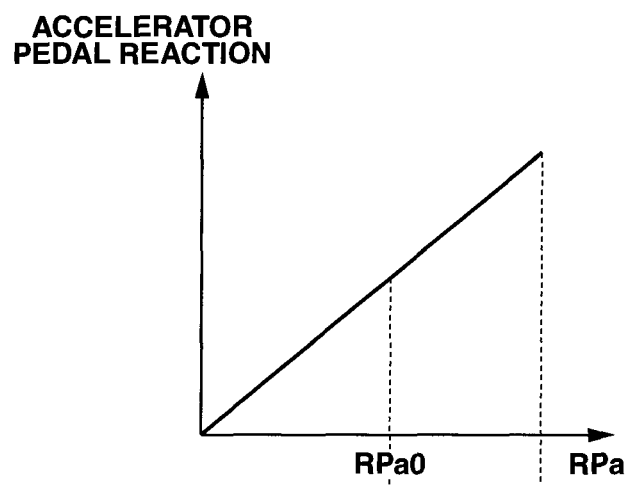
FIGS. 8A and 8B are graphic views showing characteristics of an accelerator (pedal) reaction and a vehicle body pitch angle $\beta$ provided when the front risk potential RPa is high.
Figure 8B:
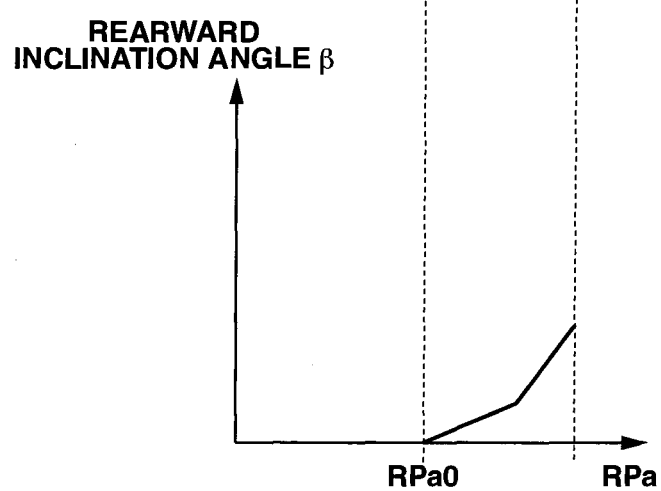

FIG. 7 schematically shows the control operation when front risk potential RPa is high. FIGS. 8A and 8B show characteristics of the accelerator pedal reaction and the vehicle body pitch angle β provided when front risk potential RPa is high. When front risk potential RPa is higher than threshold RPa0, the accelerator reaction is increased in accordance with front risk potential RPa, as shown in FIG. 8A, and hence the resistance to depressing accelerator pedal 7 is increased.

Moreover, as shown in FIG. 8B, the body pitch angle β (the rearward inclination angle of the vehicle body) is varied in accordance with front risk potential RPa. By controlling the suspension strokes of front suspensions 4FL and 4FR in accordance with front risk potential RPa, the control system can give the driver a feeling of acceleration of the vehicle 1A, as shown in FIG. 7. In this case, the pitch angle β of the vehicle body (rearward inclination angle of the vehicle body) is increased in accordance with front risk potential RPa, as shown in FIG. 8B. Therefore, the driver feels that the vehicle 1A is accelerated with a greater acceleration as the front risk potential is higher. By guiding the driver into a driving operation in this way, the control system can prompt the driver to do a braking operation. When the braking operation is performed by the driver, the front risk potential RPa becomes lower, and controller 50 terminates the inducement operation at step P103.

If rear risk potential RPb is higher than or equal to rear risk potential threshold RPb0, then controller 50 proceeds from P102 to a step P104, and varies the suspension strokes of rear active suspensions 4RL and 4RR in accordance with the rear risk potential RPb at P104. After P104, controller 50 repeats the operation inducement control process.

Figure 9:
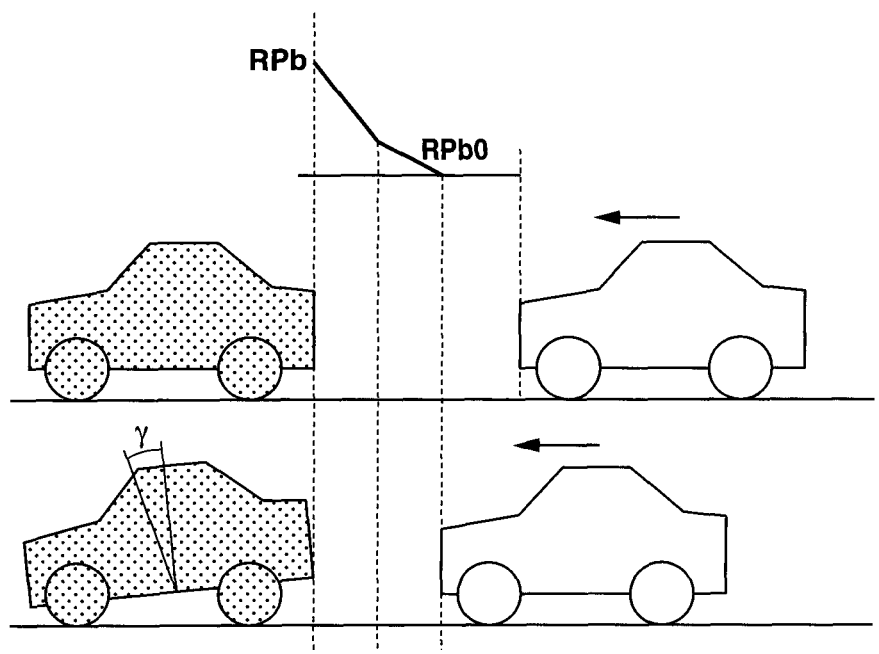
FIG. 9 is a schematic view for illustrating a control operation of the driving operation inducing control process when a rear risk potential RPb is high.
Figure 10:
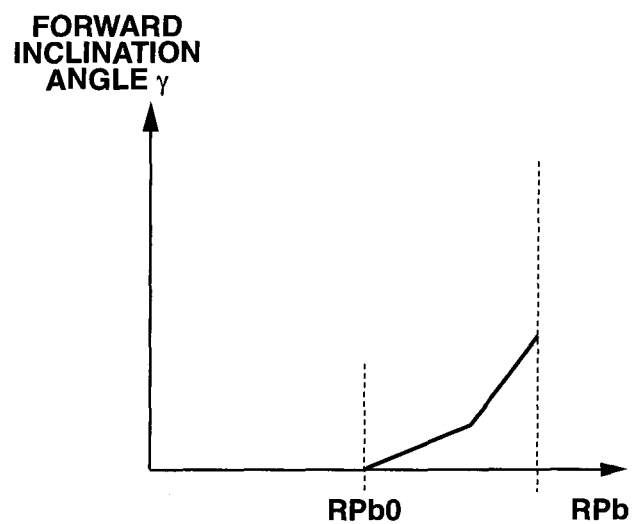
FIG. 10 is a graphic view showing a characteristic of a vehicle body pitch angle $\gamma$ provided when the rear risk potential RPb is high.

FIG. 9 schematically shows the control operation when rear risk potential RPb is high. FIG. 10 shows a characteristic of the vehicle body pitch angle γ provided when rear risk potential RPb is high. When rear risk potential RPb is higher than its threshold RPb0, the body pitch angle γ (the forward inclination angle of the vehicle body) is varied in accordance with rear risk potential RPb. By controlling the suspension strokes of rear suspensions 4RL and 4RR in accordance with rear risk potential RPb, the control system can give the driver a feeling of deceleration of the vehicle 1A, as shown in FIG. 9. In this case, the pitch angle γ of the vehicle body (forward inclination angle) is increased in accordance with rear risk potential RPb, as shown in FIG. 9. Therefore, the driver feels that the vehicle 1A is decelerated with a greater deceleration as the rear risk potential is higher. By guiding the driver into a driving operation in this way, the control system can prompt the driver to do an accelerating operation. When the accelerating operation is performed by the driver, the rear risk potential RPb becomes lower, and controller 50 terminates the inducing operation at step P104.

If right risk potential RPc is higher than or equal to right risk potential threshold RPc0, then controller 50 proceeds from P102 to a step P105, and varies the suspension strokes of right active suspensions 4FR and 4RR in accordance with the right risk potential RPc at P105. After P105, controller 50 repeats the operation inducement control process. If left risk potential RPd is higher than or equal to left risk potential threshold RPd0, then controller 50 proceeds from P102 to a step P106, and varies the suspension strokes of left active suspensions 4FL and 4RL in accordance with the left risk potential RPd at P106. After P106, controller 50 repeats the operation inducement control process.

Figure 11:
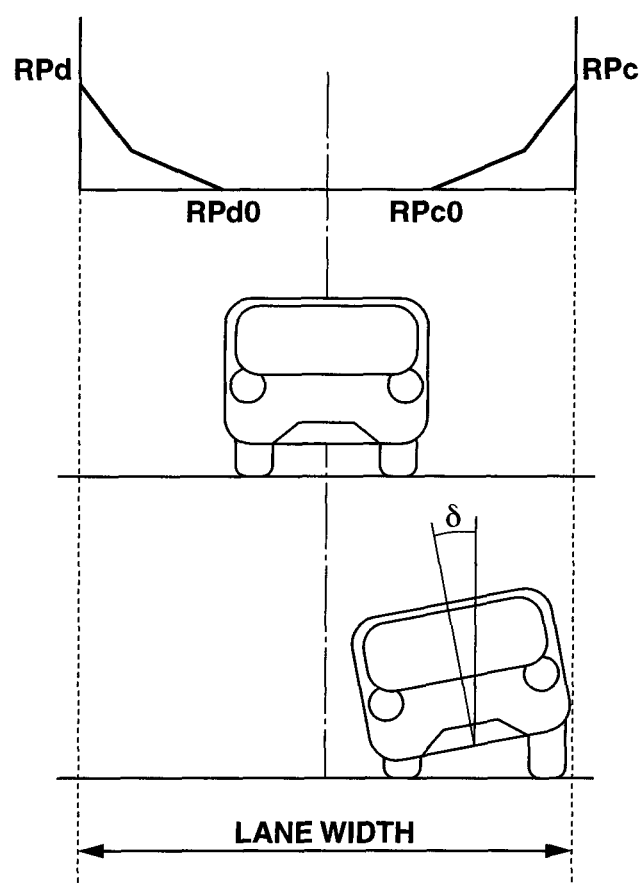
FIG. 11 is a schematic view for illustrating a control operation of the driving operation inducing control process when a left or right risk potential RPc or RPd is high.
Figure 12A:
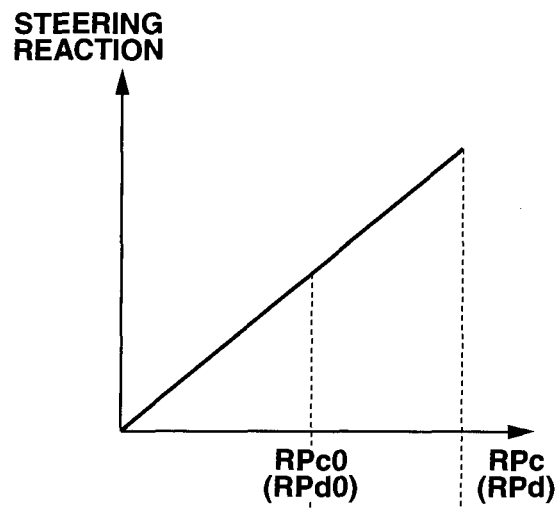
FIGS. 12A and 12B are graphic views showing characteristics of a steering reaction and a vehicle body roll angle $\delta$ provided when the left or right risk potential RPc or RPd is high.
Figure 12B:
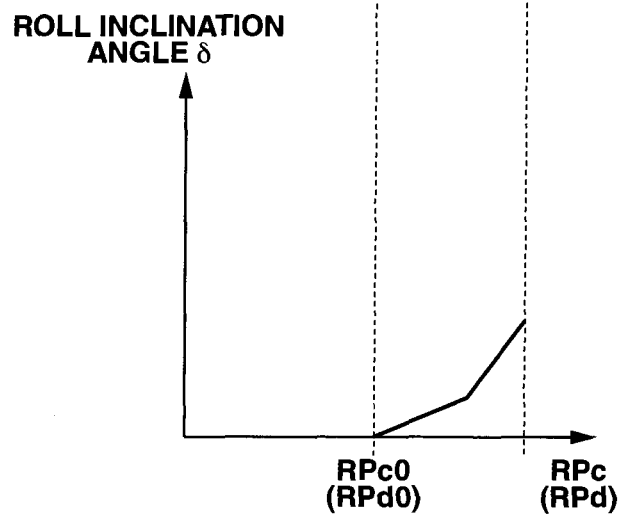

FIG. 11 schematically shows the control operation when right or left risk potential RPc or RPd is high. FIG. 11 shows the vehicle as viewed from the rear when the right risk potential RPc is high, as an example. FIGS. 12A and 12B show characteristics of the steering reaction and the vehicle body roll angle δ provided when right or left risk potential RPc or RPd is high.

When right risk potential RPc is higher than or equal to its threshold RPc0, the steering reaction is increased in accordance with right risk potential RPc, as shown in FIG. 12A, and the resistance to turning the steering wheel further in the rightward direction is increased. Moreover, as shown in FIG. 11, the suspension strokes of the right active suspensions 4FR and 4RR are varied in accordance with the right risk potential RPc. By controlling the suspension strokes of right suspensions 4FR and 4RR in accordance with right risk potential RPc, the control system can give the driver a feeling of right turning motion of the vehicle 1A, and left rolling motion of the vehicle body 3. In this case, the roll angle δ of the vehicle body (the lateral inclination angle of the vehicle body) is increased in accordance with right risk potential RPc, as shown in FIG. 12B. Therefore, the driver feels that the vehicle 1A is turned right with greater momentum as the right risk potential is higher. By guiding the driver into a driving operation in this way, the control system can prompt the driver to do a left steering operation. When the left steering operation is performed by the driver, the right risk potential RPc becomes lower, and controller 50 terminates the inducing operation at step P105.

Similarly, when left risk potential RPd is higher than its threshold RPd0, the steering reaction is increased in accordance with left risk potential RPd, and the resistance to turning the steering wheel further in the leftward direction is increased. Moreover, the suspension strokes of the left active suspensions 4FL and 4RL are varied in accordance with the left risk potential RPd. By controlling the suspension strokes of left suspensions 4FL and 4RL in accordance with left risk potential RPd, the control system can give the driver a feeling of left turning motion of the vehicle 1A, and right rolling motion of the vehicle body 3. In this case, the roll angle δ of the vehicle body (the lateral inclination angle of the vehicle body) is increased in accordance with left risk potential RPd, as shown in FIG. 12B. Therefore, the driver feels that the vehicle 1A is turned left with greater momentum as the left risk potential is higher. By guiding the driver in this way, the control system can prompt the driver to do a right steering operation. When the right steering operation is performed by the driver, the left risk potential RPd becomes lower, and controller 50 terminates the inducing operation at step P106.

When the front and rear risk potentials RPa and RPb are both higher than the respective thresholds RPa0 and RPb0, it is possible to select one of the inducement control operation of P103 for the increase of front risk potential RPa and the inducement control operation of P104 for the increase of rear risk potential RPa, by comparing the increase of front risk potential RPa and the increase of rear risk potential RPb. In this case, for example, the control system may be configured to compare the absolute value of the excess quantity (RPa−RPa0) of front risk potential RPa beyond threshold RPa0 and the absolute value of the excess quantity (RPb−RPb0) of rear risk potential RPb beyond threshold RPb0, and to give priority to the inducement control operation for the greater absolute value of the excess quantity. Alternatively, it is possible to perform neither of the inducement control operations for the front and rear risk potential increases. When the right and left risk potentials RPc and RPd are both higher than the respective thresholds RPc0 and RPd0, it is possible to select one of the inducement control operation of P105 for the increase of right risk potential RPc and the inducement control operation of P106 for the increase of left risk potential RPd, by comparing the increase of right risk potential RPc and the increase of left risk potential RPb in the same manner for the comparison between the front and rear risk potential increases. For example, priority is given to a greater one of the absolute value of the excess quantity (RPc−RPc0) of right risk potential RPa beyond threshold RPc0 and the absolute value of the excess quantity (RPd−RPd0) of left risk potential RPd beyond threshold RPb0. Alternatively, it is possible to perform neither of the inducement control operations for the left and right risk potential increases. It is possible to perform the inducement control operation for the front or rear risk potential increase and the inducement control operation for the left or right risk potential increase, simultaneously.

Figure 40:
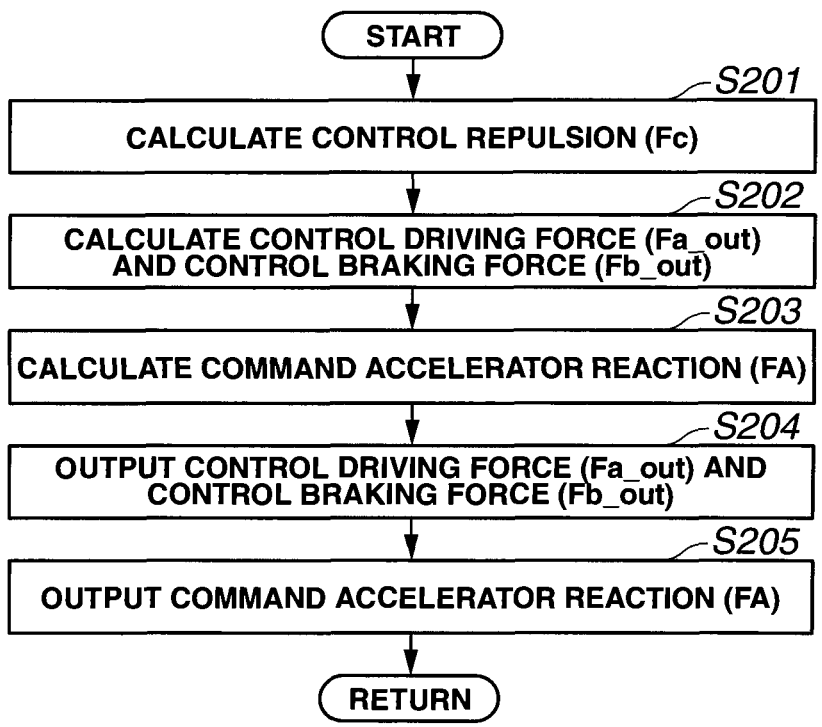
FIG. 40 is a flowchart showing a longitudinal driving operation support control process which can be performed by controller 50 in each of the preceding embodiments.
Figure 41A:
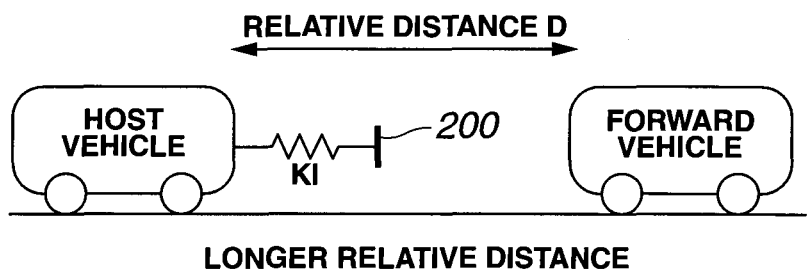
FIGS. 41A and 41B are schematic views illustrating a longitudinal force control in the longitudinal driving operation support control process.
Figure 41B:
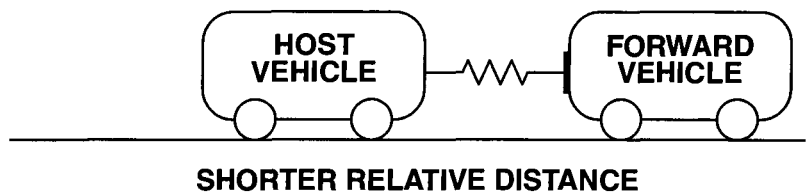
Figure 42:
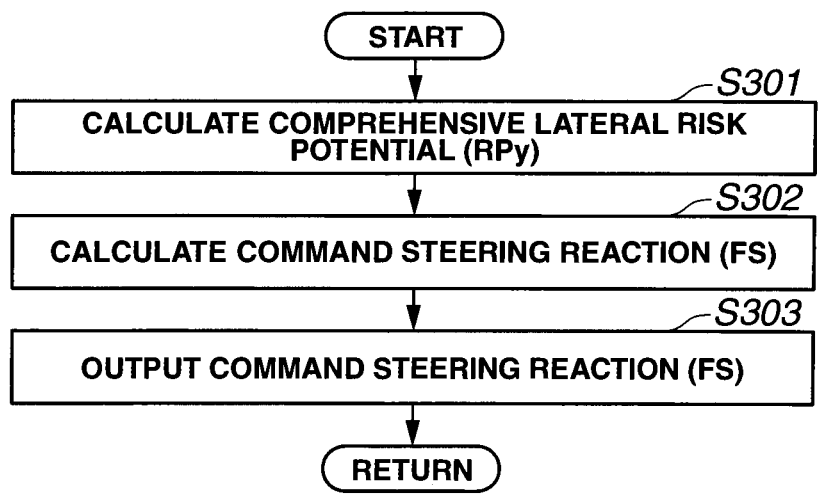
FIG. 42 is a flowchart showing a lateral driving operation support control process.

It is possible to employ a driving operation support control for the vehicle longitudinal direction and a driving operation support control for the vehicle lateral direction, as shown in FIGS. 40~42, and as explained later.

(Operations)

When the risk potential in one of the forward, rearward, rightward and leftward directions exceeds its threshold during a running operation of vehicle 1A, the control system controls the active suspensions in dependence on the direction in which the risk potential becomes higher, and thereby produces a pseudo vehicle behavior. In this example, the control system inclines the vehicle body 3 rearwards when the risk potential is high in the forward direction, inclines the vehicle body 3 forwards when the risk potential is high in the rearward direction, rolls the vehicle body 3 leftwards when the risk potential is higher in the rightward direction, and rolls the vehicle body 3 rightwards when the left risk potential is high in the leftward direction.

Therefore, the driver feels that the vehicle is approaching in the direction in which the risk potential becomes higher, and performs the driving operation in the direction decreasing the risk potential. In this way, the control system can induce the driver to an adequate driving operation. Furthermore, the control system increases the operational reaction added to the driving operation in the direction increasing the risk potential, and thereby restrains a driver's operation in the direction increasing the risk potential.

In the practical example of the first embodiment, at least one of steering wheel 5, accelerator pedal 7 and brake pedal 8 corresponds to an operation input section. At least one of vehicle speed sensor 30, vehicle condition sensing device 140, and normal acceleration sensors 130$i$ corresponds to a vehicle condition sensing section. At least one of cameras 9F, 9R, 9SR and 9SR, laser radar 10 and controller 50 corresponds to an obstacle sensing section. Controller 50 can be regarded as corresponding to at least one or risk potential calculating section, and driving operation inducement (assist) controlling section or pseudo behavior producing section. At least one of steering reaction control unit 60, accelerator reaction control unit 80 and brake reaction control unit 90 corresponds to an operational reaction imparting section. At least one of active suspensions 4$i$(FL~RR) and controller 50 corresponds to motion regulating section. At least one of active suspensions 4$i$(FL~RR) corresponds to a damping device.

Application Example 1

Figure 13:
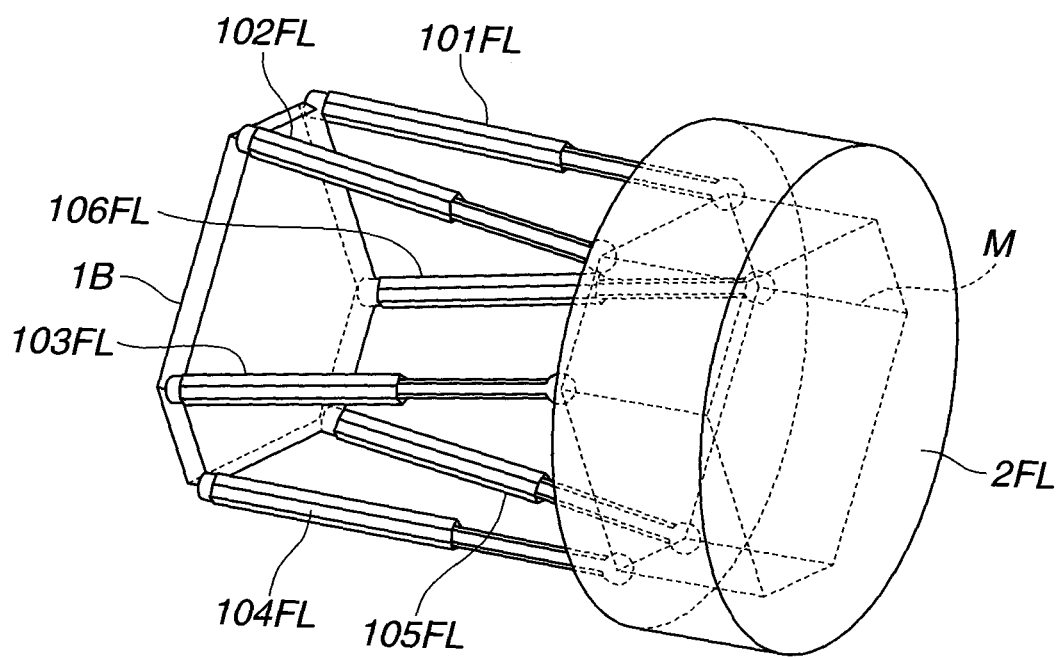
FIG. 13 a view showing a suspension structure of an application example 1.

FIG. 13 is a view for showing a suspension system which can be employed instead of the active suspension system 4$i$(FL~RR). In this example, each of the wheels 2$i$(FL~RR) is provided with an in-wheel motor, and connected with the vehicle body 3 through a suspension unit including a plurality of direct acting type actuators. Since the suspension units for the four wheels are the same, FIG. 13 shows only the suspension unit for the front left wheel 2FL, as an example. The suspension unit shown in FIG. 13 includes six actuators 101FL~106FL arranged between a hexagonal support plate 1B fixed to vehicle body 3 and an in-wheel motor M. Each of actuators 101FL~16FL includes a cylinder connected, through a ball joint, with one of the six vertexes of hexagonal support plate 1B, and a driving rod extending to a forward end connected, through a ball joint, with the in-wheel motor M at a position corresponding to the vertex of support plate 1B.

These six actuators 101FL~106FL forms a parallel mechanism which can move the in-wheel motor M and wheel 2FL in a three dimensional manner by controlling the six actuators coordinately. Support plate 1B is fixed to a mounting surface of the vehicle body, and this mounting surface is vertical or slightly inclined downward to face in a downward slanting direction. Therefore, an overall extension/compression axis of the six actuators or the center axis of the suspension unit extends in a slanting direction slightly inclined downward from a horizontal direction.

Therefore, by controlling the movement of driving rods of six actuators, the control system can raise or lower the front or rear of the vehicle body 3, and adjust the conditions of each wheel, such as the steer angle, camber angle, toe angle, and a distance from vehicle body 3. With this suspension system of this example, the control system can perform the driving operation inducement control of FIG. 6. Moreover, this suspension system makes it possible to change the direction of vehicle body 3 relative to the four wheels. Therefore, the control system can change the direction of vehicle body without changing the directions of wheels 2i(FL~RR) to induce the driver to a proper driving operation.

When, for example, the right risk potential RPc is higher than threshold RPc0, the control system rotates the vehicle body 3 rightwards with respect to the wheels 2i(FL~RR) without changing the directions of wheels 2i(FL~RR), and thereby provides the driver a feeling of rightward movement of the vehicle. Accordingly, the driver steers the vehicle leftwards, and the right risk potential RPc becomes lower. Thus, the control system can induce the driver with a pseudo behavior of another form, in addition to the pseudo behavior of the first practical example of the first embodiment.

Application Example 2

It is possible to induce the driver to a proper driving operation by controlling a driver's seat, instead of the control of the vehicle body with the active suspension system 4i(FL~RR). The vehicle 1A of this application example includes a seat actuating system capable of varying the lengths of seat legs of driver's seat. For example, the seat actuating system includes four actuators capable of varying four seat legs of the driver's seat, respectively. With these actuators, the control system can incline the driver's seat, forward, rearward, leftward and rightward, relative to vehicle body 3.

With this seat actuating system, the control system can provide the driver a feeling of acceleration, deceleration, or rightward or leftward turning motion, and thereby induce the driver to a driving operation. Moreover, when the vehicle body is inclined in the forward or rearward directions or the left or right rolling direction, with an actual vehicle behavior, the control system can incline the driver's seat in the opposite direction with this seat actuating system so as to support the driver by facilitating a driver's operation. In this example, the seat actuating system corresponds to the motion regulating section.

Application Example 3

It is possible to combine the control of inclining the driver's seat in the application example 2, and the control of inclining the vehicle body in the practical example of the first embodiment. When the point of gaze of the driver is shifted closer to the host vehicle 1A, the driver feels the vehicle speed is higher than the actual vehicle. Therefore, the control system can prompt the driver to perform a driving operation by inclining the vehicle body rearwards and inclining the driver's seat forwards. In this way, the control system can enhance the effect of the inducement control by providing the driver a sense of acceleration by the inclination of the vehicle body, and a sense of higher vehicle speed by the inclination of the driver's seat, and thereby induce the driver to a braking operation effectively.

Application Example 4

It is possible to use audible message produced by a loudspeaker installed in the vehicle, in order to notify the driver of an increase of the risk potential, and to induce a driver's driving operation. For example, the control system can provide the driver a sense of a following vehicle approaching the host vehicle 1A by producing a sound simulating a running noise or sound of the following vehicle with a loudspeaker disposed in the rear part of the vehicle.

Application Example 5

Driving operation inducement control shown in FIGS. 14~18 according to this application example employs a plurality of thresholds for each of the right and left risk potentials RPc and RPd, unlike the inducement control of the practical example of the first embodiment shown in FIG. 6 using the single threshold Pc0 or Pd0. More specifically, the controller 50 of this application example uses a risk potential threshold for imparting the operational reaction, and a risk potential threshold for imparting a roll inclination angle. In this example, controller 50 further employs a risk potential threshold for stopping a variation of the suspension stroke.

Figure 14:
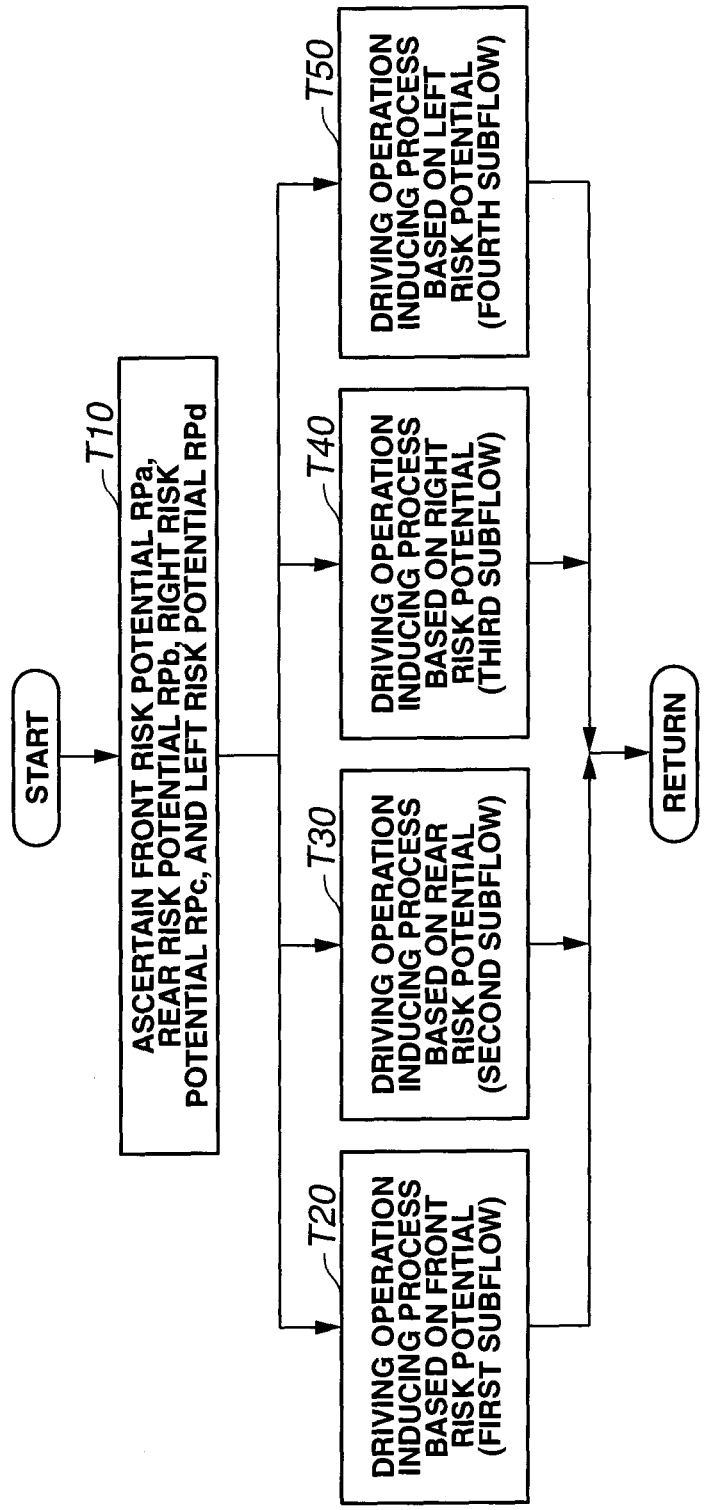
FIG. 14 is a flowchart showing a driving operation inducing process of an application example 5.

FIG. 14 is a flowchart showing the driving operation inducement control process of the application example 5, and FIGS. 15~18 show subflows performed in the inducement control process of FIG. 14. At a step T10, controller 50 obtains the front, rear, right and left risk potentials RPa, RPb, RPc and RPd calculated in the risk potential calculating process.

Figure 15:
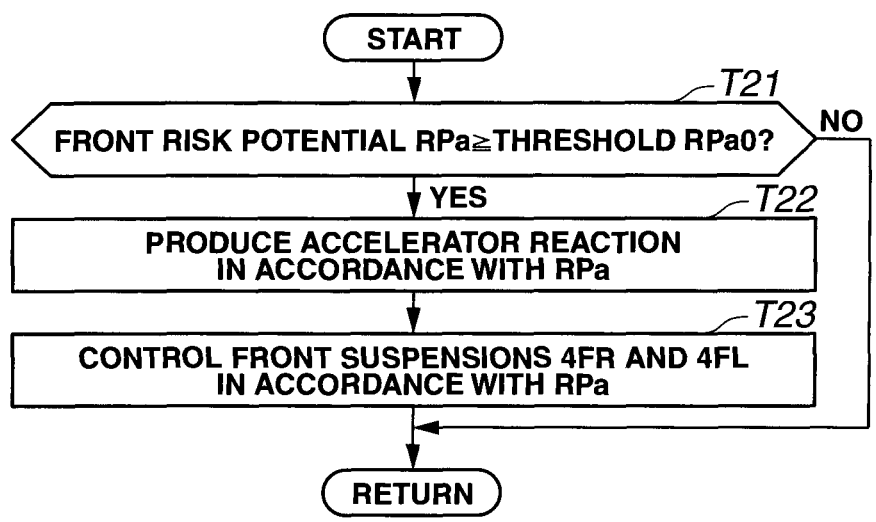
FIG. 15 is a flowchart showing a first subflow shown in FIG. 14.

Then, at a step T20, controller 50 performs a first subflow of FIG. 15 by using front risk potential RPa obtained at T10. At a step T21 of FIG. 15, controller 50 compares the front risk potential RPa with threshold RPa0, and determines whether front risk potential RPa is higher than or equal to threshold RPa0. When front risk potential RPa is higher than or equal to front risk potential threshold RPa0, then controller 50 proceeds from T21 to a step T22, and increases the accelerator pedal reaction in accordance with front risk potential RPa as in the practical example of the first embodiment. Then, controller 50 varies the suspension strokes of front active suspensions 4FL and 4FR in accordance with front risk potential RPa at T23. After T23, controller 50 returns to the main flow of FIG. 14 to repeat the operation inducement control process. When front risk potential RPa is lower than threshold RPa0, controller 50 returns to the main flow of FIG. 14.

Figure 16:
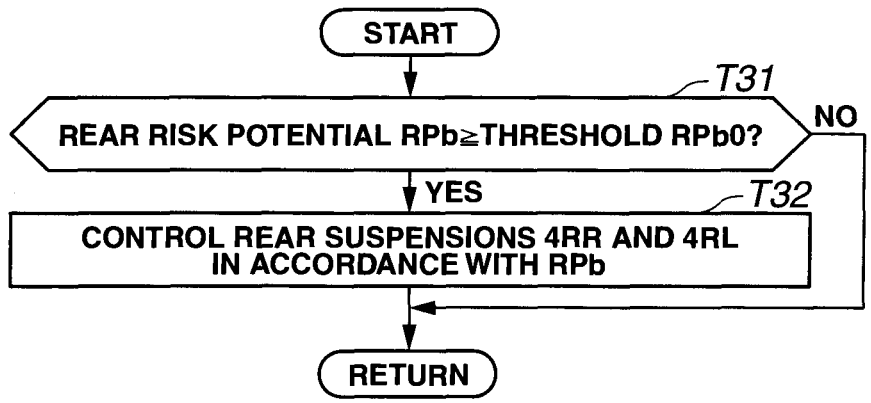
FIG. 16 is a flowchart showing a second subflow shown in FIG. 14.

In accordance with rear risk potential RPb obtained at T10, controller 50 performs a second subflow at T30. In the second subflow, as shown in FIG. 16, controller 50 compares the rear risk potential RPb with threshold RPb0 at a step T31, and thereby determines whether rear risk potential RPb is higher than or equal to threshold RPb0. When rear risk potential RPb is higher than or equal to rear risk potential threshold RPb0, then controller 50 proceeds from T31 to a step T32, and varies the suspension strokes of rear active suspensions 4RL and 4RR in accordance with rear risk potential RPb at T32. After T32, controller 50 returns to the main flow of FIG. 14 to repeat the operation inducement control process. When rear risk potential RPb is lower than threshold RPb0, controller 50 returns to the main flow of FIG. 14.

Figure 17:
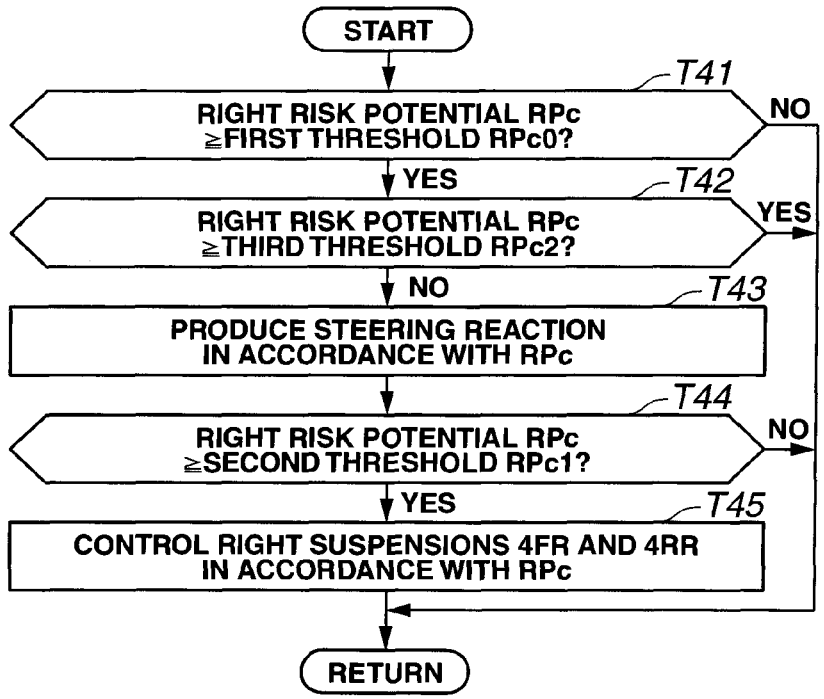
FIG. 17 is a flowchart showing a third subflow shown in FIG. 14.

In accordance with right risk potential RPc obtained at T10, controller 50 performs a third subflow at T40. In the third subflow, as shown in FIG. 17, controller 50 compares the right risk potential RPc with a first right risk potential threshold RPc0 at a step T41, and thereby determines whether right risk potential RPc is higher than or equal to threshold RPc0. When right risk potential RPc is higher than or equal to first threshold RPc0, then controller 50 proceeds from T41 to a step T42, and further compares the right risk potential RPc with a third right risk potential threshold RPc2 at step T42, and thereby determines whether right risk potential RPc is lower than or equal to third threshold RPc2. When right risk potential RPc is lower than third threshold RPc2, controller 50 proceeds to a step T43 and increases the steering reaction in accordance with right risk potential RPc at T43.

Figure 19:
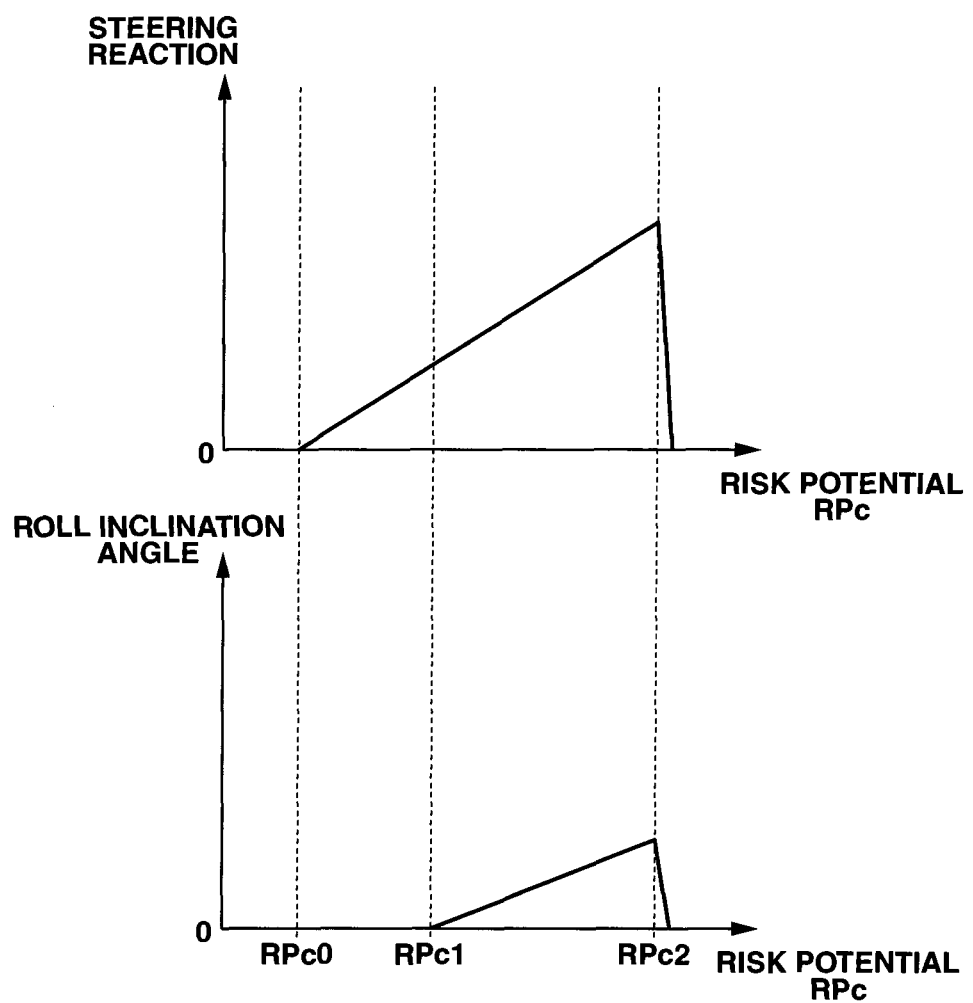
FIG. 19 is a graphic view for showing first and second thresholds RPc0 and RPc1 used in the third and fourth subflows of FIGS. 17 and 18.

In this application example, the first threshold RPc0 for initiating an increase of the steering reaction and the second threshold RPc1 for initiating an increase of the roll inclination angle are set as shown in FIG. 19. Accordingly, after T43, controller 50 compares right risk potential RPc with second threshold RPc1 which is greater than first threshold RPc0, to determine whether RPc is higher than or equal to RPc1, at a step T44. When right risk potential RPc is lower than second threshold RPc1, then controller 50 produces the steering reaction without the control operation for increasing the roll inclination angle.

When right risk potential RPc is higher than or equal to second threshold RPc1, then controller 50 increases the roll inclination angle at a step T45, in addition to the control operation to increase the steering reaction. Therefore, the control system can notify the driver of an increase of the right risk potential in a smooth and natural manner and thereby guide the driver properly.

Moreover, by setting the upper limit value in the form of third threshold RPc2 for the control of the steering reaction and the suspension stroke control, the control system imposes limitation on the driving operation inducement control in consideration of an increase of the right risk potential due to a lane marker or other object against which the host vehicle does not collide. Therefore, the control system can ensure the operability of the driver (the capability of override), cause the driver to feel an increase of the risk potential without unnatural feeling like a operation of crossing a lane marker, and support the driver adequately.

Controller 50 returns to the inducement control process when right risk potential RPc is judged to be lower than first threshold RPc0 at T41, and when right risk potential RPc is judged to be higher than or equal to third threshold RPc2 at T42. Furthermore, controller 50 returns to the inducement control process when right risk potential RPc is judged to be lower than second threshold RPc0 and after T45.

Figure 18:
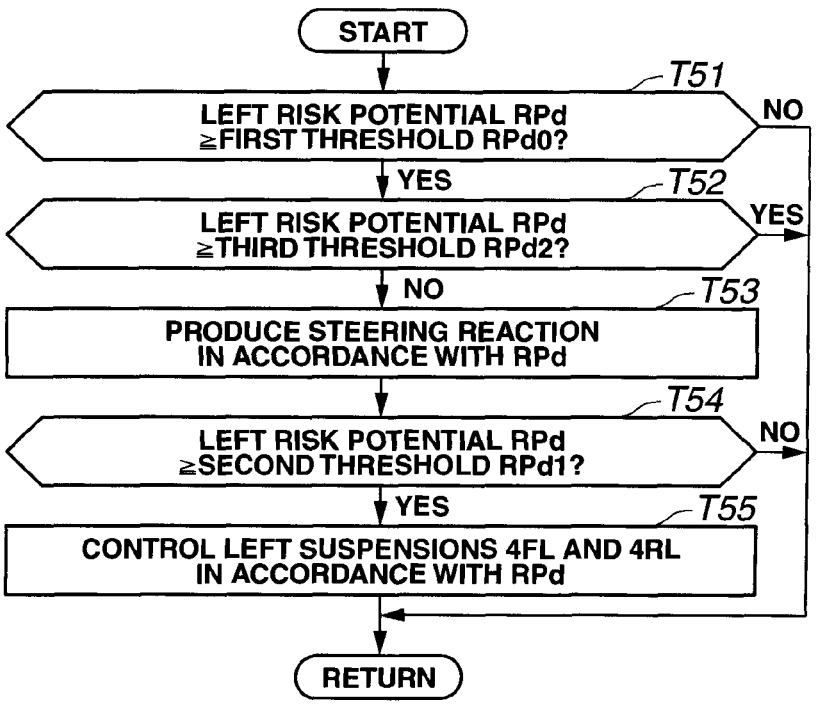
FIG. 18 is a flowchart showing a fourth subflow shown in FIG. 14.

In accordance with left risk potential RPd obtained at T10, controller 50 performs a fourth subflow at T50. In the fourth subflow, as shown in FIG. 18, controller 50 compares the left risk potential RPd with a first left risk potential threshold RPd0 at a step T51, and thereby determines whether left risk potential RPd is higher than or equal to first threshold RPd0. When left risk potential RPd is higher than or equal to first threshold RPd0, then controller 50 proceeds from T51 to a step T52, and further compares the left risk potential RPd with a third left risk potential threshold RPd2 at step T52, and thereby determines whether left risk potential RPd is lower than or equal to third threshold RPd2. When left risk potential RPd is lower than third threshold RPd2, controller 50 proceeds to a step T53 and increases the steering reaction in accordance with left risk potential RPd at T53.

In this application example, the first threshold RPd0 for initiating an increase of the steering reaction and the second threshold RPd1 for initiating an increase of the roll inclination angle are set in the same manner as the right risk potential shown in FIG. 19. Accordingly, after T53, controller 50 compares left risk potential RPd with second threshold RPd1 which is greater than first threshold RPd0, to determine whether RPd is higher than or equal to RPd1, at a step T54. When left risk potential RPd is lower than second threshold RPd1, then controller 50 produces the steering reaction without the control operation for increasing the roll inclination angle.

When left risk potential RPd is higher than or equal to second threshold RPd1, then controller 50 increases the roll inclination angle at a step T55, in addition to the control operation to increase the steering reaction. Therefore, the control system can notify the driver of an increase of the left risk potential in a smooth and natural manner and thereby guide the driver properly.

Moreover, by setting the upper limit value in the form of third threshold RPd2 for the control of the steering reaction and the suspension stroke control, the control system imposes limitation on the driving operation inducement control in consideration of an increase of the left risk potential due to a lane marker or other object against which the host vehicle does not collide. Therefore, the control system can ensure the operability of the driver (the capability of override), cause the driver to feel an increase of the risk potential without unnatural feeling like a operation of crossing a lane marker, and supports the driver adequately.

Controller 50 returns to the inducement control process when left risk potential RPd is judged to be lower than first threshold RPd0 at T51, and when left risk potential RPd is judged to be higher than or equal to third threshold RPd2 at T52. Furthermore, controller 50 returns to the inducement control process when left risk potential RPd is judged to be lower than second threshold RPd0 and after T55.

By using the left or right risk potential threshold for imparting the steering reaction and the left or right risk potential threshold for producing a pseudo vehicle behavior, separately, the control system can start the steering reaction control and the inducement control at respective effective timings, so that the control system can achieve an adequate driving support control.

Application Example 6

Figure 20:
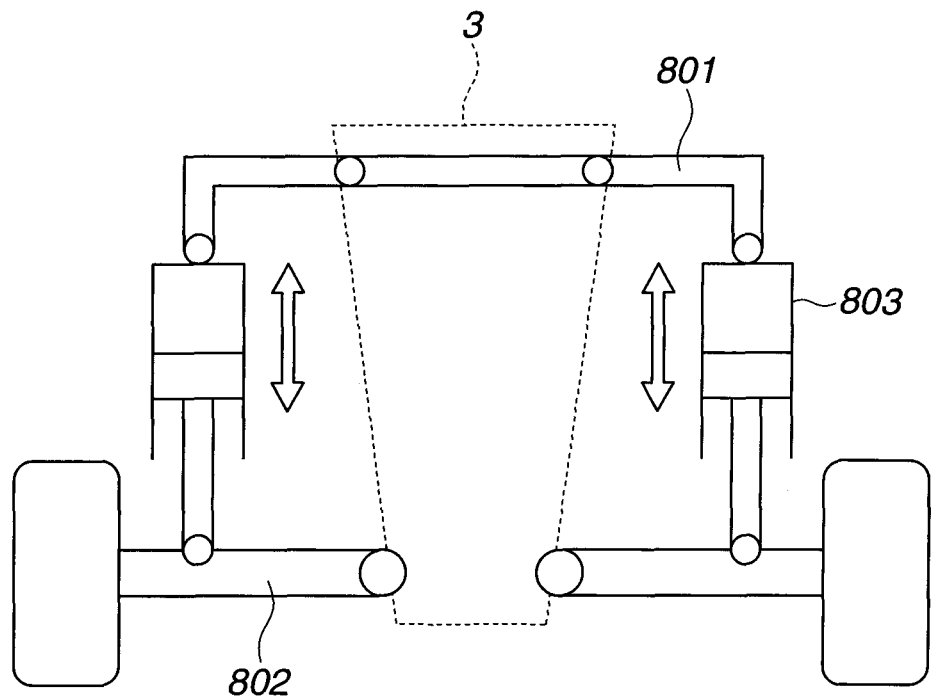
FIG. 20 is a schematic view showing a suspension structure of an application example 6.

FIGS. 20 and 21 shows a suspension system of an application example 6, for producing a pseudo vehicle behavior in accordance with a lateral (right or left) risk potential in the left and right direction. The suspension system of this example is arranged to vary the length of one or more stabilizer links with an actuator such as a hydraulic cylinder actuator, to control the roll inclination angle of vehicle body 3 to achieve the driving operation inducement control.

FIG. 20 is a rear view showing the suspension structure viewed from the rear of the vehicle. As shown in FIG. 20, each of left and right actuators 803 is connected between a stabilizer 801 fixed, at an inboard end, to vehicle body 3, and a suspension lower arm 802 connected with one of the wheels, and arranged to vary a link length between the stabilizer 801 and suspension lower arm 802. This suspension system can vary the roll inclination angle of the body of vehicle 1A by varying the difference between the stroke lengths of left and right actuators 803. In this example, the suspension system includes four of the actuators 803$i$(FL~RR) for the four wheels 2$i$(FL~RR).

Figure 21A:
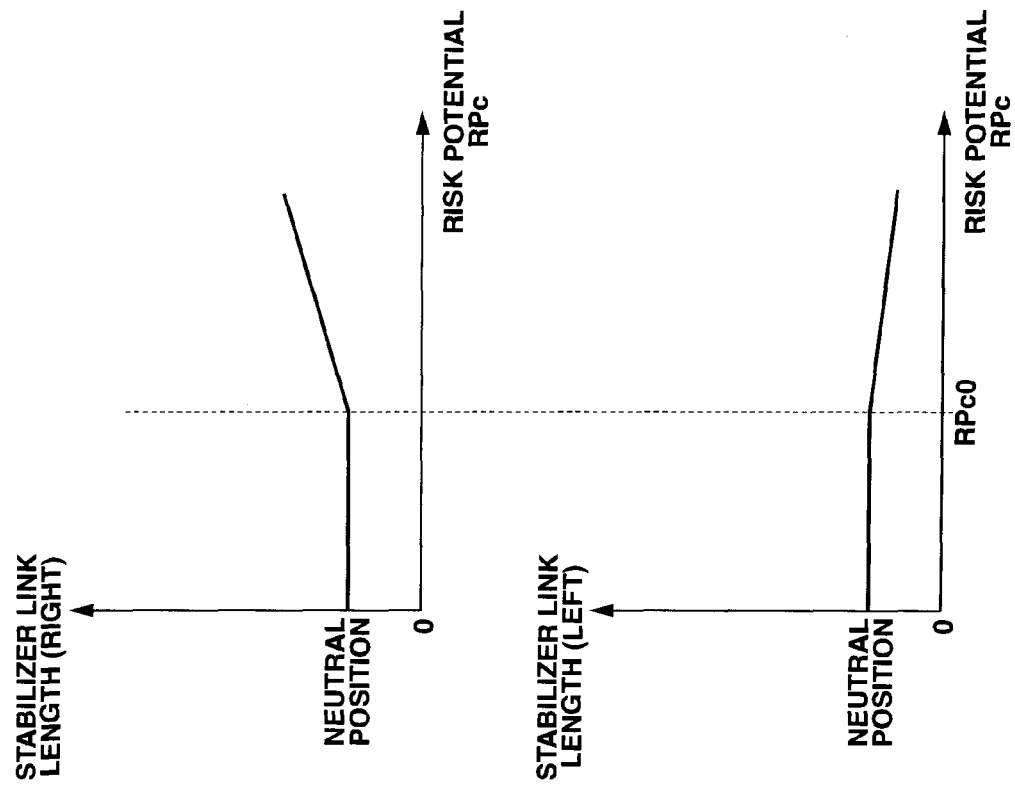
FIGS. 21A and 21B are graphic views showing characteristics of stabilizer link length provided when the right risk potential (RPc) is high.
Figure 21B:
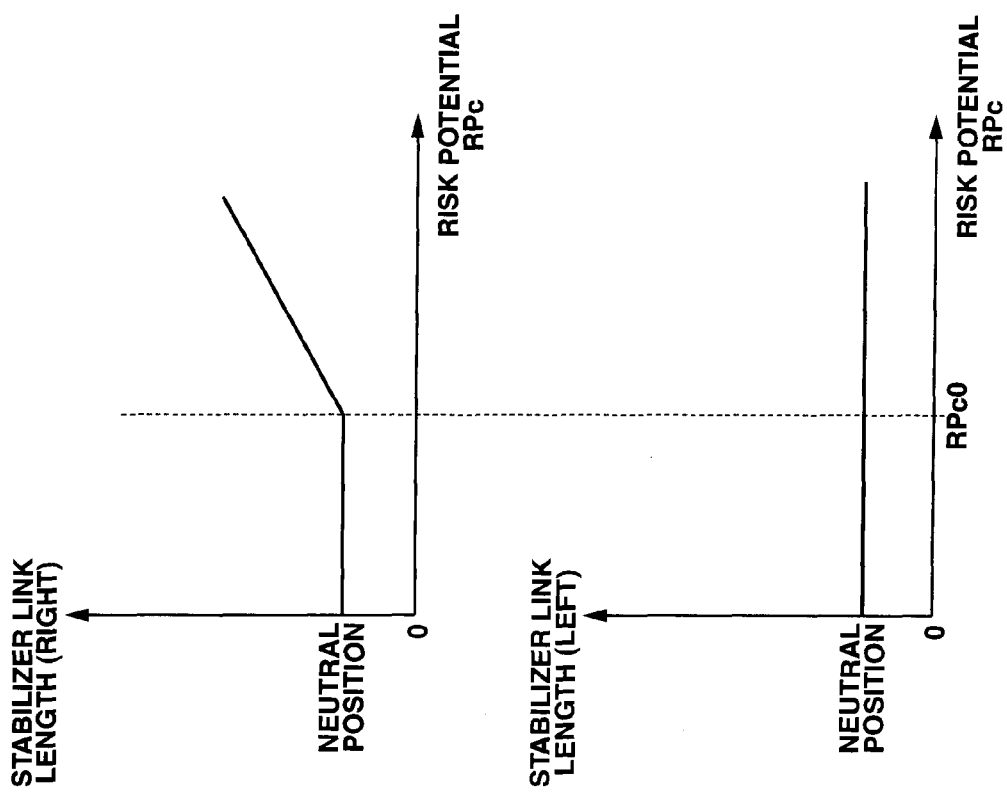

FIGS. 21A and 21B show first and second examples of a characteristic of the stabilizer link length provided when right risk potential becomes high. When right risk potential RPc is higher than or equal to threshold RPc0, in the first example shown in FIG. 21A, the right side stabilizer link length is increased from a value at a neutral position, in accordance with right risk potential RPc while the left side stabilizer link length is held unchanged at the neutral position. Consequently, the vehicle body is inclined in the lateral direction to increase the roll inclination angle (leftward roll), and the control system can inform the driver of an increase of right risk potential RPc to induce a driver's leftward steering operation.

In the second example shown in FIG. 21B, when right risk potential RPc is higher than or equal to threshold RPc0, the control system increases the right side stabilizer link length and at the same time decreases the left side stabilizer link length from the neutral position in accordance with the right risk potential RPc. In this case, the control system can increase the roll inclination angle of the vehicle effectively without increasing the stroke variation widths of the actuators too much. This suspension system can be used for producing vibration in accordance with the left or right risk potential as in a practical example of a later-mentioned second embodiment. In this way, the control system can induce a driver's driving operation in a direction decreasing the risk potential by producing a pseudo behavior with the suspension system of the application example 6.

Second Embodiment

Practical Example

FIGS. 22~28 show the inducement control (assist control) according to a second embodiment of the present invention which is different from the first embodiment only in the inducement control. The following explanation is directed mainly to the inducement control and repetitive explanation on the other aspects of the motor vehicle 1A is omitted.

Figure 22:
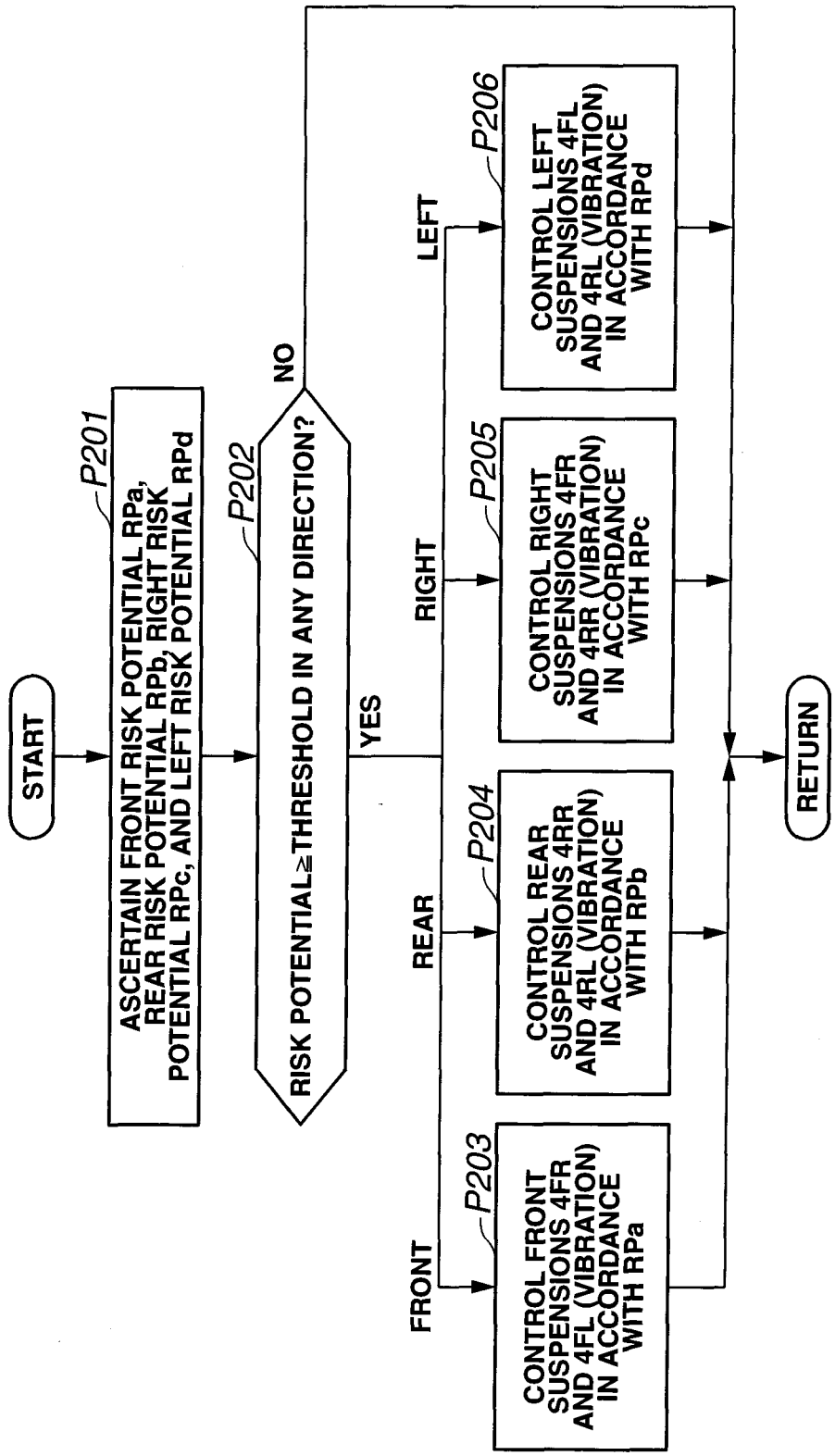
FIG. 22 is a flowchart showing a driving operation inducing control process performed by controller 50 according to a second embodiment.

FIG. 22 shows the driving operation inducement control process in the form of a flowchart. In the example of FIG. 22, the driving operation inducement control is a process for inducing a driver's driving operation by producing vibration in a part of the vehicle body with active suspensions 4(FL~RR) (or with the suspension system shown in FIG. 20, as mentioned before) and thereby providing a pseudo sense to the driver. Controller 50 starts this process in response to a driver's command.

At a step P201, controller 50 ascertains the front, rear, right and left risk potentials RPa, RPb, RPc and RPd calculated in the risk potential calculating process. Then, at a step P202, controller 50 compares the front, rear, right and left risk potentials RPa, RPb, RPc and RPd obtained at P201, respectively, with threshold values RPa0, RPb0, RPb0 and RPd0, and determines whether any of the risk potentials is greater than or equal to its threshold value. When none of the front, rear, right and left risk potentials are greater than the respective threshold values, controller 50 repeats the inducement control process of FIG. 22.

If front risk potential RPa is greater than or equal to front risk potential threshold RPa0, then controller 50 proceeds from P201 to a step P203, and vibrates the front active suspensions 4FL and 4FR with an amplitude determined in accordance with the front risk potential RPa at P203. Furthermore, at step P203, controller 50 varies the suspension strokes of front active suspensions 4FL and 4FR in accordance with the front risk potential RPa as in the example of FIG. 6 according to the first embodiment. Furthermore, at step P203, controller 50 increases the operational reaction of accelerator pedal 7 in accordance with front risk potential RPa. After P203, controller 50 repeats the operation inducement control process of FIG. 22.

Figure 23:
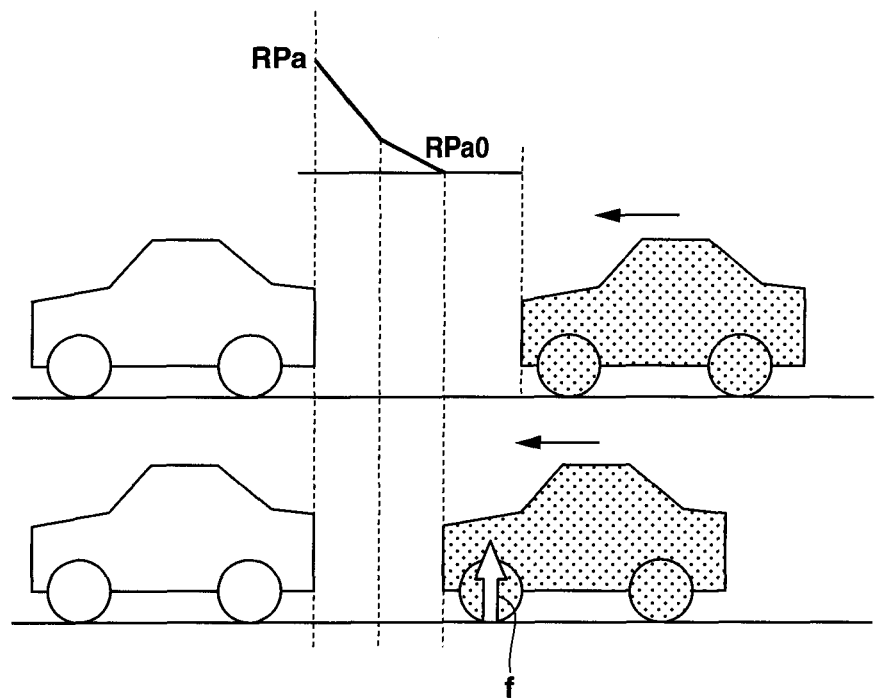
FIG. 23 is a schematic view for illustrating a control operation of the driving operation inducing control process of FIG. 22 when the front risk potential RPa is high.
Figure 24A:
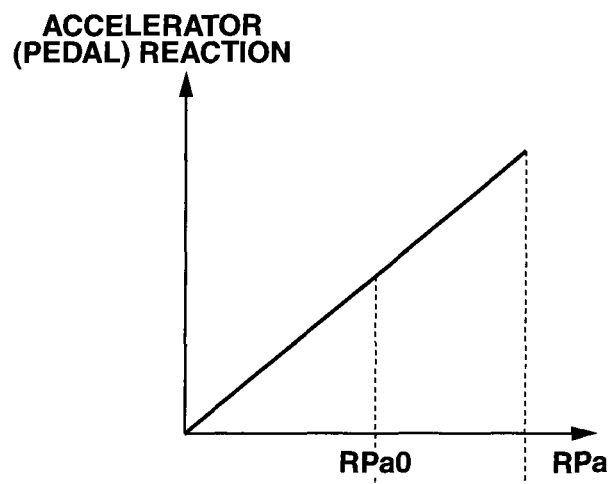
FIGS. 24A and 24B are graphic views showing characteristics of an accelerator (pedal) reaction and a suspension stroke vibration provided when the front risk potential RPa is high.
Figure 24B:
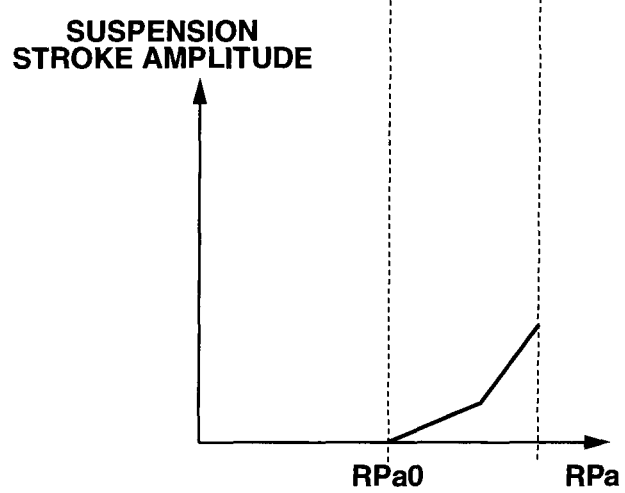

FIG. 23 schematically shows the control operation when front risk potential RPa is high. FIGS. 24A and 24B show characteristics of the accelerator pedal reaction and the suspension stroke vibrations provided when front risk potential RPa is high. FIG. 23 shows the vibration of the suspension stroke schematically, and the increase of the suspension stroke provided in the first embodiment is not shown in FIG. 23. (The same is applied to FIG. 25 and FIG. 27.) When front risk potential RPa is higher than threshold RPa0, the accelerator reaction is increased in accordance with front risk potential RPa, as shown in FIG. 24A, and hence the resistance to depressing accelerator pedal 7 is increased.

Moreover, as shown in FIG. 23, the suspension strokes of front suspensions 4FR and 4FL are vibrated with the amplitudes corresponding to front risk potential RPa, so that the driver can sense an increase of the risk potential in the forward direction. As shown in FIG. 24B, the amplitude of the suspension stroke of each front suspension 4FR or 4FL is increased with increase in front risk potential RPa, and the control system can transmit stronger vibrations to the driver as front risk potential RPa increases. Moreover, the suspension strokes of front suspensions 4FR and 4FL are varied, as in the example of FIG. 6 according to the first embodiment, so as to vary the body pitch angle β (the rearward inclination angle of the vehicle body), in accordance with front risk potential RPa. By controlling the suspension strokes of front suspensions 4FL and 4FR in accordance with front risk potential RPa, the control system can give the driver a feeling of acceleration of the vehicle 1A, as shown in FIG. 7. By guiding the driver into a driving operation in this way, the control system can prompt the driver to do a braking operation. When the braking operation is performed by the driver, the front risk potential RPa becomes lower, and controller 50 terminates the inducing operation at step P203.

If rear risk potential RPb is greater than or equal to rear risk potential threshold RPb0, then controller 50 proceeds from P202 to a step P204, and vibrates the rear active suspensions 4RL and 4RR with an amplitude determined in accordance with the rear risk potential RPb at P204. Furthermore, at step P204, controller 50 varies the suspension strokes of rear active suspensions 4RL and 4RR in accordance with the rear risk potential RPb as in the example of FIG. 6 according to the first embodiment. After P204, controller 50 repeats the operation inducement control process of FIG. 22.

Figure 25:
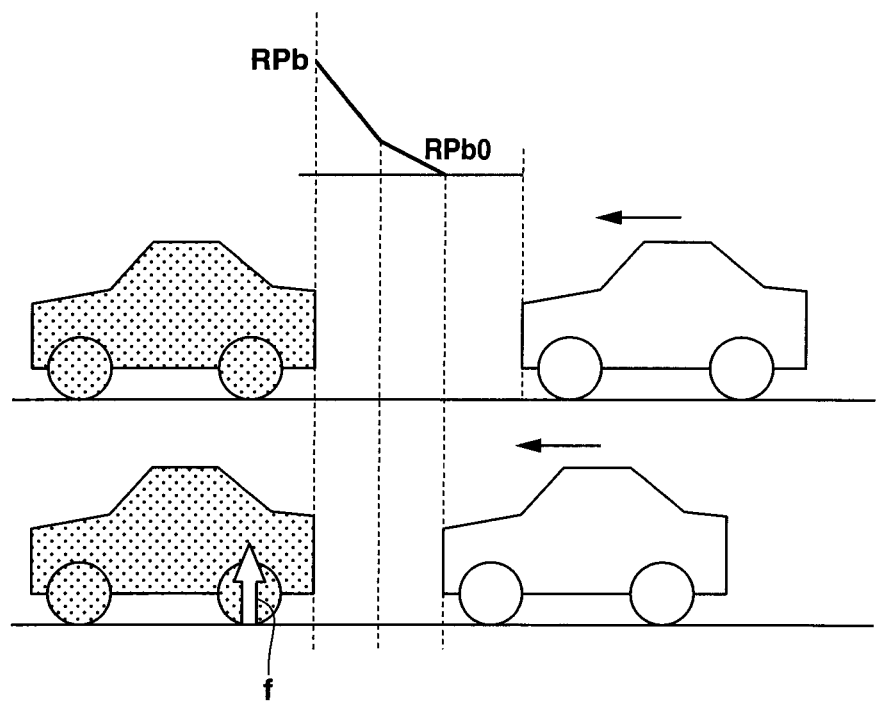
FIG. 25 is a schematic view for illustrating a control operation of the driving operation inducing control process of FIG. 22 when rear risk potential RPb is high.
Figure 26:
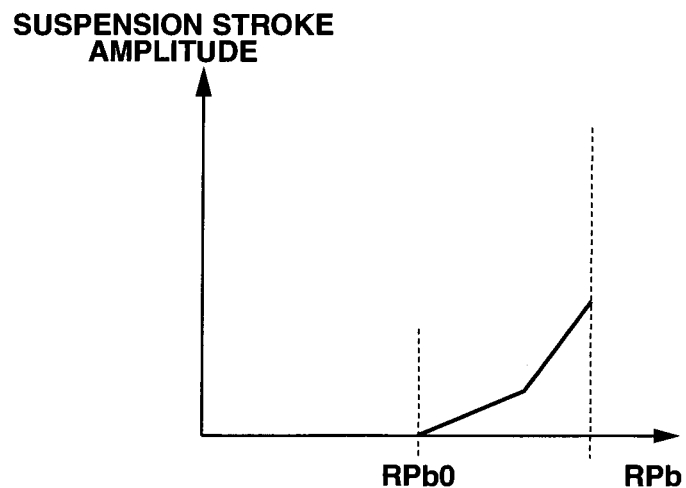
FIG. 26 is a graphic view showing a characteristic of a suspension stroke vibration provided when the rear risk potential RPb is high.

FIG. 25 is a view for illustrating the control operation when rear risk potential RPb is high. FIG. 26 shows a characteristic of vibration provided when rear risk potential RPb is high. When rear risk potential RPb is higher than its threshold RPb0, the suspension strokes of rear suspension 4RL and 4RR are vibrated with amplitudes corresponding to rear risk potential RPb, so that the driver can sense the direction in which the risk potential becomes high. As shown in FIG. 26, the amplitude of the suspension stroke of each rear suspension 4RL or 4RR is increased with increase in rear risk potential RPb, and the control system can transmit stronger vibrations to the driver as rear risk potential RPb increases. Moreover, the suspension strokes of rear suspensions 4RL and 4RR are varied, as in the example of FIG. 6 according to the first embodiment, so as to vary the body pitch angle γ (the forward inclination angle of the vehicle body), in accordance with rear risk potential RPb. By controlling the suspension strokes of rear suspensions 4RL and 4RR in accordance with rear risk potential RPb, the control system can give the driver a feeling of deceleration of the vehicle 1A, as shown in FIG. 9. Therefore, the driver feels that the vehicle 1A is decelerated with a greater deceleration as the rear risk potential is higher. By guiding the driver into a driving operation in this way, the control system can prompt the driver to do an accelerating operation. When the accelerating operation is performed by the driver, the rear risk potential RPb becomes lower, and controller 50 terminates the inducing operation at step P204.

If right risk potential RPc is greater than or equal to right risk potential threshold RPc0, then controller 50 proceeds from P202 to a step P205, and vibrates the suspension strokes of right active suspensions 4FR and 4RR with the amplitudes corresponding to right risk potential RPc at P205. Moreover, at P205, controller 50 varies the suspension strokes of right suspensions 4FR and 4RR in accordance with right risk potential RPc, as in the example of FIG. 6. After P205, controller 50 repeats the operation inducting control process. If left risk potential RPd is greater than left risk potential threshold RPd0, then controller 50 proceeds from P202 to a step P206, and vibrates the suspension strokes of left active suspensions 4FL and 4RL with the amplitudes corresponding to left risk potential RPd at P206. Moreover, at P206, controller 50 varies the suspension strokes of left suspensions 4FLR and 4RL in accordance with left risk potential RPd, as in the example of FIG. 6. After P206, controller 50 repeats the operation inducting control process.

Figure 27:
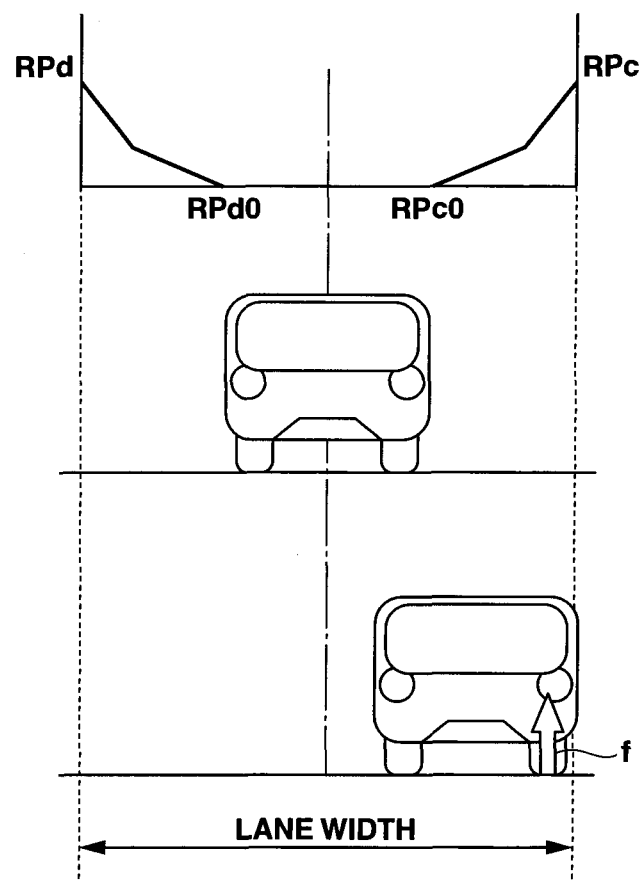
FIG. 27 is a schematic view for illustrating a control operation of the driving operation inducing control process when a right or left risk potential RPc or RPd is high.
Figure 28A:
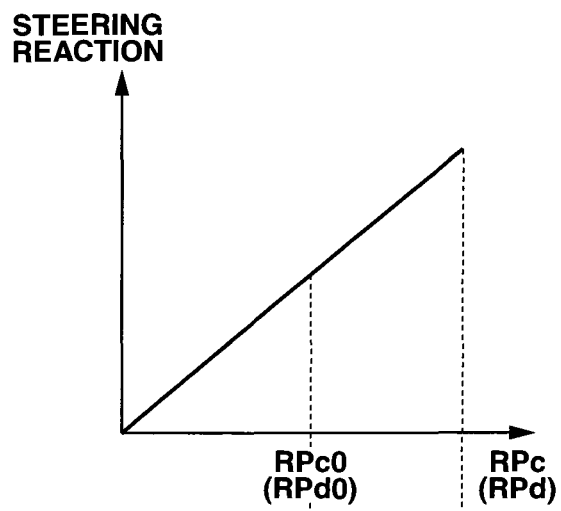
FIGS. 28A and 28B are graphic views showing characteristics of a steering reaction and a suspension stroke vibration provided when the right or left risk potential RPc or RPd is high.
Figure 28B:
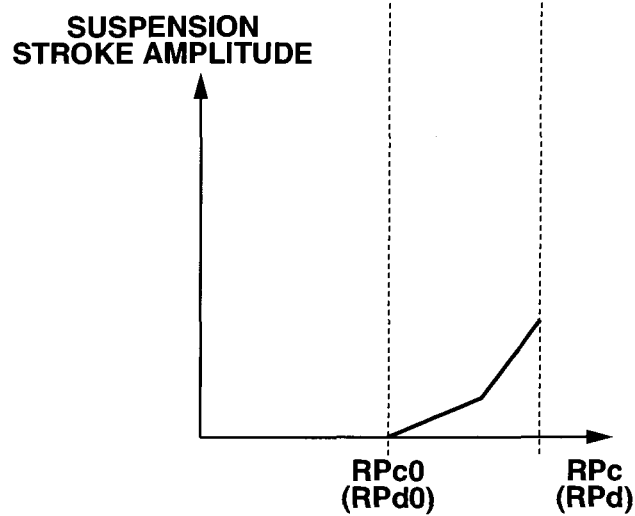

FIG. 27 schematically shows the control operation when right or left risk potential RPc or RPd is high. FIG. 27 shows the vehicle as viewed from the rear when the right risk potential RPc is high, as an example. FIGS. 28A and 28B show characteristics of the steering reaction and the suspension stroke vibrations provided when left or right risk potential RPc or RPd is high, at P205 or P206.

When right risk potential RPc is higher than its threshold RPc0, the steering reaction is increased in accordance with right risk potential RPc, as shown in FIG. 28A, and the resistance to turning the steering wheel further in the rightward direction is increased. Moreover, as shown in FIG. 27, the suspension strokes of the right active suspensions 4FR and 4RR are vibrated with amplitudes corresponding to right risk potential RPc. Therefore, the driver can sense the increase of the risk potential in the rightward direction. In this case, the driver feels pseudo bumpy or irregular movement. As shown in FIG. 28B, the amplitude of the suspension stroke of each right suspension 4FR or 4RR is increased with increase in right risk potential RPc, and the control system can transmit stronger vibrations to the driver as right risk potential RPc increases. By controlling the suspension strokes of right suspensions 4FR and 4RR in accordance with right risk potential RPc, the control system can give the driver a feeling of right turning motion of the vehicle 1A, and left rolling motion of the vehicle body 3, as in the example of FIG. 6 of the first embodiment. By guiding the driver in this way, the control system can prompt the driver to do a left steering operation. When the left steering operation is performed by the driver, the right risk potential RPc becomes lower, and controller 50 terminates the inducing operation at step P205.

Similarly, when left risk potential RPd is higher its threshold RPd0, the steering reaction is increased in accordance with left risk potential RPd, and the resistance to turning the steering wheel further in the leftward direction is increased. Moreover, the suspension strokes of the left active suspensions 4FL and 4RL are vibrated with amplitudes corresponding to left risk potential RPd. Therefore, the driver can sense the increase of the risk potential in the leftward direction. As shown in FIG. 28B, the amplitude of the suspension stroke of each left suspension 4FLR or 4RL is increased with increase in left risk potential RPd, and the control system can transmit stronger vibrations to the driver as left risk potential RPd increases. Moreover, by controlling the suspension strokes of left suspensions 4FL and 4RL in accordance with left risk potential RPd, the control system can give the driver a feeling of left turning motion of the vehicle 1A, and right rolling motion of the vehicle body 3, as in the example of FIG. 6 of the first embodiment. By guiding the driver in this way, the control system can prompt the driver to do a right steering operation.

When the front and rear risk potentials RPa and RPb are both higher than the respective thresholds RPa0 and RPb0, it is possible to select one of the inducement control operation of P203 for the increase of front risk potential RPa or the inducement control operation of P204 for the increase of rear risk potential RPa, by comparing the increase of front risk potential RPa and the increase of rear risk potential RPb. In this case, for example, the control system may be configured to compare the absolute value of the excess quantity (RPa−RPb0) of front risk potential RPa beyond threshold RPa0 and the absolute value of the excess quantity (RPb−RPb0) of rear risk potential RPb beyond threshold RPb0, and to give priority to the inducement control operation for the greater absolute value of the excess quantity.

Alternatively, it is possible to perform neither of the inducement control operations for the front and rear risk potential increases. When the right and left risk potentials RPc and RPd are both higher than the respective thresholds RPc0 and RPd0, it is possible to select one of the inducement control operation of P205 for the increase of right risk potential RPc or the inducement control operation of P206 for the increase of left risk potential RPd, by comparing the increase of right risk potential RPc and the increase of left risk potential RPb in the same manner for the comparison between the front and rear risk potential increases. For example, priority is given to a greater one of the absolute value of the excess quantity (RPc−RPc0) of right risk potential RPa beyond threshold RPc0 and the absolute value of the excess quantity (RPd−RPd0) of left risk potential RPd beyond threshold RPb0. Alternatively, it is possible to perform neither of the inducement control operations for the left and right risk potential increases. It is possible to perform the inducement control operation for the front or rear risk potential increase and the inducement control operation for the left or right risk potential, simultaneously.

The driving operation support control system according to the second embodiment is operated as follows: If the risk potential becomes higher than the threshold in one of the forward, rearward, leftward and rightward direction of the vehicle during a running operation of vehicle 1A, then controller 50 controls active suspensions 4FL, 4FR, 4RL and 4RR in accordance with the direction of the risk potential increase, and thereby produce a pseudo vehicle behavior including a vibration of the suspension stroke and an inclination of the vehicle body. That is, the vehicle body 3 is inclined rearwards and the front suspension stroke for the front wheels is vibrated when the front risk potential becomes high. When the rear risk potential becomes high, the vehicle body 3 is inclined forwards and the rear suspension stroke for the rear wheels is vibrated. When the right risk potential becomes high, the vehicle body 3 is rolled leftwards and the right suspension stroke for the front and rear right wheels is vibrated. When the left risk potential becomes high, the vehicle body 3 is rolled rightwards and the left suspension stroke for the front and rear left wheels is vibrated.

Therefore, the driver feels that the vehicle is approaching toward a risk in a direction increasing the risk potential, or feels movements of tires treading on a lane marker having projections and depressions, for example. Thus, the driver is induced to perform a driving operation in a direction decreasing the risk potential. Furthermore, the driver can sense the direction toward an obstacle increasing the risk potential from the position of the suspension stroke vibration. Since the magnitude of the vibration is determined by the value of the risk potential, the driver can sense the height of the risk potential. Moreover, the control system of this example increases the operational reaction against a driver's driving operation in a direction to increase the risk potential, and thereby curves a driver's operation in a direction increasing the risk potential.

The thus-constructed driving support control system according to the second embodiment monitors the risk potentials RPa–RPd in the forward, rearward, rightward and leftward direction for comparison with respective thresholds RPa0–RPd0, and controls the active suspensions 4FR–4RR to generate a pseudo vehicle behavior in a direction toward the high risk potential. By so doing, the control system can guide the driver to a driving operation to decrease the risk potential. Specifically, the driving support control system produces vibrations of the vehicle body with the suspension on the high risk side on which the risk potential becomes high, with the amplitude increased with the risk potential on the high risk side. Therefore, the driver can sense the direction and the magnitude of the risk potential. Moreover, the control system increases the operational reaction against the driving operation in the direction increasing the risk potential. Therefore, the driver can sense that the intended operation is improper, and restrain oneself from doing the improper operation.

Application Example 1

The control system in this application example according to the second embodiment is arranged to produce vibration in a part of the driver's seat to induce a proper driving operation of the driver, instead of vibration of the suspension stroke as in the practical example of the second embodiment.

In this example, a driver's seat have a plurality of seat legs each of which includes an actuator capable of varying a seat leg length in response to a control signal. In this example, the driver's seat actuating system includes four actuators which are right and left front actuators (700FR, 700FL) for varying the lengths of left and right front legs of the driver's seat, respectively, and right and left rear actuators (700RR, 700RL) for varying the lengths of left and right rear legs of the driver's seat. The control system can produce vibration with an amplitude corresponding to the risk potential RP in one or more of the seat leg lengths.

FIG. 29 shows the driving operation inducement control process. At a step T110, controller 50 ascertains the front, rear, right and left risk potentials RPa, RPb, RPc and RPd calculated in the risk potential calculating process. Then, at a step T120, controller 50 compares the front, rear, right and left risk potentials RPa, RPb, RPc and RPd obtained at T110, respectively, with threshold values RPa0, RPb0, RPb0 and RPd0, and determines whether any of the risk potentials is higher than or equal to its threshold value. When none of the front, rear, left and right risk potentials are higher than the respective threshold values, controller 50 repeats the inducement control process of FIG. 29.

If front risk potential RPa is higher than or equal to front risk potential threshold RPa0, then controller 50 proceeds from T120 to a step T130, and vibrates the front leg length of the driver seat with an amplitude determined in accordance with the front risk potential RPa at T130 by using the right and left front seat leg actuators (700FR and 700FL). Furthermore, at step T130, controller 50 inclines the driver's seat rearward relative to the vehicle body by varying the front seat leg length as in the application example 2 of the first embodiment. Furthermore, at step T130, controller 50 increases the operational reaction of accelerator pedal 7 in accordance with front risk potential RPa. After T130, controller 50 repeats the operation inducement control process of FIG. 29. Thus, the control system increases the accelerator reaction in accordance with front risk potential RPa to increase the resistance of the accelerator pedal, and vibrates the front part of the driver seat with an amplitude corresponding to front risk potential RPa. Therefore, the control system can notify the driver of an increase of the front risk potential and induce a driver's decelerating operation. When front risk potential RPa is decreased by the driver's decelerating operation, the control system terminates the inducement control operation of T130.

If rear risk potential RPb is higher than or equal to rear risk potential threshold RPb0, then controller 50 proceeds from T120 to a step T140, and vibrates the rear leg length of the driver's seat with an amplitude determined in accordance with the rear risk potential RPb at T140 by using the right and left rear seat leg actuators (700RR and 700RL). Furthermore, at step T140, controller 50 inclines the driver's seat forward relative to the vehicle body 3 by varying the rear seat leg length as in the application example 2 of the first embodiment, to induce a driver's accelerating operation. When the rear risk potential RPb is decreased as the result of a driver's accelerating operation, the control system stops the inducement control operation of T140. After T140, controller 50 repeats the inducement control process of FIG. 29.

If right risk potential RPc is higher than or equal to right risk potential threshold RPc0, then controller 50 proceeds from T120 to a step T150, and vibrates the right leg length of the driver's seat with an amplitude determined in accordance with the right risk potential RPc at T150 by using the front and rear right seat leg actuators (700FR and 700RR). Furthermore, at step T150, controller 50 inclines the driver's seat leftward (to produce a left roll of the driver's seat) relative to the vehicle body 3 by varying the right seat leg length as in the application example 2 of the first embodiment. Furthermore, controller 50 increases the steering reaction in accordance with right risk potential RPc to increase the resistance against a rightward steering operation. Thus, the control system induces a driver's leftward steering operation. When the right risk potential RPc is decreased as the result of a driver's leftward steering operation, the control system stops the inducement control operation of T150. After T150, controller 50 repeats the inducement control process of FIG. 29.

If left risk potential RPd is higher than or equal to left risk potential threshold RPc0, then controller 50 proceeds from T120 to a step T160, and vibrates the left leg length of the driver's seat with an amplitude determined in accordance with the left risk potential RPd at T160 by using the front and rear left seat leg actuators (700FL and 700RL). Furthermore, at step T160, controller 50 inclines the driver's seat rightward (to produce a right roll of the driver's seat) relative to the vehicle body 3 by varying the left seat leg length as in the application example 2 of the first embodiment. Furthermore, controller 50 increases the steering reaction in accordance with left risk potential RPd to increase the resistance against a leftward steering operation. Thus, the control system induces a driver's rightward steering operation. When the left risk potential RPd is decreased as the result of a driver's rightward steering operation, the control system stops the inducement control operation of T160. After T160, controller 50 repeats the inducement control process of FIG. 29.

Thus, the control system can notify the driver of an increase of the risk potential by producing vibration in a part of the driver's seat. In this example, the driver's seat or the seat leg actuators can serve as the motion regulating section.

Third Embodiment

Practical Example

Figure 30:
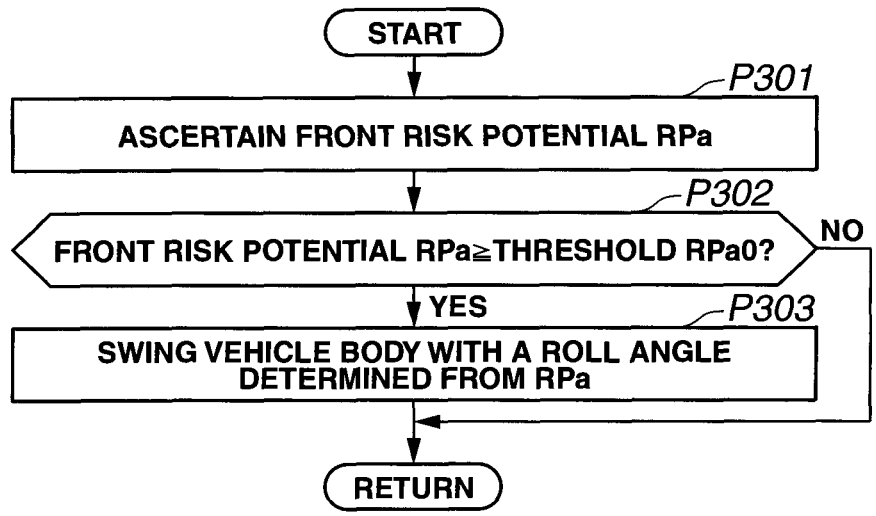
FIG. 30 is a flowchart showing a driving operation inducing process according to a third embodiment.

FIG. 30 shows the inducement control (assist control) process according to a third embodiment of the present invention which is different from the first embodiment only in the driving operation inducement control. The following explanation is directed mainly to the inducement control and repetitive explanation on the other aspects of the motor vehicle 1A is omitted.

At a step P301 of FIG. 30, controller 50 ascertains the front risk potential RPa calculated in the risk potential calculating process. Then, at a step P302, controller 50 compares the front risk potential RPa obtained at P301 with threshold RPa0, and determines whether front risk potential is higher than or equal to threshold RPa0. When front risk potential RPa is lower than threshold RPa0, then controller 50 repeats the inducement control process of FIG. 30.

When front risk potential RPa is higher than or equal to threshold RPa0, then controller 50 proceeds to a step P303. At P303, controller 50 performs a control operation to swing vehicle body 3 left and right in a rolling direction by varying or vibrating the right suspension stroke of right active suspensions 4FR and 4RR and the left suspension stroke of left active suspensions 4FL and 4RL alternately, with a roll angle corresponding to front risk potential RPa. Moreover, at P303, controller 50 increases the accelerator reaction in accordance with front risk potential RPa. After P303, controller 50 repeats the process of FIG. 30.

Figure 31:
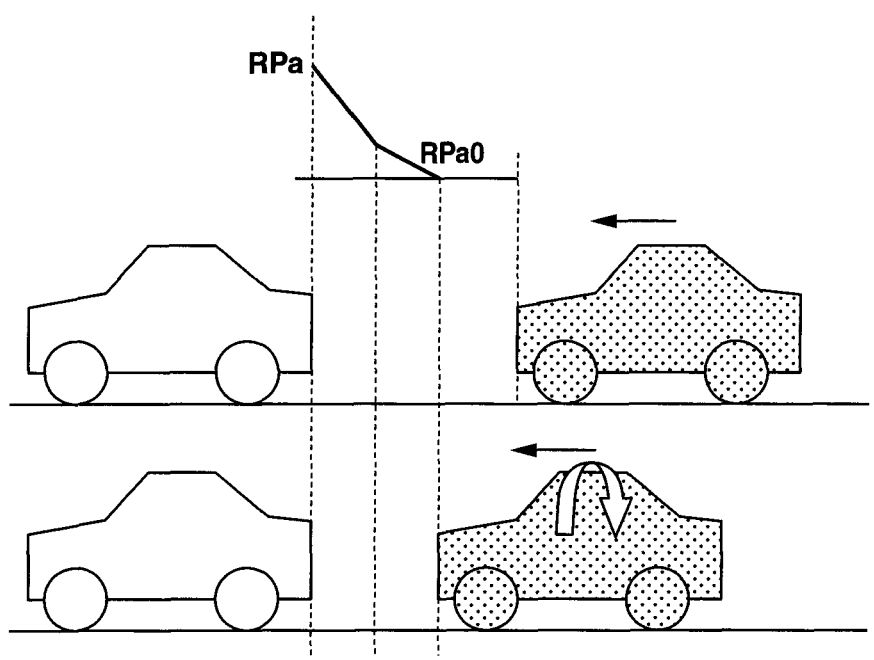
FIG. 31 is a schematic view for illustrating a control operation of the driving operation inducing control process when front risk potential RPa is high.
Figure 32A:
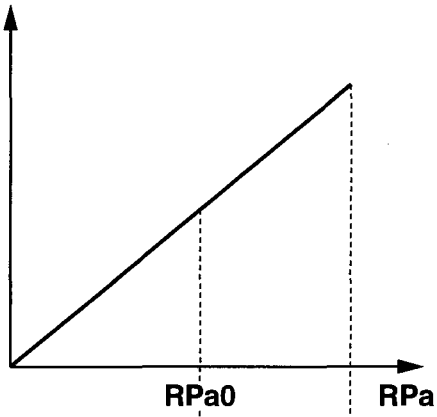
FIGS. 32A and 32B are graphic views showing characteristics of a steering reaction and a swing roll angle provided when the front risk potential RPa is high.
Figure 32B:
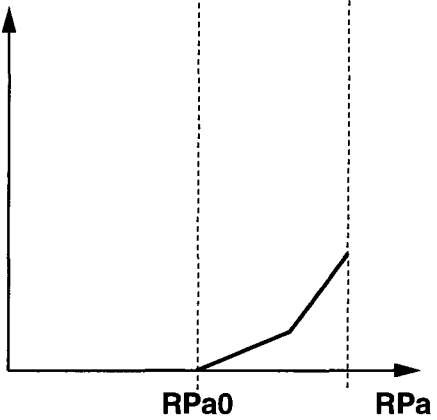

FIG. 31 schematically shows the control operation when front risk potential RPa is high. FIGS. 32A and 32B show characteristics of the accelerator pedal reaction and the swing roll angle of vehicle body provided when front risk potential RPa is high. When front risk potential RPa is higher than threshold RPa0, the accelerator reaction is increased in accordance with front risk potential RPa, as shown in FIG. 32A, and hence the resistance to depressing accelerator pedal 7 is increased. Moreover, as shown in FIG. 31, the vehicle body 3 is swung left and right with a roll angle width determined in accordance with front risk potential RPa, by controlling the right and left suspension strokes alternately with the right active suspensions 4FR and 4RR and the left active suspensions 4FL and 4RL. Therefore, the driver can feel an unstable condition of the vehicle. The roll angle of the swing motion of vehicle body 3 is increased with increase in front risk potential RPa as shown in FIG. 32B, so that the driver can feel the amount of increase of front risk potential RPa. Thus, the control system can induce a driver's decelerating operation. The inducement control operation of P303 is stopped when front risk potential RPa becomes lower. Thus, the control system of this practical example can induce the driver to a proper driving operation to decrease the risk potential effectively by producing a pseudo unstable behavior with the rolling swing motion of the vehicle body.

Fourth Embodiment

Practical Example

FIG. 33 shows the driving operation inducement control process in a practical example of a fourth embodiment. Steps P101, P102, P104, P105 and P106 are substantially identical to the corresponding steps in the inducement control process of FIG. 6 according to the practical example of the first embodiment. The process of FIG. 33 is different from the process of FIG. 6 in steps P401, P402 and P403, as explained below.

When front risk potential RPa is higher than or equal to threshold RPa0, then controller 50 proceeds from P102 to step P401, and examines whether the vehicle speed is higher than or equal to a predetermined speed threshold (80 km/h, for example), at P401. When the vehicle speed is higher than or equal to the predetermined speed threshold, then controller 50 proceeds from P401 to step P402. At step P402, controller 50 varies the suspension strokes of front active suspensions 4FL and 4FR in accordance with the front risk potential RPa. Furthermore, at step P402, controller 50 increases the operational reaction of accelerator pedal 7 in accordance with front risk potential RPa. After P402, controller 50 repeats the operation inducement control process of FIG. 33.

When the vehicle speed is lower than the speed threshold, then controller 50 proceeds from P401 to step P403. At P403, controller 50 swings the vehicle body 3 right and left by vibrating or varying the right suspension stroke of right active suspensions 4FR and 4RR and the left suspension stroke of left active suspensions 4FL and 4RL alternately. Moreover, at P403, controller 50 increases the accelerator reaction in accordance with front risk potential RPa. After P403, controller 50 repeats the process of FIG. 33.

In the case of an increase of front risk potential RPa, the control system of this example produces the pseudo vehicle behavior in two different modes in dependence on the vehicle speed. In the example of FIG. 33, the control system produces a pseudo unstable vehicle behavior with a rolling swing motion of vehicle body 3 in accordance with front risk potential RPa when the vehicle speed is lower than the predetermined speed threshold, and produces a pseudo accelerating vehicle behavior with a rearward inclination of vehicle body 3 so as to increase the pitch angle in accordance with front risk potential RPa when the vehicle speed is higher than the predetermined speed threshold. Moreover, the control system increases the accelerator pedal reaction in accordance with front risk potential RPa. In this way, the control system can induce a driver's decelerating operation effectively.

Fifth Embodiment

A fifth embodiment is different from the first embodiment only in the driving operation inducement control (assist control).

Practical Example

Figure 34:
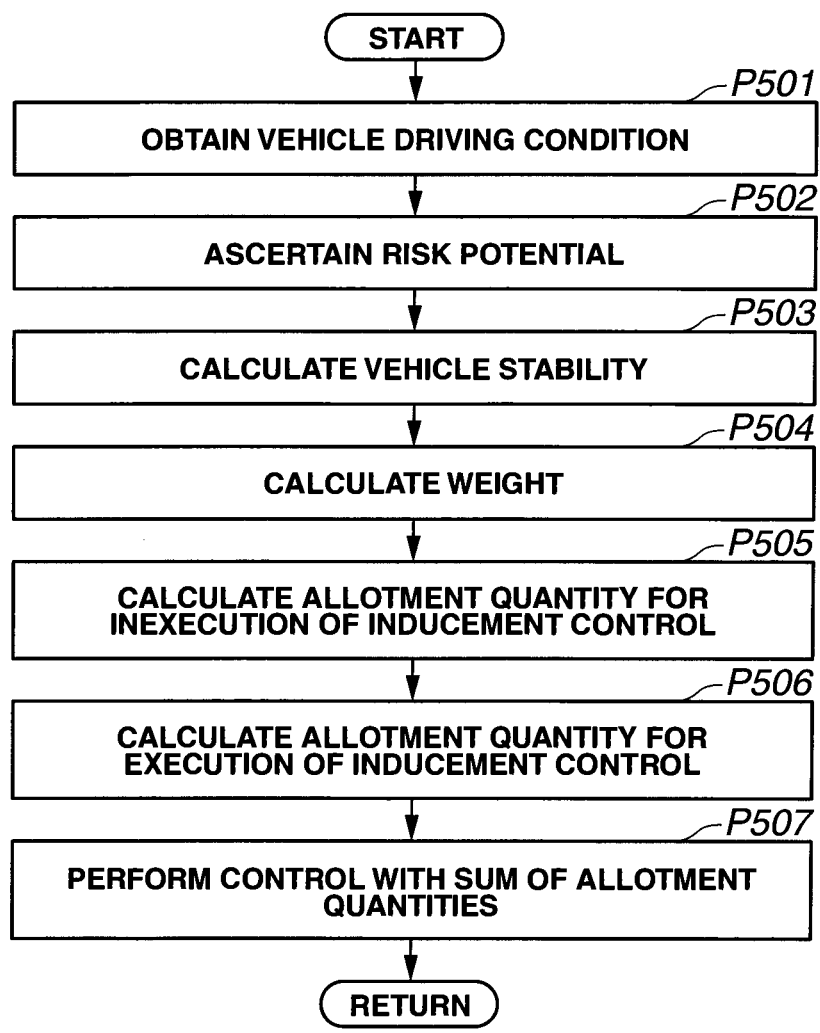
FIG. 34 is a flowchart showing a driving operation inducing process according to a fifth embodiment.

FIG. 34 shows a driving operation inducement control process in a practical example according to the fifth embodiment. Controller 50 starts the execution of this control process in response to a driver's command. At a first step P501, controller 50 obtains a vehicle driving condition including one or more of the vehicle speed, vehicle lateral acceleration, a driver's driving load, and a driver's operation quantity, for example. It is possible to estimate the driver's driving load from the configuration or shape of roads stored in an automotive navigation or car navigation system and information on traffic congestion supplied from VICS (Vehicle Information and Communication System). It is possible to estimate the driver's operation quantity from the frequency of driver's steering, accelerating and braking operations, determined from a memorized record of driver's operations.

At a step P502, controller 50 obtains the risk potentials calculated by the risk potential calculating process. At a step P503, controller 50 determines a vehicle stability of the vehicle 1A in accordance with the vehicle driving condition obtained at step P501 and the risk potentials obtained at step P502. In this example, the vehicle stability is so set to have the following tendency. The vehicle stability becomes lower when the vehicle speed becomes higher, when the acceleration or deceleration increases, when the steering input becomes greater, and when the risk potential becomes higher.

At a step P504, controller 50 calculates a weight in accordance with the vehicle stability determined at step P503. The weight is a quantity or priority used in the driving operation inducement control for determining the control quantity in dependence on the execution or inexecution of the driving force inducement control, as to the steering reaction, accelerating/braking reaction, and the degree or rate of reduction of road input by active suspensions 4*i*(FL~RR). This priority is a parameter for determining the proportion between a minimum value of zero in the case of the inexecution of the inducement control and a maximum value of one in the case of the execution of the inducement control.

In this example, the priority is set equal to one as a control quantity when the stability is at a best level and the inducement control is performed. The priority is set equal to zero as a control quantity when the stability is lower than or equal to a predetermined safety threshold and the inducement control is not performed. The priority is varied between the minimum value of zero and the maximum value of one, in accordance with the stability.

At a step P505, controller 50 calculates an allotment quantity for the inexecution of the driving operation inducement control, in accordance with the priority (weight) determined at step P504. At a step P506, controller 50 calculates an allotment quantity for the execution of the driving operation inducement control based on the risk potential, in accordance with the priority (weight) determined at step P504. At a step P507, controller 50 performs the controls of the steering reaction, accelerating/braking force, accelerating/braking operational reaction, or the control of active suspensions 4*i*(FL~RR), in accordance with a sum of the allotment quantities calculated at steps P505 and P506. After P507, controller 50 repeats the driving operation inducement control.

The vehicle 1A equipped with the control system according to this example of the fifth embodiment is operated as follows: During a traveling operation of the vehicle, the control system normally performs the normal mode control for reducing vibrations from the road surface at a predetermined normal rate or percentage by controlling the active suspensions 4*i*(FL~RR). If the driving operation inducement control is started, the control system calculates the priority for the normal control in various vehicle components and the priority for the driving operation inducement control, in accordance with the vehicle driving condition, risk potential and the vehicle stability.

Then, the control system controls the vehicle components and performs the inducement control to induce a driving operation in accordance with a control quantity determined by addition of the control quantity for the driving operation inducement control and the control quantity in the case of the inexecution of the inducement control, in accordance with the priorities. Therefore, in consideration of the stability of vehicle 1A, the control system can control the vehicle flexibly, for example, by increasing the weight or influence of the driving operation inducement control for supporting the driver, or increasing the weight of the normal vehicle control so as to entrust the skill of the driver.

In vehicle 1A according to the practical example of the fifth embodiment, the control system performs the driving operation inducement control while adjusting the weight of the inducement control in accordance with the vehicle condition such as the vehicle stability. For example, the control system decreases the percentage for transmitting vibration from the road surface with active suspensions 4*i*(FL~RR) when the stability is high, and increase the percentage when the stability become lower.

As to the transmission of the risk potential by the control of the steering reaction and accelerating/braking reaction, the control system can increase the control quantity as the stability becomes lower. Accordingly, the control system can support the driver more adequately. In this example, at least one of the vehicle speed sensor 30, vehicle condition sensing device 140 and controller 50 can be regarded as a component corresponding to the stability condition sensing section.

Therefore, according to one of possible interpretations, the control system of this example comprises: a stability condition sensing element or means for sensing a vehicle stability condition; and a pseudo vehicle behavior producing element or means which varies the control quantity of the control for producing a pseudo vehicle behavior with the suspension system in accordance with the stability condition. Therefore, the control system can adjust the amount of automatic intervention for supporting the driver to increase the effect of the inducement control or increase the effect of the normal control trusting the skill of the driver.

Sixth Embodiment

A sixth embodiment of the present invention employs a first risk potential threshold for initiating a control operation of inclination of the vehicle body or driver's seat, and a second risk potential threshold for initiating a control operation of producing vibrations.

Practical Example

Figure 35:
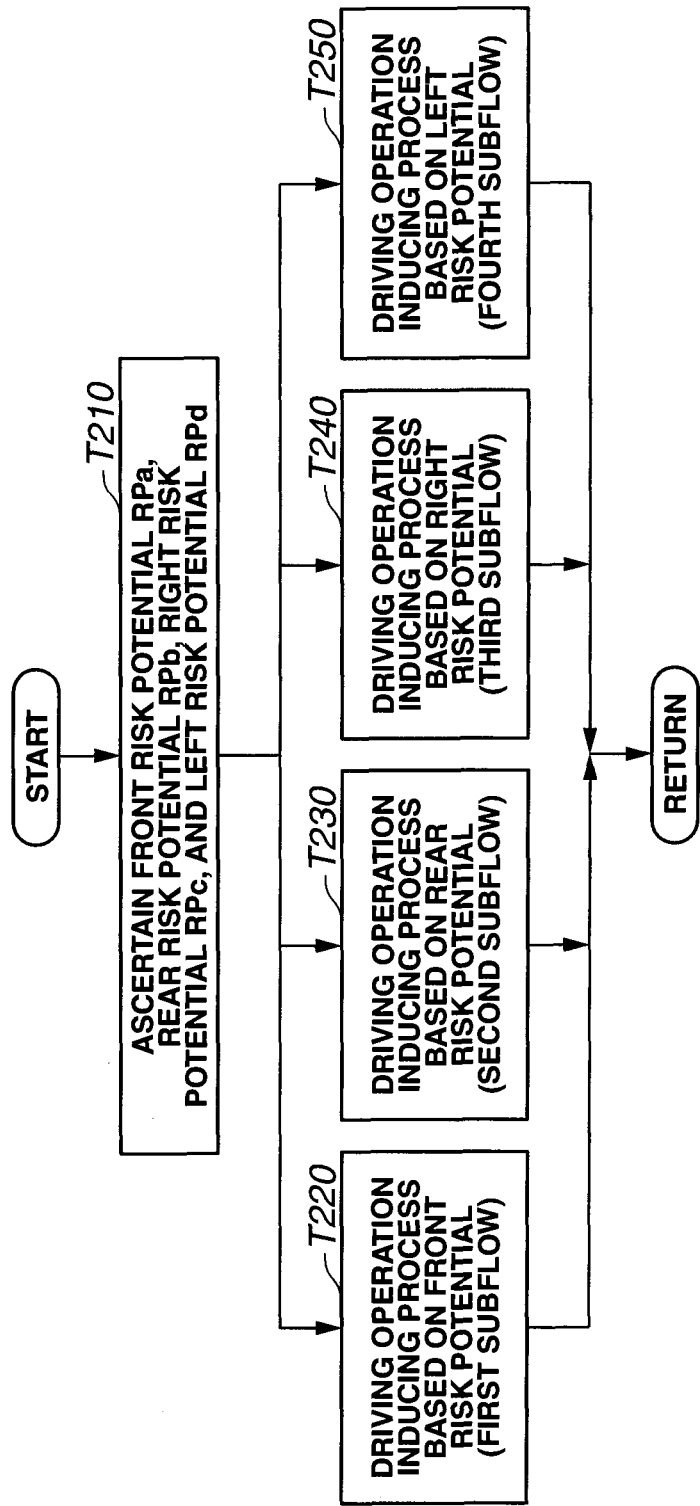
FIG. 35 is a flowchart showing a driving operation inducing process according to a sixth embodiment.

FIG. 35 is a flowchart showing the driving operation inducement control process of a practical example of the sixth embodiment, and FIGS. 36~39 show subflows performed in the inducement control process of FIG. 35. At a step T210, controller 50 obtains the front, rear, right and left risk potentials RPa, RPb, RPc and RPd calculated in the risk potential calculating process.

Figure 36:
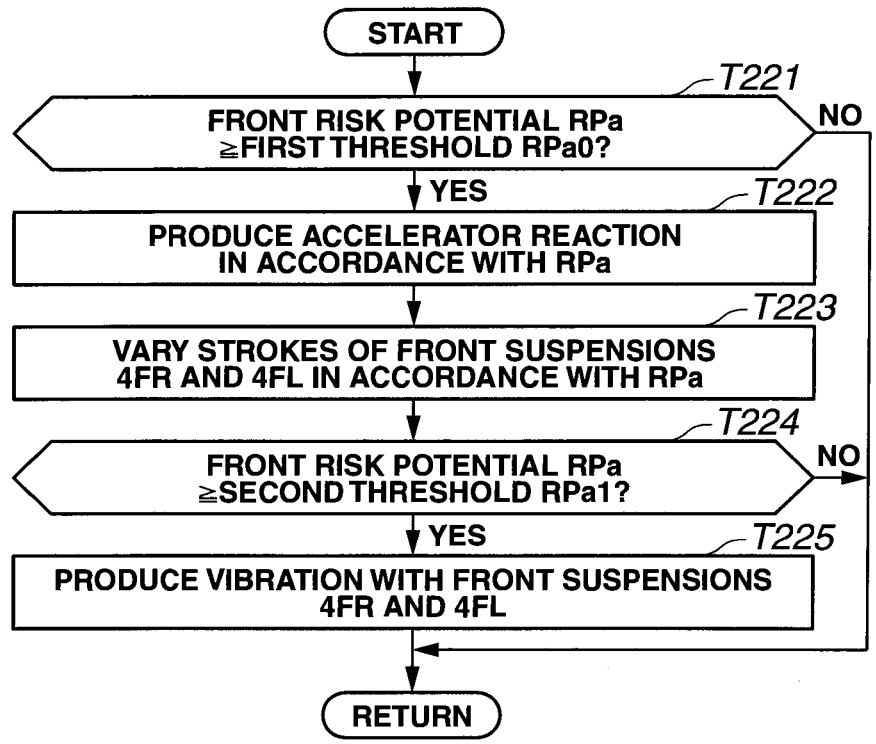
FIG. 36 is a flowchart showing a first subflow shown in FIG. 35.

Then, at T220, controller 50 performs a first subflow of FIG. 36 by using front risk potential RPa obtained at T210. At a step T221 of FIG. 36, controller 50 compares the front risk potential RPa with first threshold RPa0, and determines whether front risk potential RPa is higher than or equal to first threshold RPa0. When front risk potential RPa is higher than or equal to first front risk potential threshold RPa0, then controller 50 proceeds from T221 to a step T222, and increases the accelerator pedal reaction in accordance with front risk potential RPa as in the practical example of the first embodiment. Then, controller 50 varies the suspension strokes of front active suspensions 4FL and 4FR in accordance with front risk potential RPa at a step T223.

At a step T224 of FIG. 36 following T223, controller 50 compares the front risk potential RPa with second threshold RPa1, and determines whether front risk potential RPa is higher than or equal to second threshold RPa1. When front risk potential RPa is higher than or equal to second front risk potential threshold RPa1, then controller 50 proceeds from T224 to a step T225, and provides vibrations to the suspension stroke of front active suspensions 4FR and 4FL, at T225.

Thus, the control system performs the control operations of increasing the accelerator pedal reaction and producing the vehicle body pitch angle (rearward inclination) when front risk potential RPa is higher than the first threshold RPa0 but still lower than the second threshold RPa1 (RPa1>RPa0), and performs the control operation of producing vibration of the front suspension stroke when front risk potential RPa is higher than or equal to second threshold RPa1. Therefore, the control system can send proper message to the driver smoothly as to an increase of the risk potential in the forward direction, and prompt a driver's decelerating operation. After T225, controller 50 returns to the inducement control process.

Figure 37:
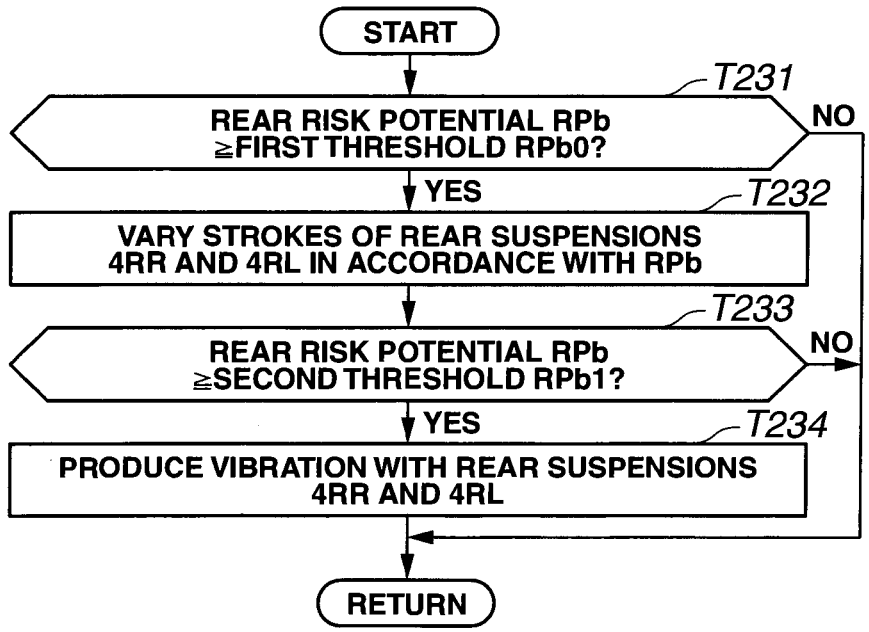
FIG. 37 is a flowchart showing a second subflow shown in FIG. 35.

Furthermore, in accordance with rear risk potential RPb obtained at T210, controller 50 performs a second subflow at a step T230. At a first step T231 of the second subflow, as shown in FIG. 37, controller 50 compares the rear risk potential RPb with first threshold RPb0, and determines whether rear risk potential RPb is higher than or equal to first threshold RPb0. When rear risk potential RPb is higher than or equal to first risk potential threshold RPb0, then controller 50 proceeds from T231 to a step T232, and varies the suspension strokes of rear active suspensions 4RL and 4RR in accordance with rear risk potential RPa at T232, as in the practical example of the first embodiment.

At a step T233 of FIG. 37 following T232, controller 50 examines whether rear risk potential RPb is higher than or equal to second threshold RPb1. When rear risk potential RPb is higher than or equal to second rear risk potential threshold RPb1, then controller 50 proceeds from T233 to a step T234, and provides vibrations to the suspension stroke of rear active suspensions 4RL and 4RR, at T234.

Thus, the control system performs the control operation of producing the vehicle body pitch angle (forward inclination) when rear risk potential RPb is higher than the first threshold RPb0 but still lower than the second threshold RPb1 (RPb1>RPb0), and performs the control operation of producing vibration of the rear suspension stroke when rear risk potential RPb is higher than or equal to second threshold RPb1. Therefore, the control system can send proper message to the driver smoothly as to an increase of the risk potential in the rearward direction, and prompt a driver's accelerating operation. After T234, controller 50 returns to the inducement control process.

Figure 38:
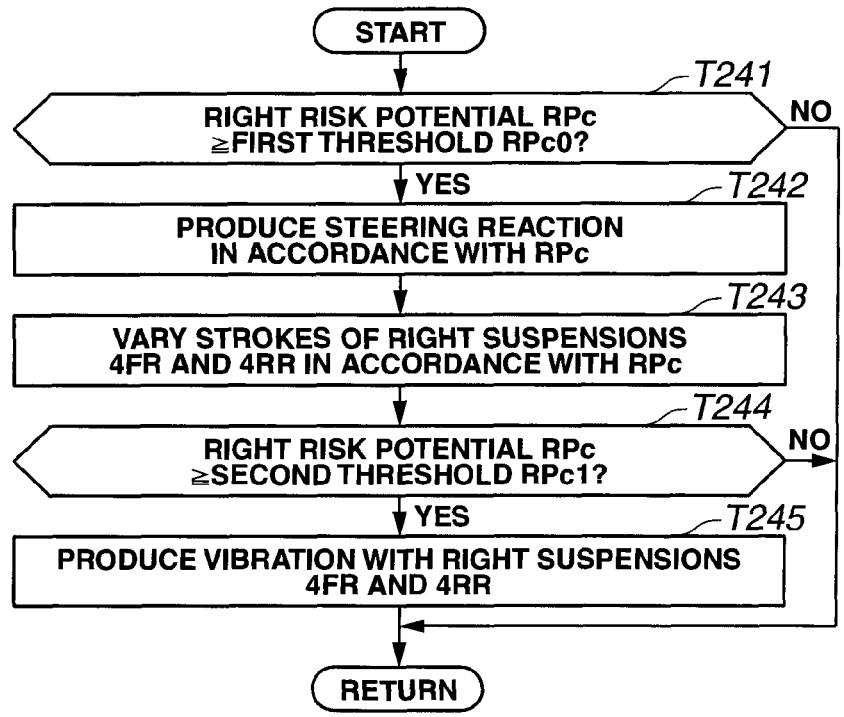
FIG. 38 is a flowchart showing a third subflow shown in FIG. 35.

Furthermore, in accordance with right risk potential RPc obtained at T210, controller 50 performs a third subflow at a step T240. At a first step T241 of the third subflow, as shown in FIG. 38, controller 50 compares the right risk potential RPc with first threshold RPc0, and determines whether right risk potential RPc is higher than or equal to first threshold RPc0. When right risk potential RPc is higher than or equal to first right risk potential threshold RPc0, then controller 50 proceeds from T241 to a step T242, and increases the steering reaction in accordance with right risk potential RPc as in the practical example of the first embodiment. Then, controller 50 varies the suspension strokes of right active suspensions 4FR and 4RR in accordance with right risk potential RPc at T243.

At a step T244 of FIG. 38 following T243, controller 50 compares the right risk potential RPc with second threshold RPc1, and determines whether right risk potential RPc is higher than or equal to second threshold RPc1. When right risk potential RPc is higher than or equal to second risk potential threshold RPc1, then controller 50 proceeds from T244 to a step T245, and provides vibrations to the suspension stroke of right active suspensions 4FR and 4RR, at T245.

Thus, the control system performs the control operations of increasing the steering reaction and producing the vehicle body roll angle (left rolling inclination) when right risk potential RPc is higher than the first threshold RPc0 but still lower than the second threshold RPc1 (RPc1>RPc0), and performs the control operation of producing vibration of the right suspension stroke when right risk potential RPc is higher than or equal to second threshold RPc1. Therefore, the control system can provide the driver a sense of a vehicle behavior treading on irregularities such s rumble strips on a lane marker or outside a lane marker. Therefore, the control system can send proper message to the driver smoothly as to an increase of the risk potential in the rightward direction, and induce a driver's leftward steering operation. After T245, controller 50 returns to the inducement control process.

Figure 39:
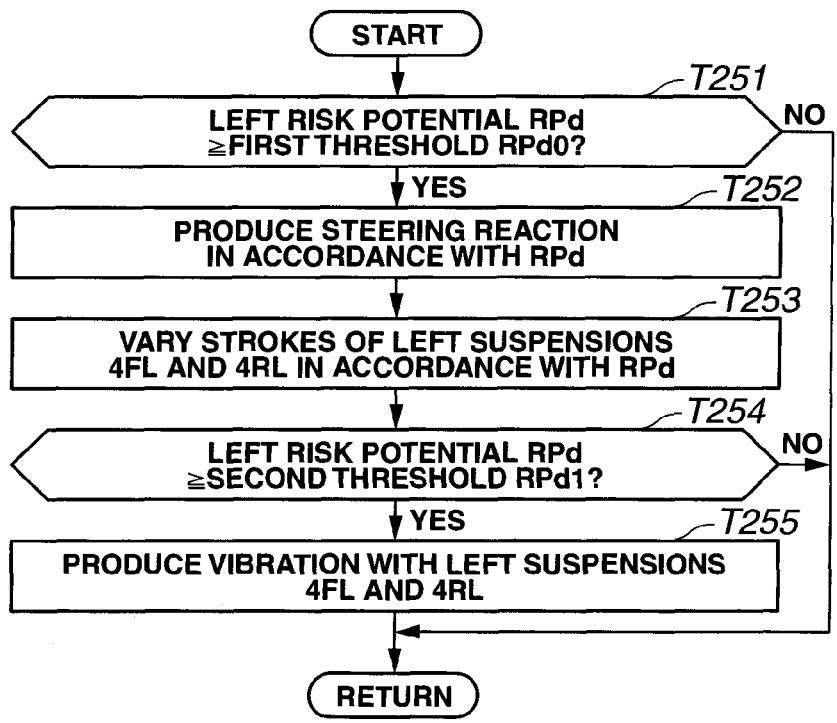
FIG. 39 is a flowchart showing a fourth subflow shown in FIG. 35.

Furthermore, in accordance with left risk potential RPd obtained at T210, controller 50 performs a fourth subflow at a step T250. At a first step T251 of the fourth subflow, as shown in FIG. 39, controller 50 compares the left risk potential RPd with first threshold RPd0, and determines whether left risk potential RPd is higher than or equal to first threshold RPd0. When left risk potential RPd is higher than or equal to first left risk potential threshold RPd0, then controller 50 proceeds from T251 to a step T252, and increases the steering reaction in accordance with left risk potential RPd as in the practical example of the first embodiment. Then, controller 50 varies the suspension strokes of left active suspensions 4FL and 4RL in accordance with left risk potential RPd at a step T253.

At a step T254 of FIG. 39 following T253, controller 50 compares the left risk potential RPd with second threshold RPd1, and determines whether left risk potential RPd is higher than or equal to second threshold RPd1. When left risk potential RPd is higher than or equal to second risk potential threshold RPd1, then controller 50 proceeds from T254 to a step T255, and provides vibrations to the suspension stroke of left active suspensions 4FL and 4RL, at T255.

Thus, the control system performs the control operations of increasing the steering reaction and producing the vehicle body roll angle (right rolling inclination) when left risk potential RPc is higher than the first threshold RPd0 but still lower than the second threshold RPd1 (RPd1>RPd0), and performs the control operation of producing vibration of the left suspension stroke when left risk potential RPd is higher than or equal to second threshold RPd1. Therefore, the control system can provide the driver a sense of a vehicle behavior treading on irregularities such as rumble strips on a lane marker or outside a lane marker. Therefore, the control system can send proper message to the driver smoothly as to an increase of the risk potential in the leftward direction, and induce a driver's rightward steering operation. After T255, controller 50 returns to the inducement control process 87.

It is possible to vary the frequency of vibrations produced at steps T245 and T255 (and steps S225 and S234), in accordance with the vehicle speed. For example, the frequency of vibrations is made higher when the vehicle speed becomes higher. Instead of vibrations of the suspension strokes, it is possible to produce vibration with the steering reaction or the pedal reaction. Moreover, it is possible to produce an audible message with a loud speaker installed in the vehicle to notify the driver of an increase of the risk potential. For example, the control system can provide the driver a sense of another vehicle approaching to the vehicle 1A by producing a pseudo audible running vehicle noise with a front speaker (or left and right front speakers) when the front risk potential is high, and with a rear speaker (or left and right rear speakers) when the rear risk potential is high. Moreover, the control system can provide the driver a sense of treading on road surface irregularities such as rumble strips by producing a pseudo audible running vehicle noise on the road surface irregularities with a right speaker (or front and rear right speaker) when the right risk potential is high, and with a left speaker (or front and rear left speakers) when the left risk potential is high.

The control system according to the practical example of the sixth embodiment can produce a pseudo inclination and a pseudo vibration at respective effective timings by using two unequal risk potential thresholds, especially in the lateral direction, and thereby support the driver adequately.

Support Control

It is possible to employ a following support control in any one of the examples of the preceding embodiments.

(Driving Operation Support Control for Vehicle Longitudinal Direction)

FIG. 40 shows a longitudinal support control process for the vehicle longitudinal direction. Controller 50 starts the process of FIG. 40 in response to a driver's command to start the driving operation assistance. It is possible to perform the support control in the vehicle longitudinal direction of FIG. 40 as a base control in the vehicle 1A, and to perform the inducement control (corresponding to the assist control) of FIG. 6 or any one of the other examples as a supplemental control for supplementing the base control.

At a step S201 of FIG. 40, controller 50 calculates a control repulsion Fc (or repulsive force) from the longitudinal risk potential RPx calculated in the risk potential calculating process. The control repulsion Fc is a variable used for calculating a target longitudinal force and a command accelerator reaction (FA).

This control repulsion Fc can be defined as a repulsive force in a model shown in FIGS. 41A and 41B. In this model, an imaginary elastic member 200 is attached to the front of a host vehicle, and arranged to produce a pseudo running resistance by being compressed by collision with a forward obstacle. The control repulsion Fc is defined as a repulsive force produced when imaginary elastic member 200 is compressed by the collision with the forward vehicle.

In this example, controller 50 uses a predetermined threshold RPL1 for longitudinal risk potential RPx, and calculates the control repulsion Fc so that control repulsion Fc is proportional to the difference (RPx−RPL1) between RPx and RPL1, according to a following mathematical expression (5) when the longitudinal risk potential RPx is higher than threshold RPL1.

$$Fc = K1 \cdot (RPx - RPL1) \quad (5)$$

This equation has a meaning that the longitudinal risk potential RPx is regarded as a displacement of elastic member 200, and the control repulsion Fc is proportional to the displacement of elastic member 200. Accordingly, K1 is a coefficient corresponding to a spring constant of imaginary elastic member 200.

At a step S202, controller 50 calculates a desired control driving force Fa_out and a desired control braking force Fb_out by using the control repulsion Fc calculated at S201. The control driving force Fa_out and a control braking force Fb_out are variables used for the control of the longitudinal force. Then, at a step S204, controller 50 calculates a command accelerator (pedal) reaction FA by using the control repulsion Fc calculated at S201. The command accelerator reaction FA is a control quantity for controlling an accelerator (pedal) reaction provided to an operation on accelerator pedal 7.

At a step S204, controller 50 outputs the control driving force Fa_out and control braking force Fb_out calculated at S202, to the driving force control device 100 and the braking force control device 110, respectively. Therefore, the engine controller of driving force control device 100 controls the engine torque in accordance with the command from controller 50, and the brake pressure controller of braking force control device 110 controls the brake fluid pressure in accordance with the command from controller 50.

Then, at a step S205, controller 50 outputs the command accelerator reaction FA calculated at S203, to the accelerator reaction control device 80. Therefore, the accelerator reaction control device 80 controls the accelerator pedal reaction so as to add the reaction corresponding to the command inputted from controller 50, to a base accelerator reaction which is a normal accelerator reaction produced according to a normal accelerator reaction characteristic in response to an accelerating operation quantity SA (or accelerator pedal operation quantity). After S205, controller 50 repeats the longitudinal driving operation support control process until an end command is inputted by the driver.

(Driving Operation Support Control for Vehicle Lateral Direction)

FIG. 42 shows a lateral support control process for the vehicle lateral direction. Controller 50 starts the process of FIG. 42 in response to a driver's command to start the driving operation support control. It is possible to perform the support control in the vehicle lateral direction of FIG. 42 (and the longitudinal direction of FIG. 40) as a base control in the vehicle 1A, and to perform the inducement control of FIG. 6 or any one of the other examples.

At a step S301, controller 50 ascertain the lateral risk potential RPy calculated by the risk potential calculating process of FIG. 5. It is possible to calculate the comprehensive lateral risk potential to all the obstacle around the vehicle, by adding the lateral components of the individual risk potentials RPk.1 Moreover, at a step S302, controller 50 calculates a lateral control command that is a command steering reaction FS to be delivered to the steering reaction control device 60, in accordance with the lateral risk potential RPy.

The command steering reaction is increased so as to increase a steering reaction tending to return the steering wheel to the neutral position, and hence to reducing the steering wheel angle as the lateral risk potential RPy becomes higher. At a step S303, controller 50 delivers the command steering reaction FS calculated at S302, to the steering reaction control unit 60. After S303, controller 50 repeats the lateral assist control process of FIG. 42 until a command is inputted by the driver to stop the execution.

According to one of various possible interpretations of the disclosed embodiments and examples, it is possible to consider the following techniques.

(Z1) A vehicle driving (operation) support technique (apparatus or process) for a vehicle (1A), comprises the following elements which are elements of the apparatus such as sections or means, or elements of the process such as steps. A sensing element is an element to sense a traveling condition of the vehicle including a surrounding condition inclusive of an obstacle around the vehicle. A control element is an element to calculate a risk potential for the vehicle in accordance with the traveling condition, and to perform an assist control to produce inducement simulating a condition change attributable to an increase of the risk potential, in accordance with the risk potential. The control element may be configured to further perform a support control to support the driver in accordance with the risk potential.

(Z2) The technique as recited in Z1, wherein the technique further comprises an actuating element to control the vehicle for supporting the driver of the vehicle in accordance with the traveling condition, and the control element is configured to perform the assist control to produce the inducement by controlling the actuating element in accordance with the risk potential.

(Z3) The technique as recited in Z1 or Z2, wherein the control element is configured to perform the assist control to produce the inducement which is a pseudo behavior simulating a behavior attributable to a driving operation increasing the risk potential, by controlling the actuating element in accordance with the risk potential.

(Z4) The technique as recited in one of Z1-Z3, wherein the control element is configured: to perform the support control of producing a reaction of the vehicle influencing the driver in response to a change in the risk potential; and to perform the assist control of producing the inducement to induce the driver to a driving operation in a direction to lower the risk potential.

(Z5) The technique as recited in one of Z1-Z4, wherein the actuating element includes a reaction regulating element to produce a reaction of the vehicle, and a motion regulating element to regulate a movement provided to the driver, and the control element is configured to perform the support control by producing a reaction of the vehicle influencing the driver in response to an increase in the risk potential by controlling the reaction regulating element, and to perform the assist control of producing the inducement in the form of the pseudo behavior to induce the driver to a driving operation in a direction to lower the risk potential by controlling the motion regulating element.

(Z6) The technique as recited in Z5, wherein the motion regulating element is arranged to regulate the movement in a vertical direction. (Z7) The technique as recited in Z5 or Z6, wherein the reaction regulating element includes an operational reaction imparting element to impart an operational reaction to a driver's driving operation inputted to a driving operation input device. (Z8) The technique as recited in one of Z5~Z7, wherein the reaction regulating element includes a longitudinal regulating element (100, 110) to regulate a longitudinal (driving/braking) behavior of the vehicle. (Z9) The technique as recited in one of Z5~Z8, wherein the reaction regulating element includes a lateral regulating element to regulating a lateral behavior (such as a turning or steering behavior) of the vehicle. (Z10) The technique as recited in one of Z1~Z9, wherein the control element comprises: a risk potential calculating element to calculate the risk potential to the obstacle in accordance with the traveling condition including the surrounding condition and a vehicle condition of the vehicle, a support controlling element to control a reaction of the vehicle, in accordance with the risk potential by controlling the actuating element; and an assist controlling element to perform the assist control to produce the pseudo behavior simulating a vehicle behavior caused by a driving operation increasing the risk potential, by controlling the actuating element in accordance with the risk potential.

(Z11) The technique as recited in one of Z1-Z10, wherein the actuating element includes an assist actuating element (or subelement) to produce the inducement (such as a pseudo behavior) in response to a assist control signal produced by the assist control. (Z12) The technique as recited in Z11, wherein the assist actuating element is arranged to produce the inducement which includes at least one of a pitching inclination of a vehicle body of the vehicle, a rolling inclination of the vehicle body, a forward or rearward inclination of a driver's seat, a leftward or rightward inclination of the driver's seat, an audible noise simulating an increase of the risk potential, vibration in a part of the vehicle, and a swing motion of the vehicle. The part of the vehicle may be a risk side part of the vehicle, or may be at least one of the vehicle body, the driver's seat, and the driving operation input device such as the steering wheel, accelerator pedal and/or brake pedal.

(Z13) The technique as recited in one of Z1~Z12, wherein the motion regulating element includes an active suspension (4i) disposed between a wheel and a vehicle body of the vehicle.

(Z14) The technique as recited in one of Z1~Z13, wherein the control element or the assist (inducement) controlling element is configured to produce a pseudo vehicle behavior simulating a vehicle behavior responsive to a driving operation which is one of an accelerating operation, a braking operation and a steering operation (by controlling the motion regulating element or the actuating element). (Z15) The technique as recited in Z14 or one of Z1~Z14, wherein the assist (inducement) controlling element or the control element is configured to control the motion regulating element (or the actuating section) so as to incline the vehicle body of the vehicle in one of a forward direction and a rearward direction in accordance with the (front or rear) risk potential in one of the forward and rearward directions of the vehicle. (Z16) The technique as recited in Z14 or one of Z1~Z15, wherein the assist (inducement) controlling element or the control element is configured to control the motion regulating element (or the actuating element) so as to incline the vehicle body in a (leftward or rightward) rolling direction in accordance with the (right or left) risk potential in the lateral direction of the vehicle.

(Z17) The technique as recited in one of Z1~Z16, wherein the assist (inducement) controlling element or the control element is configured to control the motion regulating element (or the actuating element) so as to vibrate a part of the vehicle body facing the obstacle, or so as to vibrate a risk-increasing side of the vehicle body or a vehicle body member such as a driver's seat, the risk increasing side being a side facing the side of the vehicle on which the risk potential increases. (Z18) The technique as recited in Z17 or one of Z1~Z17, wherein the motion regulating element or the actuating element includes a front suspension unit such as a front suspension system for a front wheel or front wheels of the vehicle and a rear suspension unit such as a rear suspension system for a rear wheel or rear wheels of the vehicle; and the assist (inducement) controlling element or the control element is configured to produce vibration in one of the front and rear suspension units in accordance with the risk potential in the longitudinal (or front and rear) direction. (Z19) The technique as recited in Z17 or one of Z1~Z18, wherein the motion regulating element or the actuating element includes a left suspension unit such as a left suspension unit for a left wheel or at least one of front and rear left wheels of the vehicle, and a right suspension unit such as a right suspension unit for a right wheel or at least one of front and rear right wheels of the vehicle; and the assist (inducement) controlling element or the control element is configured to produce vibration in one of the right and left suspension units in accordance with the risk potential in the lateral (or left and right) direction.

(Z20) The technique as recited in one of Z1~Z19, wherein the assist controlling element or the control element is configured to produce a rolling swing movement (P403) of a vehicle body of the vehicle in response to an increase of a front risk potential (RPa) by controlling the motion regulating element or the actuating element. (Z21) The technique as recited in one of Z1~Z20, wherein the assist controlling element or the control element is configured to select one of a rolling (swing) control and a rearward inclination control in dependence on a vehicle speed of the vehicle (P401, P402, P403), the rolling (swing) control being a control of producing a rolling movement, such as a rolling swing movement, of a vehicle body of the vehicle in response to an increase of a front risk potential by controlling the motion regulating element or the actuating element, the rearward inclination control being control of inclining the vehicle body rearward in response to an increase of the front risk potential.

(Z22) The technique as recited in one of Z1~Z21, wherein the control element (or the support controlling element) is configured to control a steering reaction in accordance with a right or left risk potential when the right or left risk potential is higher than a first right/left potential threshold, and the control element (or the assist (inducement) controlling element) is configured to produce a pseudo vehicle behavior simulating a vehicle behavior responsive to a driving operation increasing the right or left risk potential when the right or left risk potential is higher than a second right/left potential threshold which is higher than the first right/left potential threshold. (Z23) The technique as recited in one of Z1~Z22, wherein the control element (or the assist (inducement) controlling element) is configured to perform a control operation to produce a pseudo vehicle behavior simulating a rolling vehicle behavior responsive to a steering operation in a direction increasing a right or left risk potential in accordance with a right or left risk potential (RPc, RPd) when the right or left risk potential is higher than a third right or left potential threshold, and the control element (or the assist (inducement) controlling element) is configured to perform a control operation to produce a vibration on a left or right side of the driver in accordance with the right or left risk potential when the right or left risk potential is higher than a fourth right or left potential threshold which is higher than the third right or left potential threshold.

(Z24) The technique as recited in one of Z1~Z23, wherein the control element (or the assist (inducement) controlling element) is configured to vary a control quantity for producing the inducement in the form of a pseudo vehicle behavior, in accordance with a vehicle stability condition of the vehicle (determined by a stability condition sensing section). (Z25) The technique as recited in one of Z1~Z24, wherein the control element or the assist (inducement) controlling element is configured to control at least one of a suspension stroke, a damping force and a spring constant of a suspension device, an operational reaction applied to a driver's driving operation, and a gain of the operational reaction. (Z26) The technique as recited in one of Z1~Z25, wherein the motion regulating section or the actuating section includes a suspension device (801, 803) including a stabilizer (801) varying a stabilizer link length. (Z27) The technique as recited in one of Z1~Z26, wherein the motion regulating section or the actuating section includes a control type suspension device disposed between a driver's seat and a vehicle body.

(Z28) A vehicle driving (operation) support technique which is a process comprising: a first process element of calculating a risk potential to an obstacle around the vehicle in accordance with a vehicle traveling condition, and a second process element of performing a driving operation inducement control to produce a pseudo vehicle behavior simulating a vehicle behavior caused by a driving operation increasing the risk potential, in accordance with the risk potential. (Z29) A vehicle (or a motor vehicle) provided with the driving (operation) support technique recited in one of Z1~Z28. (Z30) A vehicle (or motor vehicle) comprising: a vehicle body; an operating element for performing a driving operation or for receiving a driver's driving operation such as a steering, accelerating or braking operation; a vehicle condition sensing element for sensing a vehicle condition of the vehicle; an obstacle sensing element for sensing an obstacle around the vehicle; a risk potential calculating element for calculating a risk potential to an obstacle in accordance with sensed conditions of the vehicle condition sensing element and the is obstacle condition sensing element; an operational reaction imparting element for providing an operational reaction in the operating element, in accordance with the risk potential; a motion regulating element for controlling a vertical movement of the driver; and a pseudo vehicle behavior producing element for producing a pseudo vehicle behavior simulating a vehicle behavior caused by a driving operation to increase the risk potential in accordance with the vehicle condition sensed by the vehicle condition sensing element and the risk potential, by controlling the motion regulating element.

(Z31) The vehicle driving (operation) support technique as recited in one of Z1~Z30, wherein the control element (or the risk potential calculating element) is configured to calculate a first side risk potential (Ra, Rb, Rc, Rd) in a first direction (which may be one of a forward, rearward, leftward and rightward directions) in accordance with the traveling condition, and the control element (or the assist controlling element) is configured to produce the inducement simulating a condition change which would be caused by a further increase of the first side risk potential when the first side risk potential (RPa, RPb, RPc, RPd) becomes higher than or equal to a first side potential threshold (RPa0, RPb0, RPc0, RPd0).

(Z32) The vehicle driving (operation) support technique as recited in one of Z1~Z31, wherein the control element (or the risk potential calculating element) is configured to calculate front, rear, right and left risk potentials (Ra, Rb, Rc, Rd) in accordance with the traveling condition, and the control element (the support controlling element and/or the assist controlling element) is configured to increase an accelerator reaction and a rearward inclination of one of a vehicle body and a driver's seat when the front risk potential (RPa) is higher than or equal to a front potential threshold (RPa0), to increase a forward inclination of one of the vehicle body and the driver's seat when the rear risk potential (RPb) is higher than or equal to a rear potential threshold (RPb0), to increase a rightward steering reaction and a leftward inclination of one of the vehicle body and the driver's seat when the right risk potential (RPc) is higher than or equal to a right potential threshold (RPc0), and to increase a leftward steering reaction and a rightward inclination of one of the vehicle body and the driver's seat when the left risk potential (RPd) is higher than or equal to a left potential threshold (RPd0).

(Z33) The vehicle driving (operation) support technique as recited in one of Z1~Z32, wherein the control element is configured to calculate a first side risk potential (RPa, RPb, RPc, RPd) in a first direction (which may be one of a forward, rearward, leftward and rightward directions) in accordance with the traveling condition, and the control element is configured to perform a first control operation when the first side risk potential (RPa, RPb, RPc, RPd) is higher than or equal to a lower threshold (RPa0, RPb0, RPc0, RPd0), and to perform a second control operation when the first side risk potential (RPa, RPb, RPc, RPd) is higher than or equal to a higher threshold (RPa1, RPb1, RPc1, RPd1) higher than the lower threshold. (Z34) The vehicle driving (operation) support technique as recited in Z33 or one of Z1~Z33, wherein the control element (or the risk potential calculating element) is configured to calculate the first side risk potential which is a right/left risk potential (Rc, Rd) in accordance with the traveling condition, and the control element is configured to perform the first control operation to produce a steering reaction when the right/left risk potential (RPc, RPd) is higher than or equal to a lower threshold (RPc0, RPd0), and to perform the second control operation to produce a pseudo behavior when the right/left risk potential (RPc, RPd) is higher than or equal to a higher threshold (RPc1, RPd1) higher than the lower threshold. (Z35) The vehicle driving (operation) support technique as recited in Z33 or one of Z1~Z34, wherein the control element (or the risk potential calculating element) is configured to calculate the first side risk potential (RPa, RPb, RPc, RPd) in accordance with the traveling condition, and the control element (or the assist controlling element) is configured to perform the first control operation to produce a first pseudo behavior when the first side risk potential (RPa, RPb, RPc, RPd) is higher than or equal to a lower threshold (RPa0, RPb0, RPc0, RPd0), and to perform the second control operation to produce a second pseudo behavior when the first side risk potential (RPa, RPb, RPc, RPd) is higher than or equal to a higher threshold (RPa1, RPb1, RPc1, RPd1) higher than the lower threshold.

(Z36) The vehicle driving (operation) support technique as recited in one of Z1~Z35, wherein the support technique comprises an actuating element including a damping device (such as a suspension device 4$i$) to transmit movement from a road (or a vehicle body) to the driver with a variable damping characteristic, and the control element is configured to control the damping characteristic in accordance with the risk potential.

(Z37) The vehicle driving operation support technique as recited in one of Z1~Z36, wherein the control element (or the risk potential calculating element) is configured to calculate a longitudinal risk potential (RPx) in accordance with the traveling condition, and the control element (or the support controlling element) is configured to perform the support control in a longitudinal direction of the vehicle in accordance with the longitudinal risk potential (RPx). (Z38) The vehicle driving operation support technique as recited in one of Z1~Z37, wherein the control element (or the risk potential calculating element) is configured to calculate a lateral risk potential (RPy) in accordance with the traveling condition, and the control element (or the support controlling element) is configured to perform the support control in a lateral direction of the vehicle in accordance with the lateral risk potential (RPy). (Z39) The vehicle driving operation support technique as recited in Z1~Z38, wherein the control element (or the risk potential calculating element) is configured to calculate front and rear risk potentials (RPa, RPb) in accordance with the traveling condition, and the control element (or the assist controlling element) is configured to perform the assist control in the longitudinal direction of the vehicle (P103, P104; T20, T30; P203, P204; T130, T140; P402, P403, P104; T220, T230) in accordance with the front and rear risk potentials (RPa, RPb). (Z40) The vehicle driving operation support technique as recited in one of Z1~Z39, wherein the control element (or the risk potential calculating element) is configured to calculate right and left risk potentials (RPc, RPd) in accordance with the traveling condition, and the control element (or the assist controlling element) is configured to perform the assist control in the lateral direction of the vehicle (P105, P106; T40, T50; P205, P206; T150, T160; P105, P106; T240, T250) in accordance with the right and left risk potentials (RPc, RPd). (Z41) The vehicle driving operation support technique as recited in one of Z1~Z40, wherein the control element (or the risk potential calculating element) is configured to calculate the longitudinal risk potential (RPx) from a sum (RPx=$\Sigma_k$(RPk×cos θk)) of longitudinal components of risk potentials (RPk) of obstacles (k) around the vehicle. (Z42) The vehicle driving operation support technique as recited in one of Z56~Z41, wherein the control element (or the risk potential calculating section) is configured to calculate the lateral risk potential (RPy) from a sum (RPy=$\Sigma_k$(RPk×sin θk)) of lateral components of individual risk potentials (RPk) of obstacles (k) around the vehicle. (Z43) The vehicle driving operation support technique as recited in one of Z1~Z42, wherein the control element (or the risk potential calculating element) is configured to calculate a front risk potential (RPa) from a sum of individual risk potentials (RPk) of obstacles in a predetermined forward (angular) range of the vehicle (the range in which θ=0°~90° and 270°~360°, for example). (Z44) The vehicle driving operation support technique as recited in one of Z1~Z43, wherein the control element (or the risk potential calculating element) is configured to calculate a rear risk potential (RPb) from a sum of risk potentials (RPk) of obstacles in a predetermined rearward (angular) range of the vehicle 1A (the range in which θ=90°~270°, for example). (Z45) The vehicle driving operation support technique as recited in one of Z1~Z44, wherein the control element (or the risk potential calculating element) is configured to calculate a right risk potential (RPc) from a sum of risk potentials (RPk) of obstacles in a predetermined rightward (angular) range (the range in which θ=0~180°, for example), and a left risk potential (RPd) from a sum of risk potentials (RPk) of obstacles in a predetermined leftward (angular) range (the range in which θ=180°~360°, for example). (Z46) The vehicle driving operation support technique as recited in one of Z1~Z45, wherein the control element (or the support controlling element) is configured to perform the support control in the longitudinal direction (S201~S205) by controlling at least one of an accelerator reaction, a driving force and a braking force in accordance with the longitudinal risk potential (RPx) (or a repulsive force (Fc=K1~(RPx−RPL1)) proportional to a difference between the longitudinal risk potential (RPx) and a predetermined value (RPL1)). (Z47) The vehicle driving operation support technique as recited in one of Z1~Z46, wherein the control element (or the support controlling element) is configured to perform the support control in the lateral direction (S301~S303) by controlling a steering reaction in accordance with the lateral risk potential (RPy). In Z1~Z47, reference numerals and other items in parentheses are items having more or less relevance, enumerated merely as an example, without meaning of limiting the scope of the technique recited in each of Z1~Z47.

According to one possible interpretation of the disclosed embodiments of the present invention, a vehicle driving (operation) support apparatus for a (host) vehicle can be defined in the following manner.

(Z48) A vehicle driving operation support apparatus for a vehicle, comprising: a sensing section to sense a traveling condition of the vehicle including a surrounding condition inclusive of an obstacle around the vehicle; and a control section to calculate a risk potential for the vehicle in accordance with the traveling condition, and to perform an assist control to produce inducement simulating a condition change attributable to an increase of the risk potential, in accordance with the risk potential.

(Z49) The vehicle driving operation support apparatus as recited in (Z48), wherein the vehicle driving operation support apparatus further comprises an actuating section to control the vehicle for supporting the driver of the vehicle in accordance with the traveling condition, and the control section is configured to perform the assist control to produce the inducement which is a pseudo behavior simulating a behavior attributable to a driving operation increasing the risk potential, by controlling the actuating section in accordance with the risk potential.

(Z50) The apparatus as recited in (Z49), wherein the control section is configured to perform a support control of producing a reaction of the vehicle influencing the driver in response to a change in the risk potential, by controlling the actuating section, and to perform the assist control of producing the inducement to induce the driver to a driving operation in a direction to lower the risk potential.

(Z51) The vehicle driving operation support apparatus as recited in (Z50), wherein the actuating section includes a reaction regulating section to produce a reaction of the vehicle, and a motion regulating section to regulate a movement provided to the driver, and the control section is configured to perform the support control by producing a reaction of the vehicle influencing the driver in response to an increase in the risk potential by controlling the reaction regulating section of the actuating section, and to perform the assist control of producing the inducement in the form of the pseudo behavior to induce the driver to a driving operation in a direction to lower the risk potential by controlling the motion regulating section of the actuating section.

(Z52) The vehicle driving operation support apparatus as recited in one of (Z48)~(Z51), wherein the vehicle driving operation support apparatus further comprises an assist actuating element to produce the inducement which is stimulus perceptible by the driver in the form of at least one of a pitching inclination of a vehicle body of the vehicle, a rolling inclination of the vehicle body, a forward or rearward inclination of a driver's seat, a leftward or rightward inclination of the driver's seat, an audible noise simulating an increase of the risk potential, vibration in a part of the vehicle, and a swing motion of the vehicle body.

This application is based on a prior Japanese Patent Application No. 2009-259191 filed on Nov. 12, 2009, a prior Japanese Patent Application No. 2009-046943 filed on Feb. 27, 2009, a prior Japanese Patent Application No. 2009-046941 filed on Feb. 27, 2009 and a prior Japanese Patent Application No. 2009-046942 filed on Feb. 27, 2009. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving operation support apparatus comprising:
   a vehicle condition sensing section configured to sense a vehicle condition of a vehicle;
   an obstacle condition sensing section configured to monitor a surrounding condition including an obstacle around the vehicle;
   an operation input section configured to allow a driver to input a driving operation to operate the vehicle;
   a motion regulating section configured to regulate a movement of the driver; and
   a control section configured to:
      calculate a risk potential for the obstacle in accordance with the vehicle condition and the surrounding condition,
      provide an operational reaction to the driving operation in accordance with the risk potential, and
      produce a pseudo behavior simulating a vehicle behavior responsive to a driving operation increasing the risk potential, by controlling the motion regulating section in accordance with the risk potential.

2. The vehicle driving operation support apparatus as claimed in claim 1, wherein:
   the vehicle driving operation support apparatus further comprises an operational reaction imparting section configured to add the operational reaction to the driving operation inputted to the operation input section,
   the motion regulating section is configured to regulate a vertical movement provided to the driver, and
   the control section is configured to:
      perform a support control to provide the operational reaction by controlling the operational reaction imparting section in accordance with the risk potential, and
      perform an assist control to produce the pseudo behavior simulating a vehicle behavior responsive to a driving operation increasing the risk potential, by controlling the motion regulating section in accordance with the vehicle condition and the risk potential.

3. The vehicle driving operation support apparatus as claimed in claim 2, wherein the control section comprises:
   a risk potential calculating section configured to calculate the risk potential to the obstacle in accordance with the vehicle condition and the surrounding condition,
   a support controlling section configured to:
      control the operational reaction to the driving operation in accordance with the risk potential by controlling the operational reaction imparting section, and
      assist the control section in performing the assist control to produce the pseudo behavior in accordance with the risk potential, by controlling the motion regulating section.

4. The vehicle driving operation support apparatus as claimed in claim 1, wherein the control section is configured to produce a pseudo vehicle behavior simulating a vehicle behavior responsive to a driving operation which is one of an accelerating operation, a braking operation and a steering operation.

5. The vehicle driving operation support apparatus as claimed in claim 1, wherein the control section is configured to control the motion regulating section so as to incline a vehicle body of the vehicle in at least one of a forward direction and a rearward direction in accordance with the risk potential in at least one of forward and rearward directions of the vehicle.

6. The vehicle driving operation support apparatus as claimed in claim 1, wherein the control section is configured to control the motion regulating section so as to incline a vehicle body of the vehicle in a rolling direction in accordance with the risk potential in a lateral direction of the vehicle.

7. The vehicle driving operation support apparatus as claimed in claim 1, wherein the control section is configured to control the motion regulating section so as to vibrate a part of a vehicle body facing the obstacle in accordance with the risk potential.

8. The vehicle driving operation support apparatus as claimed in claim 7, wherein the motion regulating section includes a front suspension unit for a front wheel of the vehicle and a rear suspension unit for a rear wheel of the vehicle; and the control section is configured to produce vibration in one of the front and rear suspension units in accordance with the risk potential in the longitudinal direction.

9. The vehicle driving operation support apparatus as claimed in claim 7, wherein the motion regulating section includes a left suspension unit for a left wheel and a right suspension unit for a right wheel; and the control section is configured to produce vibration in one of the right and left suspension units in accordance with the risk potential in the lateral direction of the vehicle.

10. The vehicle driving operation support apparatus as claimed in claim 1, wherein the control section is configured to produce a rolling swing movement of a vehicle body of the vehicle in response to an increase of the risk potential in a forward direction of the vehicle by controlling the motion regulating section.

11. The vehicle driving operation support apparatus as claimed in claim 1, wherein the control section is configured to select one of a rolling swing control and a rearward inclination control based on a vehicle speed of the vehicle, the rolling swing control being a control of producing a rolling swing movement of a vehicle body of the vehicle in response to an increase of the risk potential in a forward direction of the vehicle by controlling the motion regulating section, the rearward inclination control being control of inclining the vehicle body rearward in response to an increase of the risk potential in the forward direction.

12. The vehicle driving operation support apparatus as claimed in claim 1, wherein:
   the control section is configured to control the operational reaction in accordance with the risk potential in a lateral direction of the vehicle when the risk potential in the lateral direction is higher than a first lateral potential threshold, and
   the control section is configured to produce a pseudo vehicle behavior simulating a vehicle behavior responsive to a driving operation increasing the risk potential in the lateral direction when the risk potential in the lateral direction is higher than a second lateral potential threshold, the second lateral potential threshold being higher than the first lateral potential threshold.

13. The vehicle driving operation support apparatus as claimed in claim 1, wherein:
   the control section is configured to perform a control operation to produce a pseudo vehicle behavior simulating a rolling vehicle behavior responsive to a steering operation in a direction increasing the risk potential in the lateral direction of the vehicle in accordance with the risk potential in the lateral direction when the risk potential in the lateral direction is higher than a third lateral potential threshold, and
   the control section is configured to perform a control operation to produce a vibration on a left or right side of the driver in accordance with the risk potential in the lateral direction when the risk potential in the lateral direction is higher than a fourth lateral potential threshold, the fourth lateral potential threshold being higher than the third lateral potential threshold.

14. The vehicle driving operation support apparatus as claimed in claim 1, wherein the control section is configured to vary a control quantity for producing an inducement in the form of a pseudo vehicle behavior, in accordance with a vehicle stability condition of the vehicle.

15. The vehicle driving operation support apparatus as claimed in claim 1, wherein the control section is configured to perform an assist control by controlling at least one of a suspension stroke of a suspension device included in the motion regulating section, a damping force of a suspension device included in the motion regulating section, a spring constant of a suspension device included in the motion regulating section, an operational reaction added to the driver's driving operation, and a gain of the operational reaction.

16. The vehicle driving operation support apparatus as claimed in claim 1, wherein the motion regulating section includes a suspension device disposed between a wheel and a vehicle body of the vehicle.

17. The vehicle driving operation support apparatus as claimed in claim 1, wherein the motion regulating section includes a suspension device disposed between a driver's seat and a vehicle body of the vehicle.

18. The vehicle driving operation support apparatus as claimed in claim 1, wherein the control section is configured to:
   calculate a front risk potential of the vehicle in a forward direction in accordance with the vehicle condition and the surrounding condition, and
   produce the pseudo behavior simulating an accelerating motion of the vehicle by controlling the motion regulating section when the front risk potential becomes higher than a predetermined threshold.

19. The vehicle driving operation support apparatus as claimed in claim 1, wherein the control section is configured to:
   calculate a rear risk potential of the vehicle in a rearward direction in accordance with the vehicle condition and the surrounding condition, and
   produce the pseudo behavior simulating a decelerating motion of the vehicle by controlling the motion regulating section when the rear risk potential becomes higher than a predetermined threshold.

20. The vehicle driving operation support apparatus as claimed in claim 1, wherein the control section is configured to:
   calculate a right or left risk potential of the vehicle in a lateral direction in accordance with the vehicle condition and the surrounding condition, and
   produce the pseudo behavior simulating a rolling motion of the vehicle by controlling the motion regulating section when the right or left risk potential becomes higher than a predetermined threshold.

21. A vehicle driving operation support apparatus for a vehicle, comprising:
   a sensing section configured to sense a traveling condition of the vehicle including a surrounding condition inclusive of an obstacle around the vehicle;
   an actuating section configured to control the vehicle for supporting a driver of the vehicle in accordance with the traveling condition; and
   a control section configured to:
      calculate a risk potential for the vehicle in accordance with the traveling condition, and
      perform an assist control simulating a condition change attributable to an increase of the risk potential, to produce an inducement of a driver's driving operation, by controlling the actuating section in accordance with the risk potential.

22. A vehicle driving operation support process for a vehicle, comprising:
- sensing a traveling condition of the vehicle including a surrounding condition inclusive of an obstacle around the vehicle;
- calculating a risk potential for the vehicle in accordance with the traveling condition;
- performing an assist control simulating a condition change attributable to an increase of the risk potential, to produce an inducement of a driver's driving operation, in accordance with the risk potential.

* * * * *